(12) United States Patent
Maehler et al.

(10) Patent No.: US 11,803,924 B2
(45) Date of Patent: Oct. 31, 2023

(54) SECURE SYSTEM UTILIZING A LEARNING ENGINE

(71) Applicant: Pacaso Inc., Cincinnati, OH (US)

(72) Inventors: Joseph Maehler, Corona Del Mar, CA (US); Lucas Alexander Roy, Austin, TX (US); Daivak Sunil Shah, Fremont, CA (US); David J. Willbrand, Chagrin Falls, OH (US); Jessie Creighton, Bountiful, UT (US)

(73) Assignee: Pacaso Inc., Cincinnati, OH (US)

( * ) Notice: Subject to any disclaimer, the term of this patent is extended or adjusted under 35 U.S.C. 154(b) by 0 days.

(21) Appl. No.: 18/152,685

(22) Filed: Jan. 10, 2023

(65) Prior Publication Data

US 2023/0237599 A1 Jul. 27, 2023

(51) Int. Cl.
*G06Q 50/16* (2012.01)
*G06Q 30/02* (2023.01)
*G06Q 30/06* (2023.01)
*G06Q 30/0204* (2023.01)
*G06Q 30/0601* (2023.01)

(52) U.S. Cl.
CPC ......... *G06Q 50/16* (2013.01); *G06Q 30/0205* (2013.01); *G06Q 30/0627* (2013.01); *G06Q 30/0629* (2013.01)

(58) Field of Classification Search
CPC .............. G06Q 50/16; G06Q 30/0205; G06Q 30/0627; G06Q 30/0629
See application file for complete search history.

(56) References Cited

U.S. PATENT DOCUMENTS

| 5,987,420 | A | 11/1999 | Maeda | |
|---|---|---|---|---|
| 8,108,895 | B2 * | 1/2012 | Anderson | H04H 60/66 725/36 |
| 8,472,612 | B1 | 6/2013 | Goringe | |
| 11,145,016 | B1 | 10/2021 | Brophy | |
| 11,281,738 | B2 | 3/2022 | Allison et al. | |
| 11,449,565 | B2 | 9/2022 | Allison et al. | |

(Continued)

FOREIGN PATENT DOCUMENTS

| CN | 100410899 C | * | 8/2008 | ......... G06F 12/0831 |
|---|---|---|---|---|
| CN | 100422932 C | * | 10/2008 | ............. G06F 9/548 |

(Continued)

OTHER PUBLICATIONS

Greg Brown, "Mapping and measuring Place Attachment," 2015, Applied Geography 57 (2015), pp. 42-53. (Year: 2015).*

(Continued)

*Primary Examiner* — Tan D Nguyen
(74) *Attorney, Agent, or Firm* — Knobbe, Martens, Olson & Bear LLP

(57) ABSTRACT

Methods and systems are disclosed for determining resource suitability based at least in part on physical geographic mapping data. An artificial intelligence/learning engine may be trained to determine such resource suitability using training data. The trained artificial intelligence/learning engine may then me used to generate suitability indicators. The suitability indicators may be rendered in association with a map comprising the resource. The resource may be configurable to be shared amongst a plurality of physical resource users in a time displaced manner.

22 Claims, 31 Drawing Sheets

(56) References Cited

U.S. PATENT DOCUMENTS

| | | |
|---|---|---|
| 2003/0061260 A1 | 3/2003 | Rajkumar |
| 2003/0078897 A1 | 4/2003 | Florance et al. |
| 2004/0215780 A1 | 10/2004 | Kawato |
| 2007/0189274 A1 | 8/2007 | Liu |
| 2008/0091480 A1 | 4/2008 | Geoghegan et al. |
| 2009/0030743 A1 | 1/2009 | Tussy |
| 2011/0078138 A1 | 3/2011 | Cardella |
| 2011/0099038 A1 | 4/2011 | Nishida |
| 2013/0073387 A1* | 3/2013 | Heath .................... G06Q 30/02 705/14.53 |
| 2013/0073389 A1* | 3/2013 | Heath .................... G06Q 30/02 705/14.54 |
| 2013/0073400 A1* | 3/2013 | Heath .................... G06Q 50/01 715/738 |
| 2013/0073473 A1* | 3/2013 | Heath ................ G06Q 30/0241 705/319 |
| 2013/0254072 A1 | 9/2013 | Eraker et al. |
| 2014/0081678 A1 | 3/2014 | Reynolds |
| 2015/0019272 A1 | 1/2015 | Truong |
| 2016/0155181 A1 | 6/2016 | Romaya et al. |
| 2016/0217523 A1 | 7/2016 | Goodrich et al. |
| 2018/0190056 A1 | 7/2018 | Desinor, Jr. |
| 2018/0211117 A1 | 7/2018 | Ratti |
| 2018/0343140 A1 | 11/2018 | Driedger |
| 2018/0365645 A1 | 12/2018 | Gillen |
| 2019/0034837 A1 | 1/2019 | Lou et al. |
| 2019/0034848 A1 | 1/2019 | Jamieson |
| 2019/0279235 A1 | 9/2019 | Kaneichi et al. |
| 2019/0311044 A1 | 10/2019 | Xu |
| 2020/0167631 A1* | 5/2020 | Rezgui .................... B25J 9/0084 |
| 2020/0204522 A1 | 6/2020 | Binder |
| 2020/0319784 A1 | 10/2020 | Sinclair |
| 2021/0027559 A1 | 1/2021 | Fisher |
| 2022/0116736 A1* | 4/2022 | Williams ........... G06Q 20/3224 |
| 2022/0245442 A1 | 8/2022 | Allison et al. |
| 2022/0245443 A1 | 8/2022 | Allison et al. |

FOREIGN PATENT DOCUMENTS

| | | | | |
|---|---|---|---|---|
| CN | 105763851 A | * | 7/2016 | |
| CN | 106507285 A | * | 3/2017 | |
| CN | 106557582 A | * | 4/2017 | |
| WO | WO-2007032529 A1 | * | 3/2007 | ........... G11B 27/105 |
| WO | WO-2010022274 A1 | * | 2/2010 | ............. G06F 21/35 |
| WO | WO 2020/039821 A1 | | 2/2020 | |
| WO | WO 2020/050906 A1 | | 3/2020 | |
| WO | WO 2022/015864 A1 | | 1/2022 | |

OTHER PUBLICATIONS

Abbas Keramati, "Developing a prediction model for customer churn from electronic banking services using data mining", 2016, Financial Innovation, pp. 1-14. (Year: 2016).*

Fatemeh Khazaee Fadafan, "Developing a non-compensatory approach to identify suitable zones for intensive tourism in an environment sensitive landscape," 2018, Ecological Indicators 87, pp. 152-166. (Year: 2018).*

U.S. Appl. No. 63/303,649, filed Jan. 27, 2022, Maehler.

U.S. Appl. No. 63/377,809, filed Sep. 30, 2022, Shah.

International Search Report and Written Opinion, regarding International Application No. PCT/US2021/041648, dated Nov. 11, 2021, 9 pages.

* cited by examiner

The Oasis
PALM SPRINGS $725,000
1/8 OWNERSHIP

SHARE LISTING

ADDRESS
594 W Stevens Rd, Palm Springs, CA

TOUR

ATTRIBUTES
5 Beds 7 Baths 5,073 sq ft

FIG. 6

SECURE SYSTEM UTILIZING A LEARNING ENGINE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND OF THE INVENTION

Field of the Invention

The present disclosure generally relates to performing searches and using learning engines in a mapping process.

Description of the Related Art

Conventionally, search engines may provide inadequately customized search results to disparate sets of users.

For example, a conventional search engine may utilize an indexing system for identifying content accessible at various networked locations. A user may enter a search query into a search field, where the search query may include one or more text search terms. Such a conventional search engine may utilize the index to identify content that is relevant to a user's search query terms, but without taking into account certain complex context data that would provide more relevant results.

Thus, certain conventional search engines may not provide or sort search results in a manner that adequately corresponds with a search query.

Further, conventional systems do not provide search results in the form of multilayered maps with contextual data that indicates the suitability of a given resource for a given utilization.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to a system configured to allocate access to physical resources, the system including: a network interface; at least one processing device operable to: receive over a network, using the network interface, an encrypted communication from a client hosted on a user device requesting a resource suitability indicator for a first geographical area with respect to a first resource type configured to be shared amongst a plurality of physical resource users in a time displaced manner; access data from a plurality of databases related to at least the first geographical area, wherein the first geographical area comprises a plurality of resources; use a first learning engine to evaluate the data from the plurality of databases related to the first geographical area to generate an area suitability indicator; generate a multilayer map comprising the first geographical area and a surrounding geographical area, cause the generated area suitability indicator to be rendered in association with the multilayer map comprising the first geographical area and the surrounding geographical area; determine whether the generated area suitability indicator satisfies a first threshold; at least partly in response to determining that the generated area suitability indicator satisfies the first threshold, use a second learning engine to evaluate data related to a first resource within the first geographical area to generate a resource suitability indicator indicating a suitability of the first resource to be shared amongst a plurality of physical resource users in a time displaced manner; and at least partly in response to determining that the generated resource suitability indicator satisfies a second threshold, enable a first action to be taken.

An aspect of the present disclosure relates to a computer implemented method, the method including: accessing, via a computer interface, data from a plurality of databases related to at least a first geographical area, wherein the first geographical area comprises a plurality of resources; using a first learning engine to evaluate the data from the plurality of databases related to the first geographical area to generate an area suitability indicator for the first geographical area; causing the generated area suitability indicator to be rendered in association with a map comprising the first geographical area; determining whether the generated area suitability indicator satisfies a first threshold; at least partly in response to determining that the generated area suitability indicator satisfies the first threshold, using a second learning engine to evaluate data related to a first resource within the first geographical area to generate a resource suitability indicator indicating a suitability of the first resource to be shared amongst a plurality of physical resource users in a time displaced manner; at least partly in response to determining that the generated resource suitability indicator satisfies a second threshold, enable a first action to be taken.

An aspect of the present disclosure related to non-transitory computer readable memory having program instructions stored thereon that when executed by a computer system device cause the computer system to perform operations comprising: access data from one or more databases related to at least a first geographical area, wherein the first geographical area comprises a plurality of resources; use a first learning engine to evaluate the data from the one or more databases related to the first geographical area to generate an area suitability indicator for the first geographical area; cause the generated area suitability indicator to be rendered in association with a map comprising the first geographical area; use a second learning engine to evaluate data related to a first resource within the first geographical area to generate a resource suitability indicator indicating a suitability of the first resource to be shared amongst a plurality of physical resource users in a time displaced manner; and at least partly in response to determining that the generated resource suitability indicator satisfies a second threshold, enable a first action to be taken.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

FIGS. 5 and 6 illustrate example user interfaces.

DETAILED DESCRIPTION

Figure 1A:
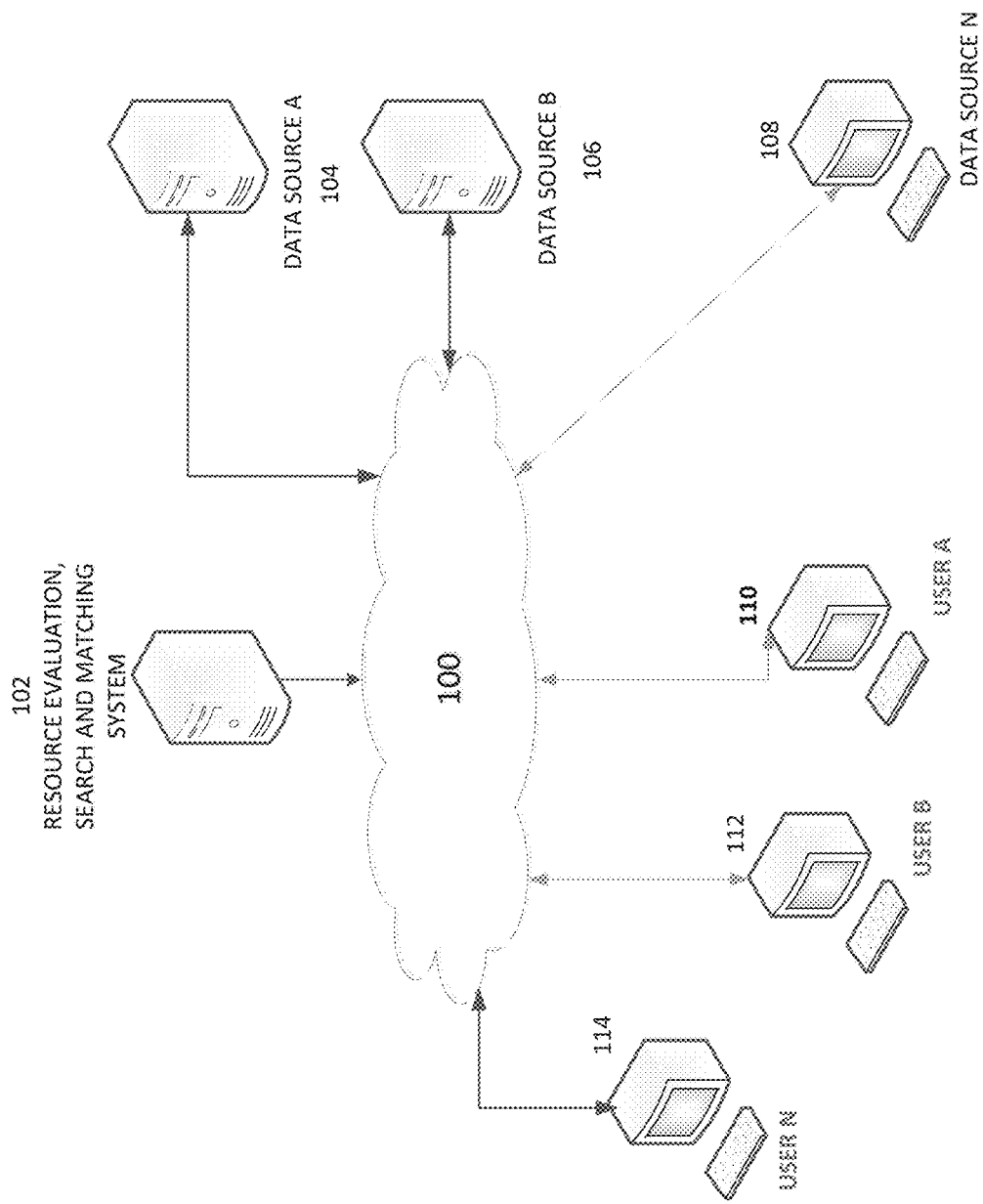
FIG. 1A illustrates an example operating environment.

An aspect of the present disclosure relates to systems and methods for enabling searches to be securely performed for physical resources and/or for potential utilizers of such physical resources to thereby identify potential or likely matches between such physical resources and/or for potential utilizers of such physical resources.

Further, an aspect of the present disclosure relates to a mapping system configured to generate maps that include data and learning engine-generated scores that indicate whether a particular resource is an appropriate match for a particular utilization.

Certain conventional search engines are configured to match search query terms with words and metadata associated with webpages to identify web pages that match the search query terms. However, many such conventional search engines are inadequate to identify matches between physical resources and potential utilizers of such physical resources, particularly when potential utilizers of a given physical resource will be sharing such physical resource with others in a non-overlapping, time-displaced manner (e.g., via random time slice assignment, via a round robin arrangement, via First Come First Serve (FCFS) allocation, etc.).

Conventional search engines crawl webpages using a spider, where the spider downloads web pages and follows connections on the webpages to identify new webpages. A search index may be generated and updated. The index may include the discovered webpage URLs and associated content information. For example, the associated content information may include the type of content as identified via a webpage Schema (a semantic vocabulary of tags or microdata), how recently the webpage was updated, and historical engagement by users with the webpage or domain.

When a user enters a search query into a search field, the search engine identifies pages which are deemed to be relevant from the index. A relevancy ranking algorithm may be used to hierarchically rank the matching pages into a set of results. Certain search engines take into account user location data in ranking search results, such as in response to a query of "movie theaters near me," where the search engine may identify movie theaters near the user based on information (e.g., IP address) indicating the user's current location.

However, as noted above, many conventional search engines are generally directed to simply responding to queries from a user. Such conventional search engines are not configured to and do not attempt to find an optimum or preferred set of different potential physical resource utilizers based at least in part on attributes of the potential physical resource utilizers and on attributes of the physical resource.

In contrast to conventional systems, the exemplary systems and processes described herein may be configured to match users with physical resources based on a variety of user attributes and physical resource attributes and may determine/predict an optimum or preferred set of resource utilizers for one or more physical resources (e.g., utilizing a neural network, an expert system, a rules-based systems, and/or a support vector machine). As will be described, the exemplary systems and processes overcome several technical challenges in matching users with physical resources and in identifying an optimum or preferred set of resource utilizers for one or more physical resources.

For example, a physical resource may be a property comprising an inhabitable structure. Physical resource attributes may include dimensional data, structure configuration data, surface treatment data, geographic location data, elevation data, weather related data, and/or other data. Different physical resources of a given resource type (e.g., a house) may have certain common attributes and may have certain different attributes. Different physical resources may be connected based on such common resource attributes.

Resource utilizers may also have associated attributes. For example, certain resource utilizers may need to utilize a given physical resource during a first common time period, while certain other resource utilizers may need to utilize a given physical resource during a second common time period. By way of further example, certain resource utilizers may need certain minimum dimensions or prefer certain materials. By way of still further example, certain resource utilizers may desire proximity to certain amenities or activity areas. By way of further example, certain resource utilizers may wish to purchase a resource while other resource utilizers may wish to rent a resource for a specified period of time, or for a recurring time period of time for a specified period (e.g., two weeks a year for five years). Different physical resources utilizers may be connected based on such common resource utilizer attributes.

Where a physical resource attribute of a given physical resource corresponds to resource utilizer attribute, a connection may be formed. The greater the number of connections the more likely that a physical resource will be a match for the resource utilizer. A negative connection may be formed, where the resource utilizer affirmatively does not want houses with certain characteristics (e.g., located above a certain floor level in a multistory condominium building).

Connections may likewise be formed between potential physical resource utilizers. Such connections may be positive connections or negative connections. For example, where two physical resource utilizers need or desire certain common physical attributes with respect to a physical resource, a positive connection may be established. By way of further example, where two physical resource utilizers need or desire to use a physical resource during the same time frame, a negative connection may be established as their needs may conflict.

Certain connections (whether positive or negative) may be weighted differently than other connections, where the weighting may reflect the importance of the connection in determining a suitability (e.g., the suitability of a given physical resource for a given physical resource utilizer, the suitability for two physical resource utilizers to share time sliced access to the physical resource).

Thus, for example, a physical resource utilizer affinity with a given physical resource may optionally be determined based at least on the number of positive connections and the number of negative connections with the physical resource and on the weights associated with respective connections. A match score may optionally be generated using the following formula (e.g., where a connection may be a positive number (1) or a negative number (−1)):

Match score=Connection$^1$×Weight$^1$+Connection$^2$×Weight$^2$ . . . +Connection$^N$×Weight$^N$ Similarly, a physical resource utilizer's suitability to share a physical resource with another physical resource utilizer may be determined based at least on the number of positive connections and the number of negative connections with the other physical resource utilizer and on the weights associated with respective connections. A suitability score may optionally be generated using the following formula (e.g., where a connection may be a positive number (1) or a negative number (−1)):

Suitability score=ResourceUtilizerConnection$^1$×Weight$^1$+ResourceUtilizerConnection$^2$×Weight$^2$+ResourceUtilizerConnection$^N$×Weight$^N$ Optionally, a stochastic model (configured to estimate probability distributions of potential outcomes by allowing for random variation in one or more inputs over time) and/or a neural network, such as those described herein (e.g., a convolutional neural network and/or a Long short-term memory (LSTM) neural network), may be utilized to identify matches. For example, the neural network may include one or more convolution layers+ ReLU, one or more pooling layers, and a loss function, and/or one or more LSTM elements.

Optionally, a neural network or other learning engine, such as those described herein, may be utilized to predict local neighbor sentiment toward the operation of co-owned homes (e.g., vacation homes) and/or the operation of rental properties (e.g., short term rentals, where renters may rent the property for short terms each year for a specified period of years, and may use the house as a vacation rental), and to generate a corresponding score.

Although, certain examples will be discussed with respect to building structures and/or property (e.g., vacation homes, condominiums, houses, campgrounds, etc.), the systems and processes described herein may be applied to other physical resources, such as motorized vehicles, computer devices and resources, entertainment devices, or other physical resources.

Further, while certain examples will be discussed with respect to fractionalized ownership interests in a physical resource (e.g., via direct ownership, via a company that owns the physical resource, such as a limited liability company that owns a vacation home, via syndicates operating as private member groups, etc.), where a given user owns one or more shares in the building structure and property, certain systems and processes described herein may be applied to non-fractionalized ownership of physical resources.

Optionally, rather than purchasing a share in a physical resource, users may be enabled to lease the equivalent share(s). The lease may be in the form of a lease-to-buy program, where at the end of the lease (e.g., a 1 year lease, a 2 year lease, a 5 year lease, or other lease length), or earlier, the user may purchase the share(s). Optionally, the user may be enabled to apply some or all of the lease amount previously paid to the share purchase price. The share purchase price may be the same as the share purchase price at the time the user entered into a lease or the share purchase price may be adjusted to reflect the current fair market value of the share or house (e.g., to reflect the increase or decrease since the lease was entered into). Thus, the lease is configured to provide the feeling of a purchase. Thus, for a given physical resource, one user may purchase the entire resource and other users may lease/rent the physical resource for an optionally recurring period of time (e.g., a number of days per year, where all the days are not necessarily sequential) for a certain time period (e.g., 4 weeks a year for a period of 5 years, where the weeks do not have to be sequential). For example, the renters may be enabled to utilize and reserve the resource as similarly described herein with respect to co-owners, except without an ownership interest. It is understood that the disclosed systems and processes may be utilized with respect to long term rentals (e.g., 6 months, 1 year, 5 years), one-time short term rentals (e.g., for 1 day, 1 week, 1 month, etc.), or recurring short term rentals (a recurring number of days per year for a certain time period).

Optionally, the entity offering the services described herein may act as a condominium board for a given property.

By way of non-limiting example, a given physical resource may have 2 shares, 4 shares, 6 shares, 8 shares, 12 shares, 26 shares, or other number of shares. Although the ownership interest may be expressed as shares, other mechanisms may be used reflecting a corresponding percentage ownership interest. For example, if there are a total of 8 shares, and a given user has 2 shares, that user owns 25% of the physical resource (e.g., directly or via an intermediate company).

Identifying which physical resources are suitable for a given user can be highly complicated and very challenging for a search engine to identify. For example, where the physical resource is a house (e.g., a vacation home), houses have an enormous number of variables, making it exceptionally difficult to conduct a search for a house that is a suitable or optimized match for a user.

By way of illustration, house attributes may include house value, cost of a share in the house (or cost of a share in the company that owns the house), number of shares in the house (or in the company that owns the house), average income of households in neighborhood, geographical location, elevation, type of house (e.g., standalone house, attached house, condominium, high rise apartment, etc.), architectural style (e.g., colonial, modern, Mediterranean, cape cod, Spanish-style, cabin, farmhouse, etc.), total square footage of the house, total square footage of the property, number of floors, number and size of bedrooms, bedroom configurations (e.g., en suite (having its own bathroom), not en suite, fireplace, etc.), number and size of bathrooms, bathroom configurations (e.g., configured with bathtub, spa tub, shower, toilet room, etc.), location of the master bedroom (e.g., first floor, second floor, etc.), whether the house has certain types of rooms and their size (e.g., family room, game room, dining room, breakfast room, living room, gym, screening room, etc.), number of fireplaces, existence and size of backyard, existence and size a swimming pool, existence and size of a hot tub, existence and size of a basketball court, existence and size of a tennis court, whether there is a fenced yard, the existence and type of views (e.g., no view, ocean view, partial ocean view, lake view, partial lake view, mountain view, partial mountain view, canyon view, partial canyon view, etc.), the weather (e.g., temperature, snow, hail, humidity, on a month-by-month basis), the distance to neighboring houses, the distance from ski slopes and/or other winter sport locations, the distance from hiking trails, the distance from boating areas, the distance from shopping areas, the distance from cultural institutions (e.g., museums, concert halls, libraries, etc.), the distance from airports, the extent of local public transportation, and so on.

Further, if the house is furnished, the complexity of searching for and identifying a house suitable for a given user is further increased. For example, the furnished house attributes may include furniture style (e.g., modern, traditional, mid-century, etc.), furniture brand, furniture quality level, décor (e.g., paintings, photographs, sculptures, mirrors, decorative items, planters, vases, candle holders, wall clocks, lamps, pillows, etc.), the existence and type of gaming equipment (e.g., foosball table, ping pong table, pool table, game console, etc.), the number and size of televisions, and/or the like.

The house attributes may optionally be populated in whole or in part using data accessed from one or more local or third party data sources. For example, the house and property square footage may be determined from a municipal tax data store, the architecture style may be determined using computer vision to analyze images accessed from mapping services, furnishing data may be determined using computer vision to analyze images of the interior of the house, and/or the like. By way of further example, elevation and other geographical and view related information (e.g., whether the house is located on a mountain, beach, lakefront, canyon, etc.; whether the house has: no view, an ocean view, a partial ocean view, a lake view, a partial lake view, a mountain view, a partial mountain view, a canyon view, a partial canyon view, etc.) may be determined using Geographic Information Systems (GIS) data and/or by analyzing images of the area surrounding or adjacent to a house (e.g., using images from mapping services). By way of still further example, the location of recreational activities (e.g., sports activities, cultural activities, etc.), shopping locations, and the like may be determined via one or more mapping services. Weather data may be determined via one or more weather databases (e.g., the Climate Data Online database).

The computer vision analysis of images (e.g., photographs) to determine an architectural style of a given house may be performed using a deep convolutional network trained using images of different houses of different architectures, and then comparing the neural network weights of a photograph of the given house with the neural network weights corresponding to the images of different houses of different architectures to identify which weights most closely match those of the given house. The weights of a given architecture that mostly closely match those of the given house may then be assigned to the given house.

The computer vision analysis of images (e.g., photographs) to identify furniture, kitchen appliances, décor, and the like may utilize automatic image tagging wherein metadata in the form of captioning or keywords are automatically assigned to an image. A neural network (e.g., a convolutional neural network or a Long short-term memory (LSTM) neural network) may be utilized in the tagging of an image to identify furniture. The neural network may include a preprocessing layer where the image (e.g., in the RGB color space) image is taken and the mean image values are subtracted. A deep convolutional neural network may be used to generate a segmentation map of an input image via a multilayer deconvolution network which may be used on top of the convolutional network. For example, the deep convolutional neural network may include convolution layers with ReLU (a rectified linear activation function that is a piecewise linear function that outputs the input directly if it is positive, otherwise, the ReLU function will output zero), max pooling layers (e.g., to down sample the detection of the most activated features in feature maps), fully connected layers with ReLU, and a softmax cross entropy loss function used to adjust neural network weights via backpropagation.

Although it is technically challenging to search for and identify a house that is suitable for a given user, the technical challenge is greatly increased when the search engine is to identify a potential set of users, where each user in the set is suitable for a given house, and each user in the set is suitable to share the house with other users in the set in a time displaced manner (where the users do not utilize the house at the same time, but instead each user utilize the house at different times).

The technical challenge is further exacerbated where users are not assigned set periods of time to use the house, but may reserve the house for a certain number of stays in a given time period, for a certain number of days in a given time period, for a certain number of special dates (e.g., public holidays, popular vacation days, other days of expected high demand, etc.) in a given time period, where the house may be unavailable on certain days (e.g., for maintenance), etc. Example systems and methods for reserving a physical resource are described in Patent Application No. 63/053,113, titled "Reservation System", filed Jul. 17, 2020, the content of which is incorporated herein by reference in its entirety, and may be used in conjunction with the systems and methods described herein to reserve physical resources and otherwise. Functionality described herein and/or in Patent Application No. 63/053,113 may be provided via webpages served to a user device via the web server, via a browser extension installed on a browser hosted on the user device, via a dedicated application installed on the user device, and/or otherwise.

The disclosed systems and methods may, for example, optionally determine a user's suitability for a house based on user attributes determined using explicit data provided by the user and/or implicit data determined for the user. Such explicit data may include user preferences specified by the user via a preference user interface. The preference user interface may enable the user to specify some or all of the attributes described herein and/or other attributes (including, where appropriate, a minimum value (such as a minimum number of bedrooms), a maximum value (such as the maximum share price), or a range of values (such a range specifying a minimum-maximum property square footage or share prices). The explicit data may optionally include demographic information regarding the user (e.g., the user's age, whether the user has a partner, how many children the user has, the age of the children, the total number of people who will be staying at the house during the user's reserved time period, etc.), preferred time periods to use the house, desired activities with respect to the house (e.g., sporting activities, cultural activities, etc.), whether the user prefers to fly or drive to the house, and/or the like. The explicit data may further include search terms entered by the user via a search field.

The implicit data may include the user's location (e.g., as determined via a geolocation application programming interface, via an IP address, etc.), information derived from the user's location (e.g., average house prices in area, average income levels in area, etc.), websites previously visited by the user (e.g., as determined by cookie data accessed from the user device), social networking accounts, and/or other data. As described elsewhere herein, if a user already owns a share in a first property and is looking to obtain shares in a second property (e.g., via an exchange of shares of the first property for shares in the second property, or in order to have shares in two vacation homes) or is looking to exchange usage rights for a particular period of time with another user for a second property, the implicit data may include the user's behavior and use of the first property as well as other user data in the user's account. For example, user data may include the number of times the user utilized the first property, the times of year the user utilized the first property, how long the user stayed at the first property at each visit, the experiences the user signed up for at the first property (e.g., boating, skiing, tennis lessons, activities for pre-teens, for teenagers, for the elderly, etc.), the temperature settings by the user for the first property, food ordered to stock the first property for visits, etc.

When conducting a search (e.g., for a straightforward share purchase, to exchange shares or usage rights for another property, to purchase a property in its entirety or to purchase a property's share(s) with the intent of renting the property to others), the search engine may utilize the explicitly provided data and/or the implicit data to search for available properties, which may be referred to as houses (e.g., where one or more shares are available to purchase) that have attributes that at least partly match (are "connected to") the user attributes. The search engine may provide the search results for display on the user device. The search results may be ranked by the search engine in accordance with how closely a house's attributes match those of the user (e.g., based on the number of matches, and the weight importance of such matches).

A given search result entry for a property/house may include some or all of the following: an image of the house, the number of total shares for the house, the cost of each share, the total value of the house (e.g., the total number of shares×the share value, the actual total cost to purchase the house (optionally include the cost of the furnishings and amenities), and/or the fair market value), the name of the house, the location of the house (e.g., the city or town the house is located in), the number of bedrooms, the number of baths, the square footage of the house, whether local homeowner association rules or government regulations permit, restrict, or prevent the renting of the house to others (e.g., a global prohibition, or a prohibition of renting a house for less than a specified threshold period of time), and/or other facts regarding the house.

Where the user is seeking to exchange shares in a current property for shares in another property, the search result may indicate the difference in share cost/value between the shares in the different properties. For example, where the price per share in a given property in the search results is higher than the price per share in the user's current property, the system may calculate the difference in share cost, and display the difference to the user with an indication that the user would have to pay additional amounts in addition to contributing the shares in the user's current property for a share in the property in the search results. By way of illustration, where the price per share in a given property in the search results is less than the price per share in the user's current property, the system may calculate the difference in share cost, and display the difference to the user with an indication that the user would receive a credit corresponding to the difference (e.g., for operating expenses associated with the new property). Optionally, if the user is granted a credit, a corresponding credit value may be stored in the user's account for later use. Optionally, a time limit may be defined, wherein if the user fails to use the credit within the time period, the credit may be removed from the user's account.

Optionally, the search user interface may include a control via which the user may instruct the search engine to only display houses that are eligible for a share exchange. The search engine may then identify (e.g., using exchange permission attributes stored in a database record associated with a given property) and filter out from the search results those houses that are not eligible for a share exchange. Optionally, a dedicated search user interface may be provided which will automatically limit any search to only those properties for which share and/or time exchanges are permitted.

Optionally, an exchange rules engine (e.g., resource exchange rules engine 138B) may limit exchanges in accordance with one or more rules. For example, a rule may only permit a user to exchange a share in first property for a share in another property for a limited time period after the user acquired shares in the first property. Optionally, the time period may be different for different potential properties. For example, a rule may permit a user to exchange shares in a given property for a 1 year time period for shares in properties that already have one or more shareholders, while the user may be permitted to exchange shares in a given property for a 2 year time period for shares properties that do not have any shareholders (thereby encouraging the use of underutilized resources and balancing the usage across more resources). By way of further example, different exchange time periods may be associated with different geographical regions, governmental regions (e.g., cities, states, countries), and/or different types of properties (e.g., condominiums, standalone homes, homes with a view, etc.). By way of further example, an exchange rule may specify that a user is limited to making only a certain number of exchanges (e.g., 1 exchange, 2 exchanges, etc.). By way of further example, an exchange rule may specify that a user is limited to making only a certain number of exchanges (e.g., 1 exchange, 2 exchanges, etc.) over a certain time period (e.g., 1 year, 2 years, 5 years, etc.).

The search engine may filter out search results to only those properties that the user is eligible to exchange shares for. For example, the search engine may access the user's acquisition date in the user's current shares, and based on the acquisition date, the exchange rules, and property types, filter out those properties that do not satisfy the exchange rules and display those properties that satisfy the exchange rules and the user's data (e.g., express preferences, inferred preferences, demographics, and/or other user data described herein). Optionally, the search engine may display properties that do not satisfy the exchange rules in the search results, with an indication that shares are available to purchase but not for a share exchange.

In response to the user selecting a search result entry (e.g., by clicking on an entry), additional information regarding the house may be presented. For example, additional images may be presented, a video tour of the house may be presented, the actual house address may be presented, and a description of the amenities of the house and the locale of the house may be presented. Optionally, a download link may be provided, which when activated, will cause a document (e.g., a PDF document) to be downloaded to the user system providing some or all of the foregoing property information and/or other house-related information. Optionally, a map and/or a link to a map may be provided where the map shows the location of the house, the surrounding area, points of interest, streets (including street names). Optionally, a satellite view may be accessible. Optionally, the map be zoomable. Optionally, nearby facilities (e.g., shopping facilities, entertainment facilities, restaurants, etc.)

and attractions may be shown on the map, optionally with the distance to the house indicated.

An interface may be provided via which the user may request a virtual or in person tour of the house. Optionally, a chat interface is provided via which the user can request additional information from a service person, and may initiate a share purchase. Optionally, a control is provided via which the user may purchase one or more shares (e.g., with few, or even one purchase control activation).

The user may instruct the search engine to further refine the search by specifying one or more filters (which may be treated as additional search terms) relating to one or more of the house attributes or the user attributes.

Optionally, if a given house identified as a match already has shares owned by one or more other users, the search engine will attempt to determine how compatible the user conducting the search is with the existing share owners using the positive and/or negative connections. For example, user attributes that indicate a certain likelihood of a conflict in terms of a desire to utilize the house during the same time period may cause a house to be ranked lower in the search results or eliminated from the search results altogether. The greater the number of existing stakeholders (e.g., shareholders) the searching user is predicted to have a time conflict with, the more the house ranking will be reduced and/or the more likely the house will be eliminated from the search results altogether.

By way of illustration, if an existing stakeholder has school age children and the searching user has school age children, there may be a greater likelihood of a conflict in a desired house usage period (e.g., school vacations). By way of further illustration, if an existing stakeholder has school age children and the searching user does not have children, there may be a lesser likelihood of a conflict in a desired house usage period. By way of yet further illustration, if an existing stakeholder enjoys participating in winter sports and the searching user also enjoys participating in winter sports, there may be a greater likelihood of a conflict in a desired house usage period (e.g., during the winter snow season or other seasonal conflict). By way of still further illustration, if an existing stakeholder enjoys participating in winter sports and the searching user enjoys participating in summer sports, there may be a lesser likelihood of a conflict in a desired house usage period.

A given physical resource may be shared amongst users. Conventional resource allocation systems disadvantageously fail to predict high demand periods of resource utilization, and hence fail to adequately allocate such physical resource amongst the sharing users.

The systems and methods described herein may also be configured to identify/predict days of likely high demand among stakeholders (which may be referred to as a special date). For example, an artificial intelligence/learning engine (e.g., a neural network) or algorithm may be utilized to model user reservation behavior with respect to a house. The 1 artificial intelligence/earning engine may be trained using a historical set of reservations, where the artificial intelligence/learning engine makes predictions as to the likelihood a house will be reserved on a given day. A loss function may be used to adjust the neural network weights based on the accuracy of a given prediction.

Optionally, a neural network may be configured as a Long short-term memory (LSTM) neural network. An LSTM which is a type of recurrent neural network (RAN) architecture having feedback connections, that may be particularly advantageous in deep learning applications, such as in predicting human behavior (e.g., house reservations). LSTMs are designed to preserve information that may be relevant for future tasks for long periods of time so that the past information can be connected to a present task.

A given LSTM unit may include a cell and regulators used to regulate the flow of information inside the LSTM unit. For example, the regulators may include an input gate, an output gate and a forget gate. The cell may be used to keep track of the dependencies between the elements in the input sequence. Because the cell comprises a memory unit, the cell can process data sequentially and retain its hidden state through time.

A prediction engine may include a data pre-processing component, a multi-layer long short-term memory (LSTM) neural network for user behaviors, a pattern adapter for mining behavior patterns, and attention component configured to adjust the weights of the LSTM and the pattern adapter.

As discussed above, the neural network may be trained in a supervised manner on a set of training data in order to determine network weights so as to reduce the error/loss function. For example, the connections between the LSTM gates may be assigned weights determined during training, which determine the operation of the LSTM gates.

If a given date (or date range) is predicted to be a high demand date, such information may be used to generate notifications which may be transmitted to one or more stakeholders (e.g., via email, messaging service, an app notification, or otherwise) informing such stakeholders that such date (or date range) is predicted to be in high demand and that they should make a reservation as soon as possible if they want to reserve the house for such date.

Optionally the notification may be first transmitted to the stakeholder that has gone the longest time since reserving a special date and the notification may include a reservation confirmation control. Optionally, the house may be automatically reserved in such stakeholder's name for a period of time (e.g., 24 hours, 48 hours, or other time period), and if the stakeholder confirms the reservation (e.g., by activating the confirm reservation control), the reservation will maintained. If the stakeholder does not activate the confirm reservation control within the time period (or activates a reservation release control provided in the notification), the reservation will be released. The process may be repeated for the stakeholder that has gone the next longest time since reserving a special date, and so on.

Optionally, instead, the notification may be transmitted to all house stakeholders at substantially the same time, and the reservation may be provided on a first come first serve basis (e.g., where the first stakeholder that confirms the reservations is assigned the reservation, so long as it does not violate a reservation rule, such as those described in Patent Application No. 63/053,113, titled "Reservation System", filed Jul. 17, 2020). Optionally, where the notification is transmitted to all house stakeholders, such notification may include a different link or code associated with the reservation control for each house stakeholder. Thus, when a stakeholder activates the reservation control, the system may be able to uniquely identify the stakeholder and initiate the reservation process for the identified stakeholder.

Optionally, in addition to or instead of determining a high demand date for the house as a whole, the system may identify dates that a particular user is likely to want to make a reservation (which may be referred to as a special personal date). For example, such identification may be performed based on historical reservation data for the user (e.g., did the user reserve the same date in multiple years) and/or on personal data for the user (e.g., a wedding anniversary, a birthday, etc.). If a given date (or date range) is predicted to be a special personal date for the user, such information may be used to generate a notification which may be transmitted to the user informing the user that such date (or date range) is predicted to be a date that the user may want to make a reservation for based on past history and/or personal data (e.g., a wedding anniversary, a birthday, etc.). Optionally, such notification may not be sent if the date is generally a special date for stakeholders (e.g., a federal holiday). Optionally, the notification is not transmitted if, based on reservation rules, the user is not eligible to reserve the house for the special personal date (e.g., as a result of the user's pending and/or past reservation).

Optionally, the house may be automatically reserved in such user's name for a period of time (e.g., 24 hours, 48 hours, or other time period), and if the user confirms the reservation (e.g., by activating the confirm reservation control), the reservation will maintained. If the user does not activate the confirm reservation control within the time period (or activates a reservation release control provided in the notification), the reservation will be released.

Optionally, the system will enable a given stakeholder to exchange usage of the stakeholder's rights to use their house for a period of time with a stakeholder in another house. Such an exchange (and corresponding reservations for specific dates) may be received and stored by the system. Optionally, if there is price differential in the share value of one house as compared to the other house, the stakeholder with the lower value share may be charged a prorated amount (the value of the dates reserved at the higher share value hose minus the value of the dates reserved at the lower share value house), and such prorated amount may be provided to the other stakeholder in whole or a portion thereof. As discussed elsewhere herein, a search engine may be configured to facilitate a customized search based on user and property attributes for each house.

Certain of the foregoing processes may be utilized to determine what house (or other physical resource) attributes are more significant in making a house (or other physical resource) attractive to potential users at different share values. Those attributes may then be advantageously used to identify other houses with similar attributes that are likely to be attractive to potential share purchasers. Such identified houses may then be offered to potential stakeholders as described elsewhere herein.

For example, the common attributes of houses for which shares were purchased may be identified. In addition, the speed at which the shares were purchased may be taken into account. For example, common attributes of houses whose shares sold within a first amount of time (e.g., 30 days) may be identified that are not present in houses that sold in a second amount of time (e.g., greater than 30 days).

Graph theory may be applied to determine the connectedness between different houses. Attributes of a given house may be rated, and such attributes can be compared with that of other houses (e.g., houses which may be potentially offered to potential stakeholders) to determine how similar the houses are. Houses can then be placed into a network, with each house placed on a node, and edges between similar houses, and rating how strong the tie is between two houses.

When a house has its shares sell quickly, the system may identify other houses (that have not yet been purchased or reserved to offer for sale to potential share purchasers) that have the strongest edges to the quickly selling house. Optionally, a score may be generated using the attributes (where certain attributes may optionally be weighted and/or normalized differently) and/or based on the edge strength, where the score indicates an aggregate measure of the house suitability for co-ownership and/or as a rental property as discussed herein. Such identified house may then be offered for sale as similarly described above (e.g., where shares may be sold to multiple users to provide fractional ownership interests). Optionally, a house may need to have at least a threshold score in order to be considered suitable for a time slice shared home. If the identified house sells quickly as well, then the attributes common with the original house may be weighted more heavily as being attractive to potential purchasers. If the identified house sells significantly more slowly, then the attributes common with the original house may be weighted less heavily, indicating that such attributes may be less attractive to potential purchasers. Thus, the graph may be utilized to assist in identifying which houses should be offered to users.

Optionally, certain categories of houses (e.g., standalone houses, townhouses, condominiums, flats, etc.) may be considered separately from other categories of houses when identifying houses that may be attractive to purchasers. For example, certain houses may be categorized as being intended for rent (e.g., for a recurring period of time over a given time frame as described herein) and certain houses may be categorized as not being intended for rent. Thus, different attributes may be analyzed for houses categorized as being intended for rent than those houses categorized as not being intended for rent. By way of example, attributes relevant for determining the attractiveness of a house intended for rent (e.g., where a renter may have the rights to reserve and use a house as similarly described herein with respect to a share owner) may include whether house rentals are permitted, the minimum number of consecutive days a local rules (e.g., homeowner association, master planned community, and/or governmental rules) require a house to be rented (if the house is to be rented at all), the maximum number of times a house can be rented to different renters a year, whether signage is required indicating that the house is being rented (e.g., on a short term basis), and/or the like. The foregoing attributes may not be relevant when determining the attractiveness of a house to purchasers that is not intended to be rented and so may be excluded when determining the suitability of a house from acquisition.

Optionally, crowdsourcing may be used in identifying houses to offer for fractionalized ownership. For example, a tool may be provided that sits on top of a real estate website offering houses for sale in the traditional non-fractionalized sale method. The tool may be provided via JavaScript embedded in or called by the real estate website webpage or the tool may be provided via a browser extension. The tool may calculate a share price for a house identified on the real estate website webpage for different scenarios (e.g., assuming that there are 2 shares, 4 shares, 6 shares, 8 shares, etc.) based on the listed house price, estimate cost of housing and amenities (which may be based on the house's listed square footage, the number of bedrooms, the number and types of other rooms, etc.), the cost associated with forming the entity acquiring the house (e.g., a limited liability company), etc.

When searching for properties that may be suitable for co-ownership and/or as a rental property as described herein, ignoring certain contextual data may provide less relevant search results, or the search results may not be correctly ranked in order of relevance. Further, simply providing a ranked listing of identified properties (with or without images of the property) may not provide sufficient information as to the suitability of the property from co-ownership or as a rental property.

Described herein are methods and systems for conducting searches for properties that take into account context information. An aspect of the disclosure further relates to generating visual data that graphically and/or textually conveys information regarding the suitability of a given property for co-ownership and/or as a rental property. Such visual data may be presented in or accessed via search results, or may otherwise be presented or accessed.

In order to aid in the determination as to the suitability of a property or an area for a co-owned property or as a rental property, optionally, an artificial intelligence/learning engine may be configured to model a specific geographic area's risk with regards to local neighbor sentiment toward the operation of a time slice shared home or a rental property. For example, the model may utilize public sources and proprietary data sources to accurately and efficiently model a geographic area's suitability for time slice shared homes or rental properties.

By way of illustration, the geographic area may optionally be sized based on population density or housing density in a given area. For example, the geographic area may be 1-4 houses adjacent to a given housing unit (e.g., where the housing unit is a freestanding house), may be one side of a city block on which the housing unit is located, may be a full city block, may be several blocks, may be a neighborhood, may be a zip code, etc. Where the housing unit is in a multiunit building (e.g., a condominium, a townhouse, an apartment, a hotel with residential units, etc.), the geographic area may the floor in which the housing unit is located, the building in which the housing unit is located, the complex in which the housing unit is located (where the housing unit is located in a multibuilding complex), etc.

By way of further illustration, the model may utilize large quantities of publicly available (e.g., data from commercial, state, county, city, and/or federal government databases) optionally in conjunction with proprietary in-house generated data to generate a weighted score of local geographic level risk within a given geographical area.

For example, the model may generate or predict local geographic level risk based on some or all of the following data (it being understood that while reference may be made to median values or average values herein, other central tendencies may be used), where a given type of data may be weighted to reflect its relative importance in generating the geographic level risk:

- the size of the local geographic area,
- the total number of housing units (including freestanding houses and housing units in multiunit buildings),
- the total number houses (e.g., free standing houses),
- the total number of apartments,
- the total number of housing units in multiunit buildings that are or are available for owner occupancy,
- the number of housing units in the area that are owner occupied,
- the percentage of homes in the area that are owner occupied,
- the number and/or percentage of housing units in the area that are short term rentals (e.g., less than a threshold period of time, such as one month or less, three months or less, etc.),
- the number and/or percentage of housing units in the area that are longer term rentals (e.g., greater than a threshold period of time, such as one month or less, three months or less, etc.),
- the distribution/density of homes in the area that are owner occupied,
- the median value of owner-occupied housing units,
- the price trends of housing units (e.g., a percentage increase or decrease in prices for sold housing units and/or the asking prices for housing units over a period of time (e.g., the past month, the past six months, the past year, etc.),
- the rental price trends of rental housing units (e.g., a percentage increase or decrease in prices for rent for housing units and/or the asking prices for rent for housing units over a period of time (e.g., the past month, the past six months, the past year, etc.),
- the median amount of time housing units offered for sale remain on the market unsold,
- the median amount of time housing units offered for rent remain on the market unrented,
- the median inventory age of housing units,
- the vacation home density,
- legal limitations on vacation home density (e.g., a required buffer of a specified distance between vacation homes),
- the median monthly owner costs (excluding mortgage costs) of housing unit,
- the median mortgage size of housing units,
- the median gross rent for rented housing units,
- the number of building permits for housing issued within a specified time period (e.g., the current and/or past year),
- the median lot sizes zoned for housing units,
- the median housing unit sizes,
- consumer preference index(es) (preferred community amenity rankings and variations by market area and buyer segments, housing types prospects are most interested in buying, preferred locations for potential new housing unit buyers, purchase motivations among different household types/market segments, etc.),
- whether the short term (e.g., less than a threshold period of time, such as less than a week, less than a month, less than 6 months, or other time frame) and/or long term rental (e.g., greater than a threshold period of time, such as less than a week, less than a month, less than 6 months, or other time frame) of houses is permitted,
- whether a license or permit is needed to rent a house (e.g., for short term rentals of less than a threshold period of time or for any rental), and if so, whether such licenses are still available or if the maximum number of permitted licenses has already been reached (or almost reached, such where there are only 1, 2, 3, 4, or 5 licenses left, or other threshold number of licenses left),
- a limit on the number of licenses or permits needed to rent a house (e.g., for short term rentals of less than a threshold period of time or for any rental),
- whether there are disclosure requirements (e.g., sign posting requirements) for short term and/or long term rentals,
- whether there is a waiting period (e.g., 1 year, 3 years, 5 years) after purchasing a house before the house may be rented (e.g., on a short term and/or long term basis),
- whether there are fees (e.g., governmental, master planned community, and/or homeowner association fees, such as taxes, license fees, etc.) associated with the renting of houses, and if so, the fee amounts,
- whether there is a limit on the maximum number of different renters permitted over a specified time frame (e.g., 6 months, one year, etc.), and/or
- the demographics of the local geographic area.

For example, the demographics of the local geographic area may include one or more of:
  total population,
  population density,
  number of households,
  median household income,
  household income distribution,
  median household size,
  median number of adults per household,
  median number of children/minors per household,
  percentage of households living in same housing unit for more than a threshold period of time (e.g., more than one year),
  percentage of households that have broadband access,
  percentage of households that speak languages other than English,
  percentage of residents above a specified age (e.g., 25 years old) that are high school graduates,
  percentage of residents above a specified age (e.g., 25 years old) that have bachelor degrees or higher,
  percentage of residents above a specified age (e.g., 25 years old) that have post-graduate degrees,
  percentage of adults in workforce,
  mean time travel to work,
  median household income,
  per capita income,
  percentage of female persons,
  percentage of male persons,
  percentage of population in respective age categories (e.g., under 5 years of age, between 5-17 years of age, between 18-65 years of age, over 65 years of age, etc.).

Certain example aspects will now be described with reference to the figures.

An example system architecture that may be utilized to perform services described herein (e.g., search services, risk scoring services, matching services, special date prediction services, graphing services, and/or other services described herein) will now be discussed with reference to FIG. 1A. The various systems and devices may communicate with each other over one or wired and/or wireless networks 100 (e.g., the Internet, Ethernet, or other wide area or local area network). In the illustrated embodiment, a resource evaluation, search and matching system 102 may be hosted on one or more servers. The resource evaluation, search and matching system 102 may be cloud-based and may be accessed by one or more user computer systems 110, 112, 114 over the network 100. User computer systems 110, 112, 114 and data source computer systems 104, 106, 108 may be able to share software applications, computing resources, and data storage provided by the resource evaluation, search and matching system 102.

The user computer systems 110, 112, 114 and data source computer systems 104, 106, 108 may be in the form of a desktop computer, laptop computer, tablet computer, mobile phone, smart television, dedicated server system, cloud-based system, and/or other computing system. The data source systems 110, 112, 114 may supply various items of data discussed herein, such as data that may be used to determine attributes associated with a physical resource (e.g., a house), a geographical area (e.g., demographics, housing unit data, and/or other data described herein) and/or attributes associated with a user searching for physical resources. By way of illustrated example, the data source systems may include GIS databases, map databases, tax databases, permitting databases, weather databases, demographic databases, real estate databases, census databases, and so on. The data may be pushed by the data source systems (e.g., in real time in response to new data, or on a scheduled basis), or the data may be requested by the resource evaluation, search and matching system 102 (e.g., on a scheduled basis or in response to a user requesting data, such as a risk score).

A user computer system and a data source computer system may include user input and output devices, such as displays (touch or non-touch displays), speakers, microphones, trackpads, mice, pen input, printers, haptic feedback devices, cameras, and the like. A user system or data source computer system may include wireless and/or wired network interfaces via which the computer systems may communicate with each other or the resource evaluation, search and matching system 102 over one or more networks.

User interfaces described herein are optionally configured to present data (optionally in real time) from sources described herein and to receive user commands, which may optionally be executed by the resource evaluation, search and matching system 102 in real time or in batch mode.

A client (e.g., a system browser or a dedicated network resource access application hosted by a user computer system) may initiate a handshaking message to the resource evaluation, search and matching system 102. The handshaking message may identify the cipher suites supported by the client and other cryptographic information (e.g., the maximum supported version of transport layer security or secure sockets layer, the client's order of preference). The handshaking message may optionally identify data compression methods supported by the user computer system. The handshaking message may include a random byte string that may be used in generating encryption keys.

The resource evaluation, search and matching system 102 may respond to the client with a handshaking signal which identifies the cipher suite suit and encryption version (selected from those identified in the client handshaking message) that will be used. The resource evaluation, search and matching system 102 message may also include a session ID and another random byte string. The resource evaluation, search and matching system 102 may additionally transmit its digital certificate. The resource evaluation, search and matching system 102 may also transmit a client certificate request that identifies the types of certificates supported and the Distinguished Names of acceptable Certification Authorities (CAs), which the client may verify.

The random byte string transmitted by the client to the resource evaluation, search and matching system 102 may be utilized by both the client and the resource evaluation, search and matching system 102 to generate a secret key that may be used for encrypting subsequent message data. Asymmetric encryption may be utilized to generate a shared secret key. The random byte string itself may be encrypted with the resource evaluation, search and matching system 102's public key.

By way of further example, a given item of data may be encrypted using an AES-128 key or public key cryptography/asymmetric cryptography. If symmetric encryption is used, then the encryption key and the decryption key may be the same key. If public key cryptography/asymmetric cryptography is used, then a public key may be used to encrypt the data and a private key may be generated to decrypt the data. Thus, communications described herein between a user device and a remote system may be performed using the foregoing secure communication technological techniques.

Optionally, a version of the user interfaces described herein may be enhanced for use with a small touch screen (e.g., 4 to 13 inches diagonal), such as that of a mobile phone or a tablet computer. For example, the orientation of the controls may be relatively more vertical rather than horizontal to reflect the height/width ratio of a typical mobile device display. Further, the user interfaces may utilize contextual controls that are displayed in response to an inferred user desire, rather than displaying a large number of tiny controls at the same time (which would make them hard to select or manipulate using a finger).

Figure 1B:
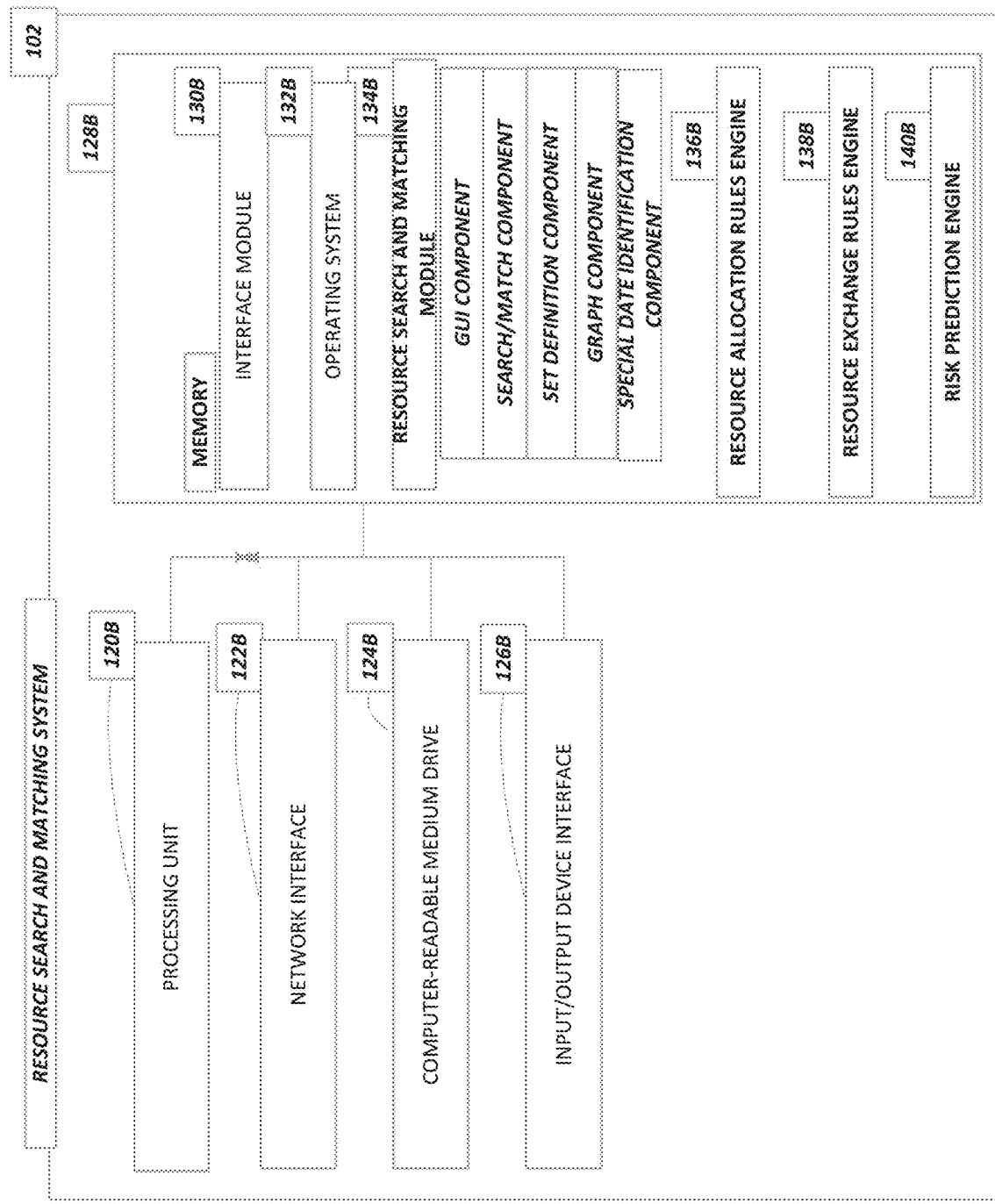
FIG. 1B illustrates an example resource search system architecture.

FIG. 1B depicts a block diagram illustrating an embodiment of example components of the example resource evaluation, search and matching system 102 hosting a resource search and matching system module 134B, a resource allocation rules engine 136B configured to manage reservation requests (e.g., as similarly described elsewhere herein), and a resource exchange rules engine 138B configured to manage the exchange of shares in properties amount users and/or the exchange of time usage of properties (e.g., as similarly described elsewhere herein). The system includes an arrangement of computer hardware and software components that may be used to implement aspects of the present disclosure. Those skilled in the art will appreciate that the example components may include more (or fewer) components than those depicted in FIG. 1B.

The rules engine 136B may be in the form of a forward chaining inference engine configured to execute rules in the form of "If-Then" statements where the "If" part corresponds to the condition and the "Then" part corresponds to the action of the rule (e.g., the acceptance or blocking of a reservation for a resource). The inference engine may be configured to execute rules in a stateless manner in response to a user attempting to make a resource reservation or in response to being invoked by another application. The rules engine 136B may comprise an artificial intelligence machine learning engine machine learning system that improves the allocation of resources (e.g., properties) among resource consumers (e.g., shareholders or other types of property owners) in accordance with various parameters and constraints. For example, the rules engine may generate a ranking for resource consumers that may be utilized in prioritizing the allocation of resource utilization among such resource consumers.

The rules engine 136B may be configured to register, define, classify, and manage reservation-related rules, verify consistency of rules definitions ("the minimum reservation time is 5 days, and the "maximum reservation time is 4 days" may be determined to be inconsistent), define inter-rule relationships, and where applicable, relate certain rules to other applications (e.g., communication applications) used to enforce rules or to carry out actions dictated by one or more rules.

A risk prediction engine 140B may be configured to predict how likely people within a specified geographic area are likely to object to having a vacation property (e.g., a housing unit) within the area that is co-owned (e.g., owned by an entity that has multiple shareholders) and/or a rental property and to generate a corresponding neighborhood score, where the shareholders or future renters have certain access rights to the property. The risk prediction engine 140B may include an artificial intelligence/learning engine, such as a neural network, an expert system, a rules-based systems, and/or a support vector machine. The risk prediction engine 140B may take into account such information as the percentage of housing units that are owner occupied, the age of the housing unit inventory, pricing trends for housing units, vacation home densities, demographics, preference indexes, and/or other data described herein.

The prediction engine 140B neural network may be trained in a supervised manner on a set of training data in order to determine network weights so as to reduce error/loss using an error/loss function. The training may involve providing the neural network with training data (e.g., the percentage of housing units that are owner occupied, the age of the housing unit inventory, pricing trends for housing units, rental trends for housing units, percentage of long term rentals, percentage of short term rentals, vacation home densities, demographics, and/or other data described herein) for a specific geographic area in which a co-owned vacation property and/or rental property is present, the prediction may be compared to actual surveys of neighbors reaction to the co-owned vacation home or rental property, and the difference between the prediction and the survey results (e.g., determined using an error function) may be used to backpropagate adjustment in the neural network node weights.

A geographic information system (GIS) 142B may be configured to analyze data disclosed herein (e.g., the percentage of housing units that are owner occupied, the age of the housing unit inventory, pricing trends for housing units, rental trends for housing units, percentage of long term rentals, percentage of short term rentals, vacation home densities, demographics, indications of whether there are restrictions on short term and/or long term rentals (e.g., whether: the short term (e.g., less than a threshold period of time, such as less than a week, less than a month, less than 6 months, or other time frame) and/or long term rental of houses is permitted; a license or permit is needed to rent a house (e.g., for short term rentals of less than a threshold period of time or for any rental); there is a limit on the number of licenses or permits needed to rent a house (e.g., for short term rentals of less than a threshold period of time or for any rental); there are disclosure requirements for short term and/or long term rentals; there is a waiting period (e.g., 1 year, 3 years, 5 years) after purchasing a house before the house may be rented (e.g., on a short term and/or long term basis); there are fees associated with the renting of houses), and the fee amounts; there is a limit on the maximum number of different renters permitted over a specified time frame (e.g., 6 months, one year, etc.)), and/or other data described herein), and create maps reflecting such data.

For example, the GIS 142B may connect data to a map (e.g., of a local geographic area where one or more potential housing unit candidates for co-ownership or for a rental property are located), integrating location data with descriptive information and data, such as that described herein, as well as a prediction score risk with regards to local neighbor sentiment toward the operation of co-owned housing units or rental units. Such maps may enable the likelihood of acceptance by residents of a local geographic area of a co-owned vacation residence or rental property to be more quickly and better understood and evaluated. The generated maps may include two dimensional maps and/or three dimensional maps.

Advantageously, a three dimensional GIS map may provide enhanced depth into data collection and analysis by incorporating a third map axis (e.g., a z-value). For example, the third dimension may be physical elevation, age of housing stock, housing unit valuation, housing unit rent, length of lease, housing density, lot size, median lot size, housing unit size, median housing unit size, vacation home density, size of buffer areas required about a vacation home (where another vacation home is not permitted within the buffer area), and/or other data discussed herein.

The system hosting the resource search and matching system module 134B may include one or more processing units 120B (e.g., a general purpose processor and/or a high speed graphics processor with integrated transform, lighting, triangle setup/clipping, and/or rendering engines), one or more network interfaces 122B, a non-transitory computer-readable medium drive 124B, and an input/output device interface 126B, all of which may communicate with one another by way of one or more communication buses.

The network interface 122B may provide connectivity to and communications with one or more networks or computing systems (e.g., one or more of the systems illustrated in FIG. 1A). The processing unit 120B may thus communicate information and instructions to and/or from other computing devices, systems, or services via a network. The processing unit 120B may also communicate to and from memory 124B and further provide output information via the input/output device interface 126B. The input/output device interface 126B may also accept input from one or more input devices, such as a keyboard, mouse, digital pen, touch screen, microphone, camera, other sensors, etc.

The memory 128B may contain computer program instructions that the processing unit 120B may execute in order to implement one or more aspects of the present disclosure. The memory 128B generally includes RAM, ROM (and variants thereof, such as EEPROM) and/or other persistent or non-transitory computer-readable storage media. The memory 128B may store an operating system 132B that provides computer program instructions for use by the processing unit 120B in the general administration and operation of the resource search and matching system module 134B, including its components.

The resource search and matching system module 134B may include a GUI component configured to generate graphical user interfaces which may be displayed on user systems, a search component configured to perform search functions as described herein, a matching component configured to perform matching functions as described herein, a graph component configure to perform graph functions as described herein, and a special date component configured to predict special dates for a given house stakeholder (e.g., a shareholder), for all house stakeholder, and/or for stakeholder of multiple houses.

The memory 128B may store user accounts including user preferences, explicitly provided data, inferred data, demographic data, share ownership data, user reservation data, user-specific special dates, user contact information, and/or other user data discussed herein. The user reservation data may include pending reservations, confirmed reservations, past reservations, and/or canceled reservations. Optionally, in addition or instead, the data may be stored remotely on a cloud-based or other networked data store. The account data may optionally be stored in a relational database, an SQL database, a NOSQL database, a hierarchical database, an object oriented database, a graph database, and/or other database type.

The memory 128B may include an interface module 130B. The interface module 130B can be configured to facilitate generating one or more interfaces through which a compatible computing device may send data to, or it may receive data from the resource search and matching module 134B, rules engine 136B and/or the exchange rules engine 138B.

The system 102 may be configured to generate or have generated access codes for respective properties. Optionally, a new access code may be generated for each confirmed reservation for a given property. The system 102 may be configured to transmit the access code to a given user for a property reservation within a specified period of time. The system 102 may be further configured to program property locking systems to accept specified access codes and to grant user access to a given property in response to receiving a valid access code. The access code may then be entered by the user to a property locking system to access the property during the user's reservation.

The modules or components described above may also include additional modules or may be implemented by computing devices that may not be depicted in FIGS. 1A and 1B. For example, although the interface module 130B and the resource search and matching module 134B are identified in FIG. 1B as single modules, the modules may be implemented by two or more modules and in a distributed manner. By way of further example, the processing unit 120B may include a general purpose processor and a graphics processing unit (GPU). The system hosting the resource search and matching module 134B may offload compute-intensive portions of the applications to the GPU, while other code may run on the general purpose processor. The GPU may include hundreds or thousands of core processors configured to process tasks in parallel. The GPU may include high speed memory dedicated for graphics processing tasks. As another example, the system hosting the resource search and matching system module 134B and its components can be implemented by network servers, application servers, cloud-base systems, database servers, combinations of the same, or the like, configured to facilitate data transmission to and from data stores, and other party systems via one or more networks. Accordingly, the depictions of the modules are illustrative in nature.

Figure 1C:
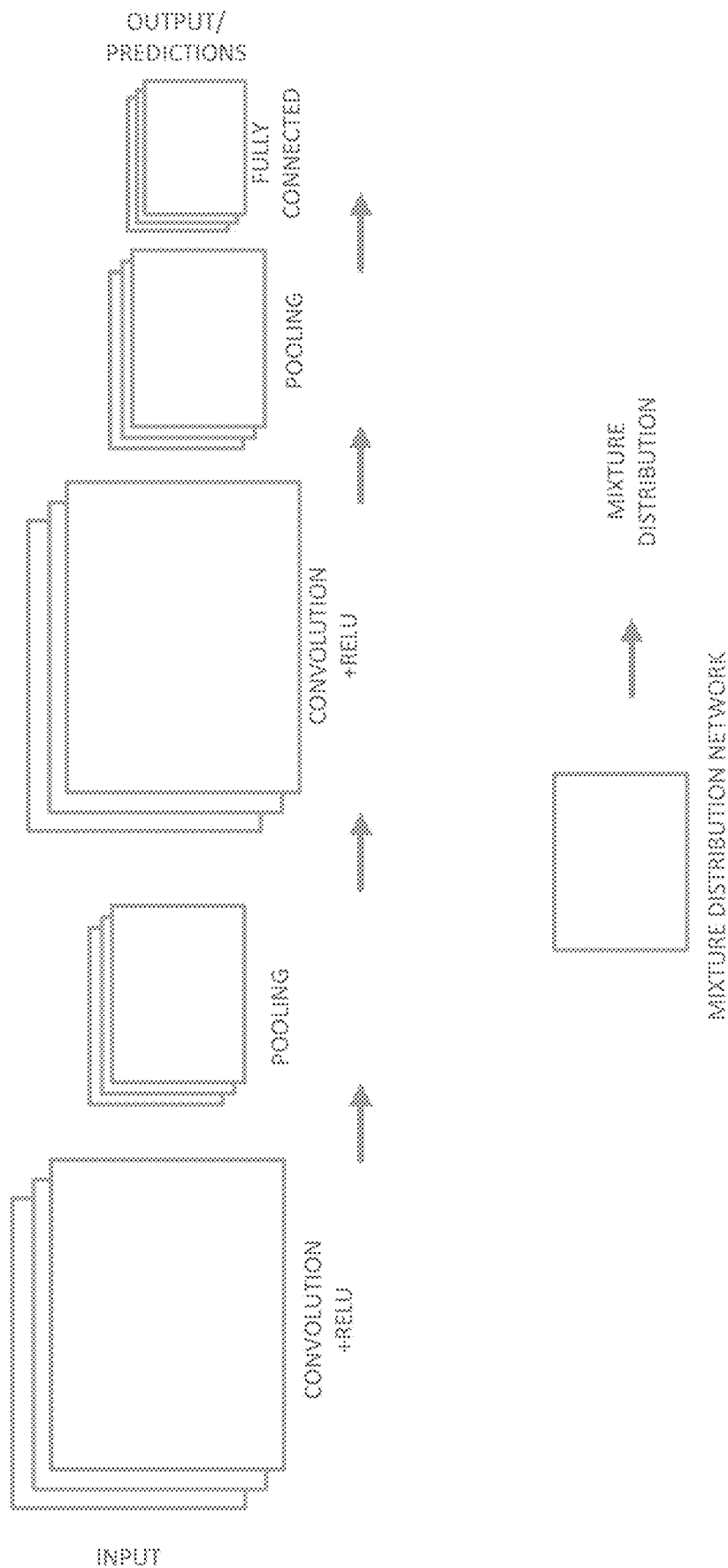
FIG. 1C illustrates an example convolutional neural network architecture.

Referring now to FIG. 1C, an example convolutional neural network architecture is illustrated. As discussed herein, a neural network may be used to identify and match users with physical resources, perform computer vision operations (identify and classify objects, such as furniture), and may be used to automatically identify an architectural style of a house. By way of further example, a neural network may be utilized to determine how suitable a geographical area would be for a co-owned vacation property or for a rental property, such as discussed elsewhere herein, and to generate a corresponding score. By way of illustration, a neural network may be utilized to determine the risk that neighbors would object to the presence of a co-owned vacation home or rental property in their neighborhood, and to generate a corresponding score as discussed elsewhere herein.

In this example, the neural network includes convolution+ReLU layers, which together with the pooling layers act as feature extractors. For example, the convolution+ReLU layers, together with the pooling layers, may act as feature extractors with respect to an input image (e.g., an image of an exterior or interior of a house), and the fully connected layer acts as a classifier. There may be more or fewer layers than those illustrated in FIG. 1C. Further, there does not need to be a pooling layer for each convolution+ReLU layer.

The convolutional neural network may be trained (e.g., to classify features in an image, to predict the suitability of a housing unit for a co-owned vacation home or rental property, or to predict local neighbor sentiment toward the operation of co-owned properties (e.g., vacation homes) or rental property within their neighborhood). The neural network filters and weights may be initialized with random values. Where a neural network is to be used to identify and tag features (e.g., furniture) in an image of a housing unit, a training image may be used as an input to train the neural network to perform such identification and tagging. A forward propagation step may be performed (e.g., convolution, ReLU, and pooling operations, and forward propagation in the fully connected layer) and the convolutional neural network may generate output probabilities for each class. The total error at the output layer may be calculated using an error function. Backpropagation may be used to update filter values and node weights to reduce or minimize the output error. The weights may be adjusted in proportion to their contribution to the total error. This process may be repeated for multiple training images (e.g., images of houses or furnishings) so as to train the convolutional neural network to correctly identify image objects.

Optionally, a neural network may be configured as a long short-term memory (LSTM) neural network, as described elsewhere herein, to model local neighbor sentiment toward the operation of co-owned properties or rental property within a neighborhood and to generate a corresponding score.

Optionally, a Mixture Density Network (MDN) may be utilized to provide confidence information in a prediction (e.g., an indication of the uncertainty in a prediction), such as the standard deviation of the expected probability distribution. Thus, the MDN may provide probabilistic regression for uncertainty estimation (e.g., in the prediction that residents will object to or accept the presence of a co-owned vacation housing unit or rental unit in a geographical area). The MDN may include a neural network and a mixture model. The mixture model may comprise a model of probability distributions using a weighted sum of more simple distributions. The loss function being minimized may be a negative log likelihood function or a maximum likelihood estimation function, by way of example.

Figure 1D:
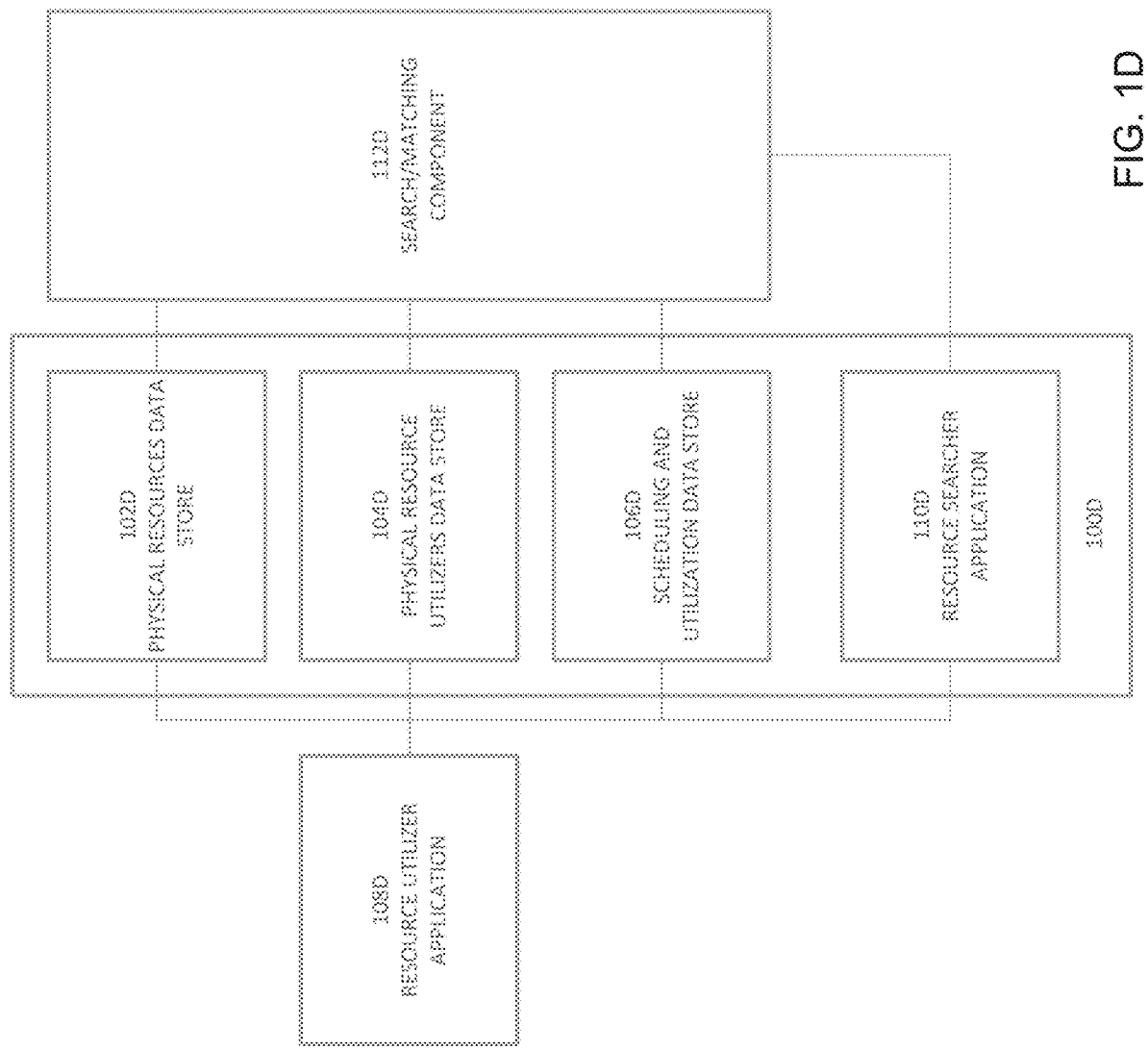
FIG. 1D illustrates an example data storage architecture.

FIG. 1D illustrates an example data storage architecture. A data store 100D may include one or more databases that store one or more records. The stored data may be used by various processes described herein. For example, the data may be used in search for matching physical resources for a user, such as a user having a resource searcher/matching application 110D installed on the user's device or accessed via a browser. By way of illustration, a user may be searching for a property in which the user may acquire a share, as discussed elsewhere herein. The search may be performed using the search/matching component 112D. The search and matching process may use historical and predicted scheduling data, existing share owner data, property attributes, and/or searcher data in identifying potential property matches.

By way of further example, the data may be used to predict dates of high utilization for a given physical resource and provide such predictions via a resource utilizer application 108D. For example, the resource utilizer may own a share in a property as discussed elsewhere herein. The resource utilizer application 108D may also be used to reserve a property in which the user owns a share.

A physical resource data store 102D may include details/attributes regarding various resources, such as residences/properties. For example, physical resource data store 102D may store for one or more properties some or all of the following data: geographic location, location type (e.g., coast, lake, river, mountain, river, canyon, etc.), house value, cost of a share in the house, number of shares in the house, average income of households in neighborhood, elevation, architectural style, total square footage of the house, total square footage of the property, number of floors, number and size of bedrooms, bedroom configurations, number and size of bathrooms, bathroom configurations, location of the master bedroom, whether the house has certain types of rooms and their size, number of fireplaces, existence and size of backyard, existence and size a swimming pool, existence and size of a hot tub, existence and size of a basketball court, existence and size of a tennis court, whether there is a fenced yard, the existence and type of views, weather data for different months and/or seasons, the distance to neighboring houses, the distance from ski slopes and/or other winter sport locations, the distance from hiking trails, the distance from boating areas, the distance from shopping areas, the distance from cultural institutions, the distance from airports, the extent of public transportation, whether shares in the property may be exchanged for shares in another property, whether usage time in the property may be exchanged for usage time in another property, and/or other attributes.

A physical resource utilizers data store 104D may store details/attributes regarding physical resource utilizers, such as owners of shares in a given property. For example, the data may include the number of persons in the share owner's family, the address/geographical location of the owner's primary residence, special dates of interests, marital/partner status, number of children, age of children, preferred sporting activities, preferred cultural activities, other user attributes disclosed herein, and/or the like.

A scheduling and utilization data store 106D may store access information (e.g., for a property), future scheduled reservations for utilization of a given property, historical scheduled reservations for utilization of a given property, historical scheduled events (e.g., concerts, festivals, concert sporting events, conventions, art shows, and/or other events that typically attract significant or very large numbers of people), future scheduled events, correlations between events and/or seasons on property reservations, and/or the like.

Figure 2:
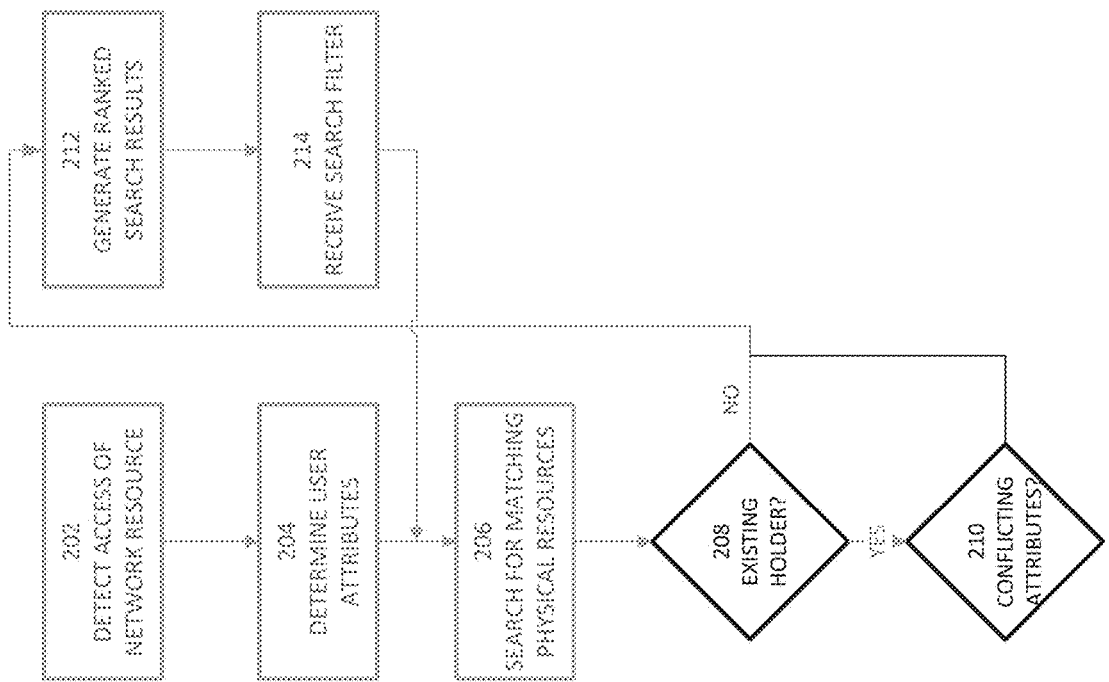
FIG. 2 illustrates an example search process.

FIG. 2 illustrates an example process for matching resource utilizers with physical resources. At block 202, the process detects that a user device is accessing a network resource, such as a webpage associated with an offer of fractional ownership of a physical resource, such as a house (which may include surrounding land). Optionally, the process will detect whether the user is already an owner of shares in a physical resource (e.g., a home) managed via the system described herein. For example, the detection may be performed using corresponding identification information (e.g., via user login information, via a user and/or device identifier received from the user device, and/or the like). The identification information may then be used to request and access a corresponding user record from a data store (e.g., a database). At block 204, certain user attributes may be determined, such as location and user characteristics from the user's browsing history. For example, GOOGLE ANALYTICS may be utilized to determine certain demographics regarding a user (e.g., age, income, etc.).

In addition, if the user is already a shareholder in a resource (e.g., a first property, such as a vacation home) managed by the system, the user attributes may include user data accessed from a user record. For example, the user data may include the date when the user acquired shares in the first property, the number of times the user utilized the vacation home, the times of year the user utilized the vacation home, how long the user stayed at the vacation home at each visit, the experiences the user signed up for at the vacation home (e.g., boating, skiing, tennis lessons, activities for pre-teens, for teenagers, for the elderly, etc.), the temperature settings by the user for the vacation home, the number of times and the time length the user turned on a hot tub and/or pool heater, food ordered to stock the first property for visits, whether the user brought a pet and the pet type, etc.

At block 206, user attributes may be utilized to search a data store of a pool of physical resources (e.g., vacation houses) whose attributes more closely correspond to the user's attributes. For example, a user's income level and location may be used, in part, to identify houses whose share prices and locations are more likely to be suitable for the user. As discussed elsewhere herein, a formula, trained neural network or other learning engine may optionally be used to identify matches. A match score may be generated that reflects the closeness of the match. If the user is seeking to exchange shares in an existing property for those in another property (e.g., as determined by detecting the user activating a filter or other control), the search may be limited to those properties that are eligible for share exchange. If all properties are eligible for share exchange, then such limitation may not be applied. By way of further example, filters may be applied to exclude from search results physical resources, such as houses, that are not eligible for short term rentals and/or long terms rentals (e.g., where such rentals may prohibited by governmental, home owner associated, and/or community rules).

If there are not any or a sufficient number of user attributes available to conduct the search and identify corresponding matches in an adequate manner, optionally a default set of houses may be presented to the user in a default order (where the presented houses may optionally be limited to those that are still available for fractional ownership).

If there are sufficient user attributes available to conduct the search and identify matches in an adequate manner, at block 208, a determination may be made as to whether there are any existing stakeholders (e.g., shareholders or other users that have a fractionalized interest in a given house) in a given house. If a determination is made that there are existing stakeholders, user attributes for such holders may be accessed from a data store.

At block 210, a determination may be made that attributes associated with the existing stakeholders for the given house and that attributes associated with the user conflict. For example, a conflict may be one that makes it more likely that the user and an existing stakeholder will want to use the house at the same time (e.g., where the user and the stakeholder have children of similar ages and may have similar vacation timings). Such a conflict determination may be made using a formula, a trained neural network and/or other artificial intelligence/learning engine. The existence and/or degree of the conflict may be used to adjust or refine the corresponding match score for the given house (where the adjusted or refined match score may be a new score or may be the original score multiplied by an adjustment factor). For example, the greater the conflicts (e.g., the greater the number and weight of conflicts) the greater the reduction in a match score for the given house.

At block 212, the match scores (as modified due to conflicts) may be utilized to generate ranked search results. Optionally, the search results may be automatically filtered to eliminate houses whose match scores fall beneath a specified threshold (and so unlikely to be suitable for the user). The ranked search results may then be provided for presentation on the user device. Where the user is seeking to exchange shares in an existing property for those in another property, the process may calculate a difference (if any) between the value/price of the user's current shares and the value/price of the shares of a given house in the search result. The search result may display such difference in the corresponding search result entry for the given house, with an indication as to whether the difference is positive or negative.

At block 214, the user may provide additional search filters. Such filters may be expressly provided, such as search terms entered into a search field, or user specified house attributes or ranges of attributes (e.g., minimum number of bedrooms, presence of a pool, state in which the house is located, minimum number of shares in the house, maximum number of shares in the house, share price range, other attributes discussed herein, etc.). Certain filters may be based on user-provided data regarding the user (e.g., typical vacation dates, income, marital/partner status, number of children, age of children, preferred sporting activities, preferred cultural activities, preferred restaurant cuisines/styles, view preferences (e.g., ocean, mountain, etc.), user demographic and preference data, other user attributes disclosed herein, and/or the like). By way of further example, if the user is seeking to exchange shares in an existing property for those in another property search filters may be specified for the maximum difference (in the positive and/or negative range, where the difference=share value/price of the user's current shares minus those of the share value/price of the given house in the search results) in share value between the share value/price of the user's current shares and those of the houses in the search results.

The process may then proceed to block 206, and the process of generating and presenting ranked search results may be repeated using the filters.

Optionally, sort controls may be provided where the user can sort on one or more of the house attributes (e.g., in ascending or descending order for share price, square footage, number of bedrooms, distance from airport, or other attributes) and/or in ascending or descending order for the difference in share price relative to the share price of the user's current shares (if any).

As discussed elsewhere herein, a learning engine (e.g., a neural network) or algorithm may be utilized to predict dates that will be in high demand for a house that has multiple stakeholders whose desire to reserve the house may be in conflict. For example, as discussed above, a Long short-term memory (LSTM) neural may be used that is especially efficacious in predicting human behavior (e.g., user house reservations).

Figure 3:
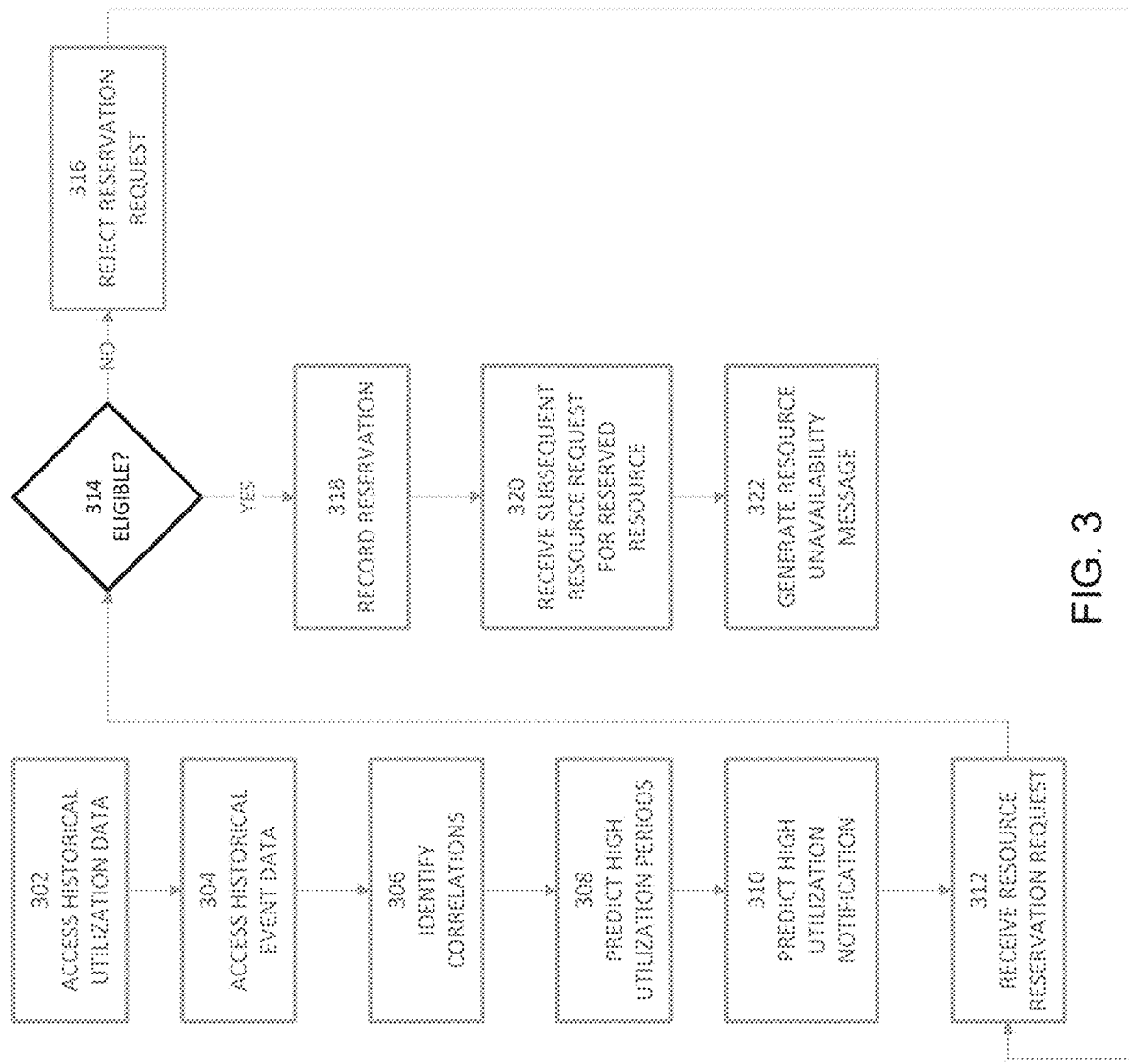
FIG. 3 illustrates a resource utilization prediction process.

FIG. 3 illustrates an example process of predicting high demand dates. At block 302, historical house utilization data for the house is accessed from a data store. Historical house utilization data may include dates reserved for the house in the past by users and/or dates that users attempted to reserve. For example, if one user reserved the house for a given date (which may include several consecutive days), and another user subsequently requested a reservation for the same date and was refused because the house was already reserved, such refused reservation may be included in the category of attempted reservation. By way of further, if one user reserved the house for a given date and other users were placed on a waitlist, each person on the waitlist may count towards attempted reservations.

At block 304, historical event data (including event types, dates, and/or time) is accessed from one or more data sources (which may be operated by third parties, such as ticketing databases, venue databases, sport team databases, museum databases, etc.). Such event data may include past concerts, festivals, sporting events, conventions, art shows, and/or other events that typically attract significant or very large numbers of people.

At block 306, correlations, if any, are identified between the historical house utilization data and the historical event data. The number of attempted reservations for a given date that corresponds to a date of an historical event, may indicate the strength of the correlation. For example, if four out of eight stakeholders reserved or attempted to reserve the house for a weekend at which a yearly music festival takes place, the process may determine that there is a strong correlation between the yearly music festival and the high demand. The correlation may be further strengthened for each year that there is high demand for the house that correlates with the occurrence of the music festival (even if the date of the music festival may vary from year to year).

At block 308, the correlations, the strength of correlations, and the dates and types of future scheduled events may be utilized to predict high utilization dates. For example, if a past recurring event is associated with high utilization demand, the process may predict that there will be high demand on a future date of the event. By way of further example, if there is historical high utilization demand for a variety of different art shows at a museum, a prediction may be made that upon the occurrence of a future art show at the museum there will be high demand.

At block 310, a high utilization notification may be generated identifying a predicted high utilization date or a set of dates (e.g., predicted high utilization date for the coming year or other selected time period). The notification may optionally indicate why the date is predicted to be a high utilization date. For example, the notification may identify an event associated with the high utilization date and may indicate that there has been high demand in the past on dates associated with the event. The notification may optionally be transmitted to all stakeholders in the house. The notification may include a control, which when activated will cause a reservation to be automatically requested for the corresponding date.

Optionally, rather than transmitting the high utilization notification to all stakeholders, the notification may first be transmitted to one, selected stakeholder. For example, the stakeholder that has had the fewest or most aged reservations for special dates may be identified, and the notification may first be transmitted to the identified stakeholder. The notification may indicate that the stakeholder has a specified limited period of time to make the reservation before other stakeholders receive the notification. If the identified stakeholder does not make the reservation within the specified time period, the notification may be transmitted to the stakeholder that has the next most aged reservations for special dates and so on, or, alternatively the notification may be transmitted to all stakeholders.

At block 312, a reservation request is received from a stakeholder (e.g., via an activation of a reservation control in the notification). At block 314, a determination is made as to whether, based on the stakeholder's reservations for future dates and/or past reservations, the stakeholder is eligible for the reservation. If it is determined that the stakeholder is ineligible for the reservation, at block 318, the reservation is rejected and the stakeholder is so notified. Optionally, prior to sending a notification to a stakeholder, a determination may be passed as to whether the stakeholder is ineligible for the reservation, and if so, the notification may be inhibited from being transmitted to the ineligible stakeholder.

If the stakeholder is eligible, at block 318, stakeholder's reservation is recorded. The stakeholder may then utilize the house for the corresponding date. If a subsequent reservation request is received from another stakeholder at block 320, at block 322 the request will be rejected and a corresponding reservation denial message may be generated and transmitted to the requesting stakeholder. Optionally, an interface may be provided via which the requesting stakeholder may request to be placed on a waiting list for the date, in the event the original requester cancels her reservation.

Figure 4:
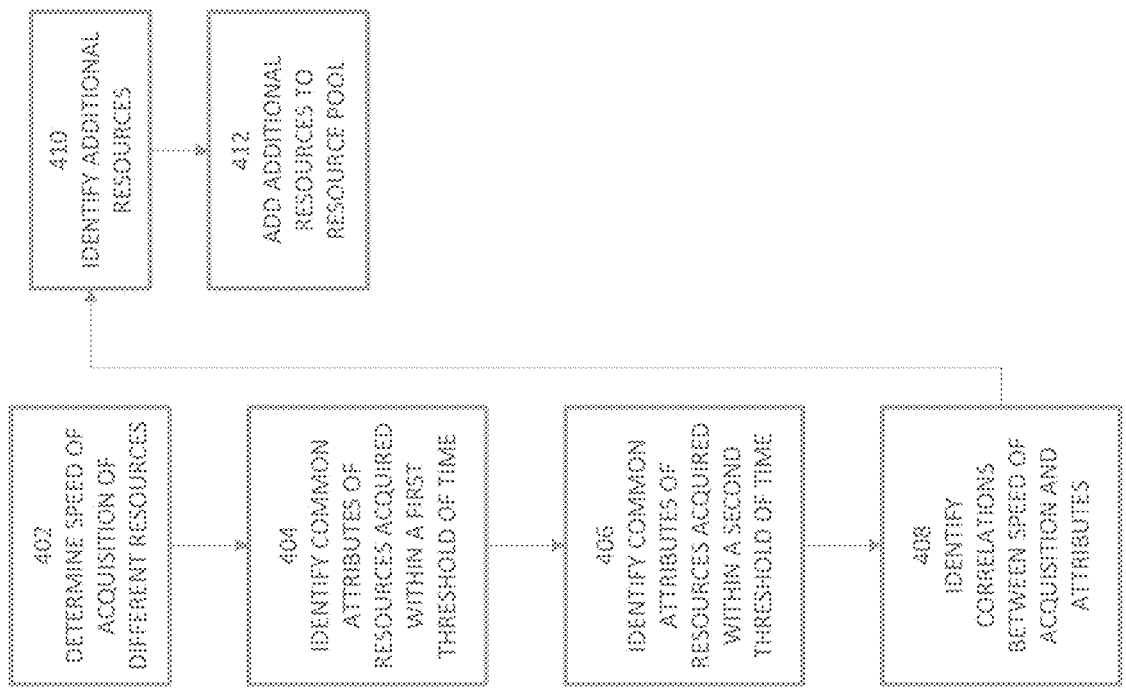
FIG. 4 illustrates an example process for identifying resources to add to a resource pool.

It may be advantageous to determine what house (or other physical resource) attributes are more significant in making a house (or other physical resource) attractive to potential users at different share values. Those attributes may then be advantageously used to identify other houses with similar attributes that are likely to be attractive to potential share purchasers (e.g., using graph theory as discussed elsewhere herein). Such identified houses may then be added to a pool of available houses and offered to potential stakeholders as described elsewhere herein. FIG. 4 illustrates such an example process.

At block 402, the acquisition history for physical resources, such as houses may be accessed from a data store. For example, the speed in which shares in different houses were purchased once posted for sale may be determined. At block 404, attributes of the different houses may be accessed from a data store.

For example, house attributes may include some or all of the following: house value, cost of a share in the house, number of shares in the house, average income of households in neighborhood, geographical location, elevation, architectural style, total square footage of the house, total square footage of the property, number of floors, number and size of bedrooms, bedroom configurations, number and size of bathrooms, bathroom configurations, location of the master bedroom, whether the house has certain types of rooms and their size, number of fireplaces, existence and size of backyard, existence and size a swimming pool, existence and size of a hot tub, existence and size of a basketball court, existence and size of a tennis court, whether there is a fenced yard, the existence and type of views, the weather, the distance to neighboring houses, the distance from ski slopes and/or other winter sport locations, the distance from hiking trails, the distance from boating areas, the distance from shopping areas, the distance from cultural institutions, the distance from airports, the extent of public transportation, or other attributes.

At block 404, common attributes may be identified for houses whose shares were sold within a first, relatively quick time period (e.g., 30 days). At block 406, common attributes may be identified for houses whose shares were sold within a second, somewhat slower time period (e.g., greater than 30 days or 31-60 days). Optionally, the same process of identifying common attributes may be determined for additional time periods (e.g., 61-90 days, 91-160 days, 161-365 days, etc.).

At block 408, correlations between the speed of share acquisition and house attributes may be determined. For example, attributes may be identified that are common to those houses that sold in the first period of time, but are not present in attributes of houses sold in a second period of time. Such attributes may then be identified as potentially contributing to the enhanced attractiveness of houses to potential acquirers of shares.

At block 410, a search may be conducted of one or more data stores (e.g., real estate databases or websites) to identify houses being offered for sale that have some or all of those attributes identified as contributing to a relatively fast sale of house shares. At block 412, one or more of such houses may be added to the resource pool of houses and shares in such houses may be offered for sale as similarly described elsewhere herein.

Certain example user interfaces will now be described that enable certain functionality described herein to be provided to users.

Figure 5:

Referring to FIG. 5, an example user interface is illustrated displaying a first set of houses. The set of houses may be selected using the process illustrated in FIG. 2 and/or may have been added to the set via the process illustrated in FIG. 4. Optionally, the set of houses may be default houses that are not selected based on user attributes.

Referring to FIG. 5, the user interface displays images, cost, number of bedrooms, number of bathrooms, and square footages of several houses. In response to the user selecting one of the houses (e.g., by clicking on a linked element, such as text or an image), the example user interface of FIG. 6 may be displayed on the user device.

The user interface illustrated in FIG. 6, may provide additional images of the selected house, the name of the house, the house address, the cost of a share in the house, the number of bedrooms in the house, the number of bathrooms in the house, and the square footage of the house. In addition or instead, other house attributes described herein may be presented. Optionally, some or all of the information presented via the user interface illustrated in FIG. 6 may also be presented via the user interface illustrated in FIG. 5.

Further, resources, such as properties that are jointly owned, or to which multiple parties have access, need to be managed to ensure predictable and equitable access to the resource. However, the parties sharing ownership or access may not be acquainted with each other, may be physically distant and may maintain disparate schedules. Accordingly, it can be challenging to institute, maintain and track a reservation system for such resources, and as a practical matter not possible without the use of computerized technical solutions.

In order to address the foregoing technical challenges, computer-based processes and systems are disclosed configured to manage resource reservations. Further, the disclosed systems and processes are configured to provide easy access to the resource reservation resources, which provide fair, equitable and intuitive access to the resources (e.g., properties) in a secure, computer resource efficient manner.

The systems and methods disclosed herein can be used in connection with a plurality of reservable resources, such as physical properties. As similarly discussed elsewhere herein, a given resource, such as a property, can be owned by a number of owners under various legal models such as shared ownership or fractional ownership, the use of syndicates operating as private member groups, etc., in which a predetermined number of shares or a percentage of ownership are sold or otherwise provided to a number of owners. Fractional ownership can also be implemented via a mezzanine structure by creating a company which owns the property, and then allowing various owners to own multiple shares in the company. Optionally, fractional ownership can be implemented by issuing shares in a tenancy-in-common basis.

Although the systems and methods disclosed herein are primarily described in conjunction with a shared ownership model, it should be understood that the systems and methods can also be used in conjunction with nearly any system or method in which access to an asset is desired to be shared, such as time shares or other similar models. The systems and methods can be used to manage access to a variety of assets, such as, by way of example, resources, such as real estate (e.g., houses, condos, apartments, vacation homes and the like), vehicles (e.g., aircraft, cars, trucks, motorcycles, other land vehicles, boats, other watercraft, computer systems, computer resources, etc.), which are collectively termed a "resource", "resources", "property" or "properties" herein.

As previously discussed, the number of shares of a resource can be set as desired or appropriate (e.g., in the range of 2-12 shares, such as 2 shares, 4 shares, 6 shares, 8 shares, 12 shares, 26 shares, or other number of shares). Where the ownership of each property is broken down by percentage instead of number of shares, it should be understood that such a percentage-based system can be considered equivalent to a number of shares by a simple conversion (e.g., 80% ownership can be considered equivalent to 8 shares of a total of 10 shares, 27% ownership can be considered equivalent to 27 shares of a total of 100 shares, etc.). Each owner of a share of a single property may own one or multiple shares of the given property. An owner can also own shares of multiple properties, but for the purpose of this description for the sake of clarity, an owner of multiple shares is assumed to refer to the owner of multiple shares of a single given property.

Optionally, a managing entity can control access to the systems and methods disclosed herein, and provide access to the systems and methods to the owners of the property. The managing entity may oversee, on behalf of the entity that owns the property (and for the benefit of the property shareholders) the operation, maintenance, repair, payment of taxes and assessments and other duties associated with the property. Optionally, the managing entity may be hired or engaged specifically for the purpose of managing the property. Optionally, the managing entity may be an owner of at least one share in the managed property, or may have some other rights or interests in the property (e.g., hold a right to repurchase shares from owners, own a right of first refusal, etc.). Optionally, the managing entity may receive a fee from the various shareholders for the services provided by the managing entity.

The managing entity can maintain and/or provide access to the system and method disclosed herein that is utilized to manage access to the property. The managing entity and/or associated system and method may also include, or have access to, a database (e.g., a relational database, or a nonSQL database) configured to store information related to the property, such as the location, address and legal boundaries, the names, addresses and other contact information for the associated owners, the number of shares and/or percent ownership of the properties by owner, the usage history of the property by owners (e.g., the dates on which each owner has reserved in the future and/or used in the past for the property), requested or future reservations, scheduling calendars, Special Date Reservations (as defined below) and other data or information described herein.

The system and method can be controlled and/or remotely hosted by the managing entity or a third party. An owner/user who desires to make a reservation or check a reservation status can access (e.g., log) into the system via an electronic device with access to the Internet, such as a computer, game console, tablet computer, smart phone, smarty watch, or other mobile or non-mobile device. Optionally, the owner may be required to log-in with their credentials or otherwise provide identification and/or authentication before proceeding. Once the owner/user has properly accessed the system and method, the owner may be enabled to make, via corresponding user interface (e.g., graphical user interface, voice user interface, etc.) a reservation for a property in which the owner has an ownership share. For example, the owner may be presented with a calendar which an owner can click on, or select, certain displayed days to enter their desired dates for reservation. In this case, the available/unavailable days may be indicated by visible indicia, such as highlighting unavailable and/or available days in differing colors. Alternatively, an owner may be able to directly enter desired dates for reservation by a keyboard, touch screen interface, drop-down menu, voice command, or the like.

Scheduling Calendar

A scheduling calendar can be accessed by the owners (e.g., shareholders) or their designees (if the system rules permit such designees), and is provided and/or maintained by the systems and methods disclosed herein. The scheduling calendar can align with the standard Gregorian calendar, for example, the month of January starts on January 1st. Optionally, depending on the location of the property or the location of a user, a non-Gregorian calendar that is commonly used at that location may be selected and presented (e.g., the Hebrew calendar for Israel, the Islamic calendar for certain Muslim countries, etc.).

The scheduling calendar can be made available to each owner, and optionally, can first be made available to each owner at or shortly after a qualifying closing event when the owner first secures legal ownership (e.g., obtains shares in the company that owns the property) of and/or proper access to the property, for example, at an escrow event. Thus, the system can detect whether certain access criteria are met, and if such access criteria are met, a user may be granted access to the reservation and calendaring user interfaces and services.

The scheduling calendar may be displayed in a table format (e.g., which each row for a month corresponds to a week, and search column corresponds to a day of the week), a linear format (where the days of a month are displayed in respective one column rows), or otherwise.

The scheduling calendar can be arranged and displayed such that only certain calendar days are available for reservation for a given property. Optionally, a rules engine (e.g., rules engine 136B) may be configured so that the range of eligible dates for reservation can be the remainder, or balance, of the then-current calendar month and extending through the same month two years out (or some other predetermined time period; the "General Reservation Time Window"). For example, if an owner accesses the scheduling calendar on Apr. 21, 2022, then the owner/shareholder may the rules engine may enable the owner/shareholder to reserve dates beginning on Apr. 21, 2022 through and including Apr. 30, 2024.

By way of example, a month's worth of booking dates may become open for reservation/booking on the first day of each month at a specific time (e.g., 12 p.m.) local property time. Thus, the rules engine may determine the current date at the property location and the current time at the property location (e.g., based on the property location time zone) and determine if a month's worth of booking dates may be made available for reservation/booking by owners. For example, on May 1, 2022, at 12 p.m. local time, the entire month of May 2024 becomes open and available for reservation. By way of example, the General Reservation Time Window can range from 12 months to 36 months but can be varied as desired.

In some cases, it may be desired to restrict the short term access of the owners to certain dates in order to allow sufficient processing time and preparation of the property. Optionally, the rules engine may be configured to exclude the current day from being booked/reserved, or by way of further example, exclude the current day plus one additional day, or, by way of yet further example, exclude the current day plus two days from being booked/reserved. In the example where the current day plus two days is excluded from being booked/reserved, for an owner accessing the system on Apr. 21, 2022, the first day that the owner would be able to reserve the property would be on Apr. 23, 2022.

General Reservations

The system and rules engine may be configured such that the number of General Reservations that can be held by an owner at any one time is limited by the rules engine to a threshold number of reservations based (in whole or in part) upon the number of shares owned by that owner. General Reservations are defined herein as reservations which are not "Short Notice Reservations," which will be defined in greater detail below. However, Short Notice Reservations are, generally speaking, reservations which are made sufficiently close to the projected arrival date (e.g., within a threshold period of time before the arrival date and/or time). Accordingly, a General Reservation is one in which the reservation exceeds the Short Notice Period (which is seven nights in one case). Optionally, there may be other types of reservations which are not General Reservations.

The rules engine may be configured to enforce a rule such that General Reservations must, in one case, be made for a Minimum General Reservation Stay Length and cannot exceed a Maximum General Reservation Stay Length. By way of illustrative example, the Minimum General Reservation Stay Length may optionally be set to two nights (although other time values may be used), and the Maximum General Reservation Stay Length may be varied, as described elsewhere herein. In addition, optionally, the rules engine may be configured to enforce a rule where each General Reservation must be made such that the arrival date is at least a predetermined number of days and/or hours (e.g., 2 days, 5 days, 7 days, 30 days or other specified number of days) apart from any prior departure date for that owner. Optionally, the required number of days between reservations may be based on the number of shares a shareholder has. For example, a shareholder that has two out of eight shares may have to wait half the time between reservations as compared to a shareholder that has one share.

Optionally, the rules engine may be configured to limit the number of General Reservations which can be held by an owner at any one time to a multiple of the number of shares owned by the owner (e.g., the number of General Reservations for an owner is optionally determined by multiplying the number of shares held by that owner by a Maximum General Reservation Factor). By way of non-limiting illustrative example, the Maximum General Reservation Factor is set to six by the rules engine (although other values may be used). Accordingly, an owner of one share may be permitted to hold six General Reservations at one time in that case. By way of further example, the rules engine may enable an owner of two shares to hold up to twelve General Reservations at a time. By way of further example, the rules engine may enable an owner of three shares to hold up to eighteen General Reservations at a time, and so on. Table 1 illustrates an example relationship of the number of shares and the maximum number of General Reservations where the Maximum General Reservation Factor is set to six by the rules engine.

The systems, methods, and rules engine may be configured to set the maximum length of a stay for each General Reservation (Maximum General Reservation Stay Length) based (in whole or in part) upon the number of shares of the property owned by the owner. Optionally and by way of example, the maximum length of the stay (for each General Reservation) can be determined by the following equation, which may be enforced by the rules engine:

Maximum General Reservation Stay Length=(Fixed Maximum Length Stay number)+((Maximum Length Stay Factor)×(number of shares held))

By way of illustrative example, the Fixed Maximum Length Stay number may be set via the rules engine to seven, and the Maximum Length Stay Factor may be similarly set to seven (although other values may be used). In that case, Maximum General Reservation Stay Length for an owner of one share is fourteen nights (7+(7×1)). When the owner owns, for example, four shares, the Maximum General Reservation Stay Length is thirty-five nights (7+(7×4)). Of course, these numbers/factors can vary as desired, and optionally the Fixed Maximum Length Stay, and Maximum Length Stay Factor can each be set to an integer that ranges between three and twelve.

An example of some of these calculations (which may be executed by the rules engine) and parameters is provided below in Table 1, along with various other parameters which will be discussed in greater detail below.

TABLE 1

| Shares Held | Maximum Number of General Reservations | Maximum General Reservation Stay Length | Maximum Special Date Reservations | Maximum Short-Notice Reservations | Total Stay Night Limit |
|---|---|---|---|---|---|
|  | 6 | 14 nights | 1 | 1 | 44 nights |
| 2 | 12 | 21 nights | 2 | 1 | 88 nights |
| 3 | 18 | 28 nights | 3 | 1 | 132 nights |
| 4+ | 24+ | 35+ nights | 4+ | 1 | 176+ nights |

Optionally, sufficiently extended length reservations can be counted as multiple reservations by the rules engine. By way of illustrative example, the number of reservations can be calculated using the rules engine by dividing the length of the stay by an Excessive Length Stay Factor, and counting any remainder as another whole number. By way of illustrative example, the Excessive Length Stay Factor may be set to seven nights. In that case then, a six night reservation is counted as one reservation; a seven night reservation is counted as one reservation; a ten night reservation is counted as two reservations, a fourteen night reservation is counted as two reservations, a twenty-one night stay is counted as three reservations, a twenty-two night stay is counted as four reservations, etc.

Special Date Reservations

Each property may have a defined set of Special Date Reservations which can be, in one case, reservations for dates/nights of expected high demand for the property. Optionally, different Special Date Reservations may be set for different properties and/or for different governmental areas (e.g., for different countries or states which may have different holidays). For example, the Special Date Reservations can generally correspond to, but may not necessarily exactly match, major U.S. federal holidays. The dates of Special Date Reservations can also be added or removed by owners of the property, for example a super majority (75% in one case) of voting by shares. The rules engine may be configured to access such dates from the calendar.

Optionally, each Special Date Reservation must be made at least a Special Date Reservation Spacing Period apart from any other reservations for that owner for the property. By way of example, the Special Date Reservation Spacing Period can be set in the rules engine to seven nights, but the length of this period can be varied as desired (e.g., 3 nights, 14 nights, etc.).

Special Date Reservations may have a particular set of rules implemented via a rules engine to ensure that all owners of the property are provided fair and equitable access to the Special Date Reservations, taking into account their number of shares. Accordingly, optionally the number of Special Date Reservations that an owner can hold at any one time is based (in whole or in part) upon their number of shares multiplied by a Special Date Reservation Factor. By way of illustrative example, the Special Date Reservation Factor may be set to one. In this case, for example, an owner of one share may hold up to one Special Date reservation, an owner with two shares may hold up to two Special Date Reservations, etc. The Special Date Reservation Factor can vary as desired (e.g., 2, 3, 4, or other value).

The Excessive Length Stay Factor, described above in the context of General Reservations, may also apply to Special Date Reservations. For example, when the Excessive Length Stay Factor is set to seven, a Special Night Reservation (e.g., any reservation that includes a special date/night) that is between eight nights and fourteen nights long can be counted as two reservations, a Special Night Reservation that is between twenty-one nights and twenty-seven nights long can be counted as three reservations, etc.

When a Special Date Reservation initially exceeds the Excessive Length Stay Factor (e.g., is for fourteen nights), but is then broken down into smaller reservations (e.g., two seven night stays), then in one case only the shorter reservation(s), that includes a special date/night, may be counted as a Special Night Reservation. Such a division of a reservation that exceeds the Excessive Length Stay Factor may optionally be automatically performed using a reservation reallocation algorithm. Alternatively, each of the shorter reservations, that were initially part of a Special Night Reservation at the time of making the reservation, may be counted by the rule engine as a Special Night Reservation.

As noted above, owners may be able to change the dates that correspond to a Special Date Reservation for their property. If a special date is removed such that a Special Date Reservation no longer includes a special date, then the system may be configured to no longer treat the reservation as a Special Date Reservation. In that case, any existing reservations that were formerly Special Date Reservation can be treated as General Reservations moving forward. For example, if an owner has a Special Date reservation for a property for Oct. 11, 2022, and that date is changed from a special date to a general date on Dec. 1, 2021, then the owner of a single share who has that reservation will then be eligible to make another Special Date Reservation. This helps to ensure that owners are not penalized for holding a reservation for a date that may no longer be in high demand and ensure that the property is more efficiently utilized.

If a special date is added to the calendar for the property (e.g., an existing general date is designated as a special date), optionally any existing General Reservations for the newly-designated special dates may continue to be treated as General Reservations. This helps to ensure that owners are not unfairly penalized for previously booking what was not a special date at the time.

Short Notice Reservations

Short Notice Reservations are reservations made at or within a Short Notice Period of arrival from the time of reservation, (e.g., as measured from 12 a.m. local property time or some other set time of day for a specified time zone). By way of example, the Short Notice Period may be set to seven nights via the rules engine. By way of illustration, a request for a reservation made on Friday, April 24 at 12 a.m. local time, for an arrival on Friday, May 1, may be treated as a Short Notice Reservation, However, the Short Notice Period can be varied from seven nights as desired (e.g., 2 nights, 3 nights, 10 nights, etc.). In addition, the rules engine may block owners from making Short Notice reservations that are shorter than a Short Notice Reservation Minimum Time (which may be specified as a number of nights). By way of example, the Short Notice Reservation Minimum Time may be set via the rules engine as two nights, although this time period can be varied as desired.

Short Notice Reservations may be restricted in their spacings in time by the rules engine such that an owner cannot book a Short Notice Reservation having an arrival date that is within at least seven nights (or some other designated period) from any other Short Notice Reservation departure dates (or, in another case, from other departure dates) for that owner. Short Notice Reservations may be subject to a Short Notice Reservation Maximum Stay Time. Optionally, the Short Notice Reservation Maximum Stay Length is the same as the Maximum General Reservation Stay Length as described herein, although if desired other rules for calculating the Short Notice Reservation Maximum Stay Length can be implemented.

Optionally, the number of Short Notice Reservations that an owner can hold at any one time is restricted by the rules engine such that each owner is only permitted by the rules engine to hold only a single Short Notice Reservation at a time. In addition, since Short Notice Reservations may be in high demand, an allocation process can be implemented to resolve certain conflicts in requested Short Notice Reservations. For example, a randomness factor may be utilized in resource allocation. By way of illustration, each share of a property may be assigned a random number. For example, if there are eight shares for a given property, each share may be assigned by the system a random number of one through eight using a random priority assignment algorithm. The assigned random number is then treated as an initial priority number (e.g., with lower numbers being afforded a higher priority). The priority number for each owner is then stored but not necessarily made known to the owners.

If an owner requests a Short Notice Reservation, and the system determines that no other owner has made a request for a conflicting Short Notice Reservation within a given time period (e.g., the same day, within two days, etc.) then the requesting owner may be granted the Short Notice Reservation and a corresponding confirmation notice may be provided to the owner. If instead multiple owners have requested access to a Short Notice Reservation within a given time period (e.g., the requests are made on the same calendar day or other defined time period) the allocation process optionally determines which of the conflicting owners reservations are to be confirmed and so may be provided access to the property for the given time period.

The allocation process grants the Short Notice Reservation to the owner of the share of the conflicting, requesting owners, of the highest initial priority number. For example, if owner Smith owns two shares in the property with initial assigned priority numbers of four and five, respectively, while owner Jones owns a single share in the property with an initial assigned priority number of three, then owner Jones, who has the higher priority, will be awarded the Short Notice Reservation.

After the Short Notice Reservation is awarded to the owner having the share with the highest initial priority, that share is then moved to the lowest priority. For example, based upon the example above, owner Jones' share (with an initial priority of three) is then set to a priority number of eight. All the other remaining shares are then bumped up in priority number to accommodate the reordering, such that owner Smith's shares will be assigned new priority numbers three and four, respectively. Thus, the priority assignments may be provided in the form of a priority ladder process, where with each Short Notice Reservation grant, the priority of each owner is increased (stepped up in the priority ladder), except that the owner that just received a grant of a Short Notice Reservation will have her priority reduced to the lowest level (the bottom rung of the priority ladder).

The priority numbers assigned to the shares are then retained for the next time conflicting Short Notice Reservation bookings need to be resolved by the allocation process. This system and method help to ensure that the different owners are offered access to disputed Short Notice Reservations on a rolling, equitable basis. The allocation process can also be used to resolve other disputed/conflicting reservations, such as General Reservations, Special Date Reservations, etc., to ensure that access to the property is efficiently and equitably provided.

Total Stay Night Limit

The system and method can be configured to restrict an owner's total number of stay nights at the property on a rolling time period, based upon the number of shares held by the owner. In one case, each owner is restricted to a maximum number of stay nights based upon a Total Stay Night Factor, that is multiplied by the number of shares owned by the owner. For example, in one case the Total Stay Night Factor is 44 such that an owner with one share has a Total Stay Night Limit of forty four, an owner of two shares has a Total Stay Night Limit of eighty eight, etc.

The rolling time period for the Total Stay Night Limit can be a calendar year (or other time period). In this case then, measured as of Apr. 20, 2023, the system can measure total stay nights between Apr. 21, 2023 and Apr. 20, 2024. Optionally, the rules engine may be configured so that nights made as General Reservations, nights made as Special Date Reservations and/or nights made as Short Notice Reservations are all counted toward the Total Stay Night Limit, or certain types of stays/reservations can be excluded from being counted as part of the Total Stay Night Limit if desired.

The rules engine may be configured to measure the Total Stay Night Limit upon the day of departure of each stay and not the day of booking. If the rules engine detects that an owner has made a reservation, or attempted to make a reservation, which will cause the owner to exceed their Total Stay Night Limit, the system may generate and provide the owner with a corresponding notification. In this case, the reservation can be declined by the system or, alternatively, the owner can be notified that the reservation can proceed but the owner will be charged an additional fee for each night's stay that exceeds their Total Stay Night Limit. The additional night fee can vary but in one case can be calculated by the system based in whole or in part upon a fully loaded replacement value for the reserved nights at the property. Alternatively, rather than being charged an additional night fee, the requested reservation may be refused/declined and/or only the portion of the requested reservation, which does not exceed the Total Stay Night Limit may be accepted/booked by the system with the remainder of the requested reservation declined/refused.

Blocked/Cancelled Dates

In certain cases, the managing entity may have the rules engine configured to block dates such that such dates are not available for reservation by owners for a variety of reasons. For example, dates for planned property maintenance, weather-related hazards, showing the property to potential purchasers, etc. can trigger system blocked dates.

A reservation may also be able to be cancelled by an owner via a corresponding user interface. In the case of a cancellation by an owner and/or a cancellation by a system blocked date, all owners of the affected property may be notified of the cancellation and notified of the newly available dates for reservation. The previously cancelled dates can then be offered to the owners or made available, subject to the other reservation rules and Total Stay Night Limit as outlined above.

Cancellations made by an owner may still in some cases count toward that owner's Total Stay Night Limit. In particular, cancelled reservations may still count towards an Owner's Total Stay Night Limit unless: 1) the previously-cancelled nights are re-booked by the cancelling owner or another owner; or 2) the cancellation is made sufficiently in advance of the arrival date (e.g., 60 nights in one case).

Changes

An owner may be permitted by the rules engine to make changes to their reservation for the property, subject to the reservation rules and Total Stay Night Limits outlined above. Changes or attempted changes to reservations may be blocked by the rules engine if the reservation rules and/or Total Stay Night Limit parameters are determined to have been exceeded. For example, attempting to extend a reservation beyond the Total Stay Night Limit allowed for that owner; attempting to extend a reservation to include more Special Date Reservations than permitted for that owner; attempting to extend a reservation such that it encroaches on the separation rule for that owner (seven night of separation in one embodiment); and/or attempting to adjust a reservation such that it overlaps with another owner's stay, may all be declined by the rules engine.

Certain example processes will now be discussed with reference to the figures. Such processes may be configured to process reservation requests for resources, such as homes or other properties. The processes may optionally be executed in whole or in part by a system remote from a user device (e.g., system 102) or partly by a user device and partly by the remote system (and optionally additional systems).

Figure 7:
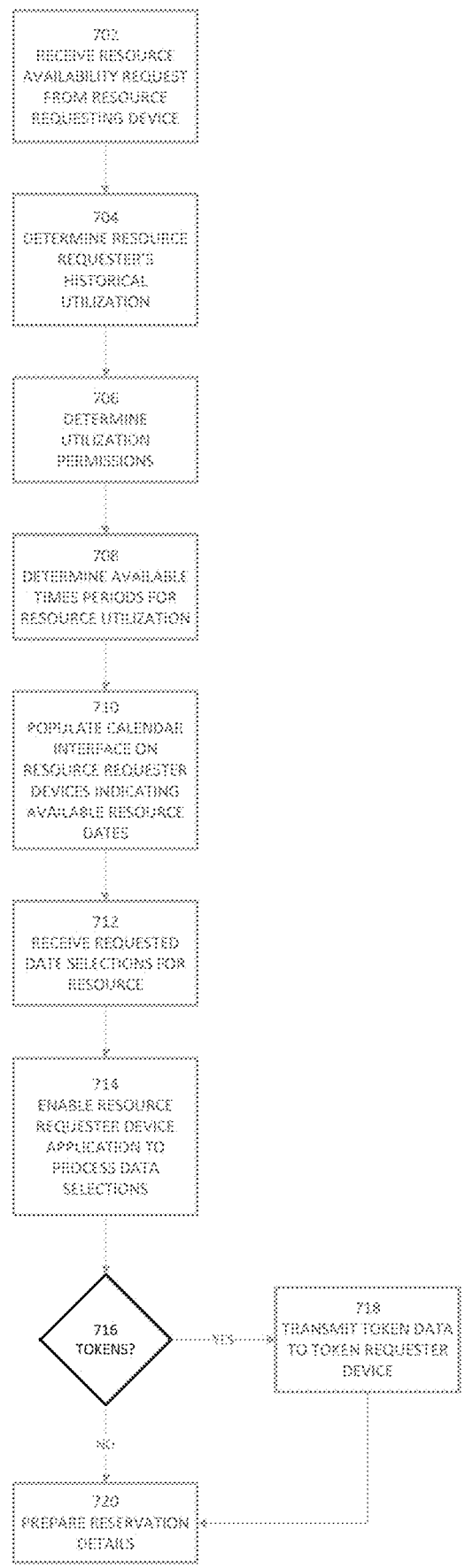
FIGS. 7, 8, and 9 illustrate example processes.

Referring to FIG. 7, at block 702 the process detects that a user device is requesting access to resource availability data. The request may be received from a dedicated resource related application hosted on the user device or via a browser hosted on the user device. For example, the request may be for a calendar that displays available dates for a property, such as a property shared by multiple users that are shareholders in an entity that owns the property.

At block 704, the process may access reservation and reservation-related data for the resource from a reservation database. Such data may include dates for which the resource is already reserved, and may include general special dates. In addition, user data may be accessed, such as the number of shares or percentage ownership the user has in the property, personal special dates for the user, the number and type of past stays, the number and type of pending reservations (e.g., the number of general special date reservations, the number of personal special day reservations, the number of short notice reservations, and/or other reservation types disclosed herein), and/or other user data described herein.

At block 706, the process accesses using utilization permission rules described herein.

At block 708, the process (e.g., using a rules engine) determines available resource dates. The availability dates may be personalized to the user in that such dates may be determined using utilization permission rules described herein and based on the number of shares the user has, the number of past stays that the user has had over a specified time period (e.g., the past 365 days) and the stay types (e.g., special days, short notice, other stay types disclosed herein), and/or the number and type of pending reservations (e.g., special days, short notice, other stay types disclosed herein). The process may also access blocked dates that are unavailable for reservations (e.g., where such dates may be used for cleaning or repairing a property).

At block 710, the process populates a calendar interface on the user device indicating available reservation dates, unavailable dates, general special dates, personal special dates, and/or existing reservations of the user. At block 712, a user reservation request is received by the application or browser on the user via the calendar user interface. At block 714, the user device (e.g., via the application) processes the user reservation request and transmits it to the system with an associated user or user device identifier. At block 716, a determination is made as to whether any tokens (e.g., currency or credits) are due for the requested reservation. For example, there may be a fee if the user indicates that the user is bringing a dog. If tokens are due, at block 718 a message may be transmitted to the user device indicating the amount and/or type of tokens that are due. Once the tokens are received or applied, the process may continue to block 720 and the reservation details may be prepared.

Figure 8:
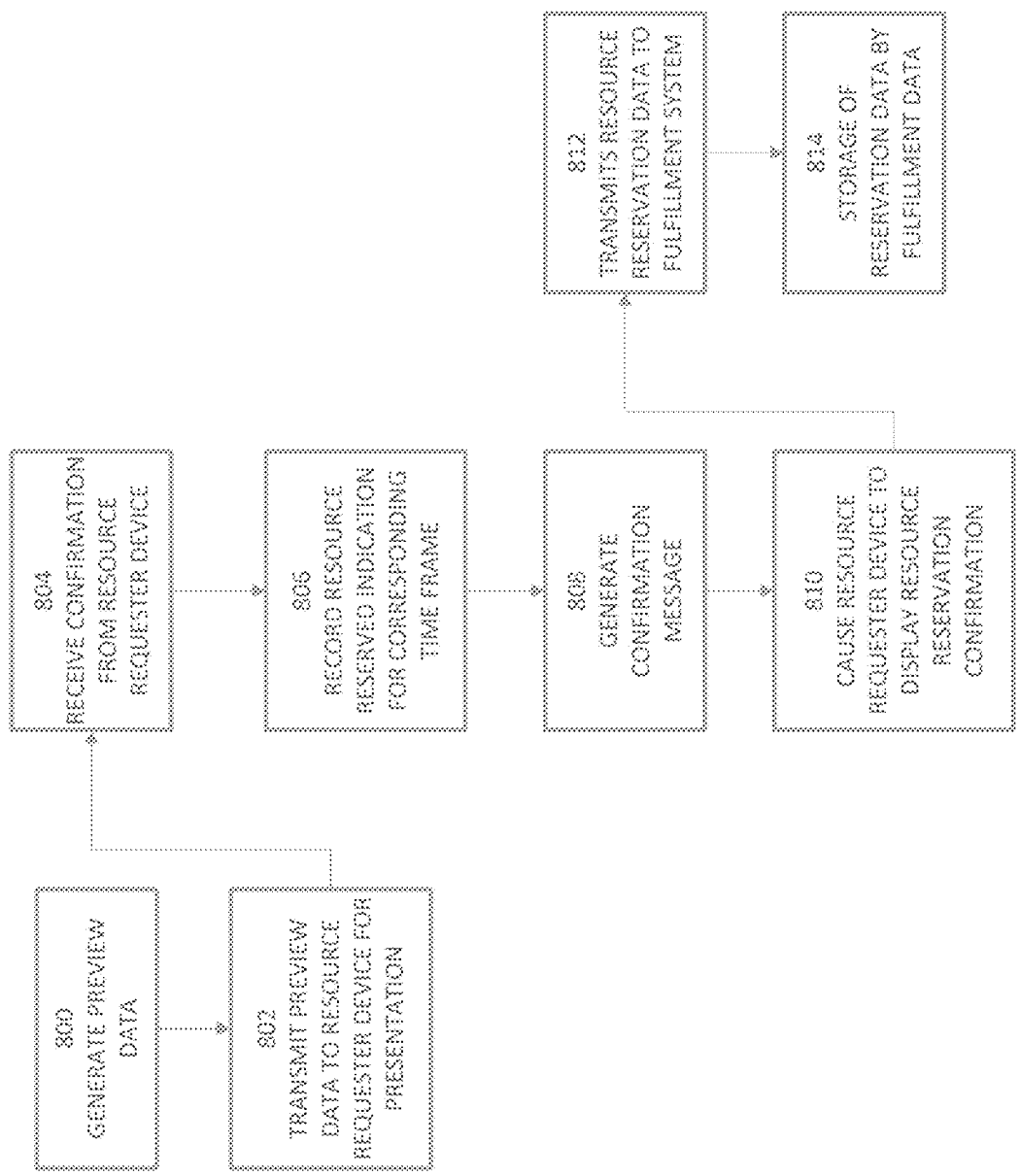

Referring now to FIG. 8, at block 800, the process may generate reservation preview data to be displayed to the user via the user device. At block 802, the preview data may be transmitted to the user device for display to the user via an application or browser. The preview data may include the arrival date and departure date for the reservation, an identification of the property, a property address, and any special instructions. The preview data may be displayed in association with a confirmation control which the user may activate to confirm the reservation. At block 804, a reservation confirmation is received in response to the user activating the reservation confirmation control.

At block 806, the reservation (including the identity of the user, the arrival date and the departure date) may be stored in the reservation database. At block 808, a reservation confirmation message may be generated including the information included in the preview and/or other reservation-related information disclosed herein. At block 810, the reservation confirmation message may be transmitted to and caused to be displayed by the user device. If the process utilizes a reservation fulfillment system, at block 812, the process transmits the reservation data to the fulfillment system. At block 814, reservation booking data may be received from the fulfillment system and stored.

Figure 9:
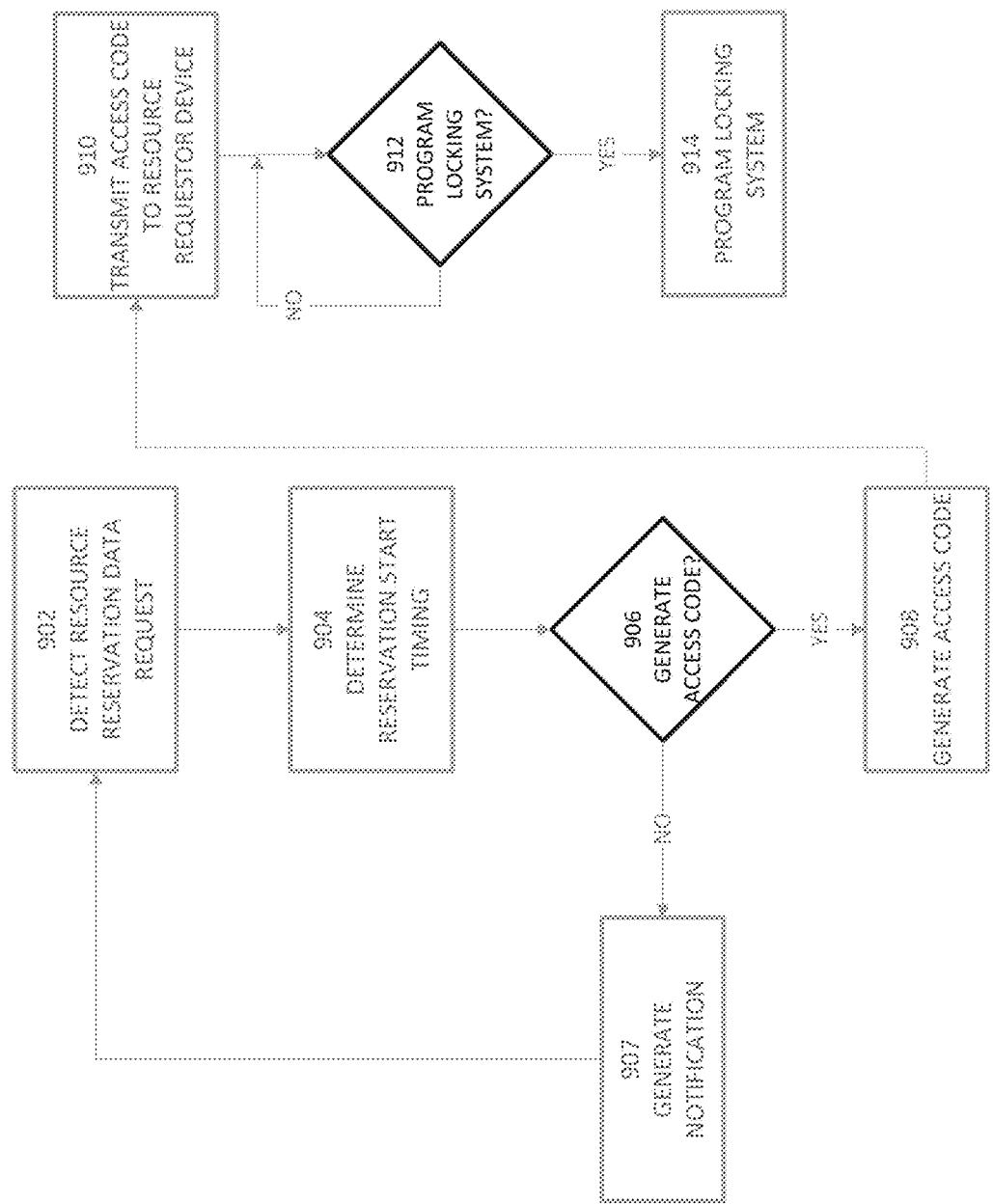

FIG. 9 illustrates an example process configured to generate resource access codes. In order to enhance property security while enabling user access during a time period when a user is allocated access to the property, a programmable door locking system may be used on one or more property doors. Because the property is owned by multiple shareholders, but property utilization is only allocated to one user at a time, the process dynamically generates new access codes for each reservation, programs the door locking system to accept the access code prior to the user's arrival, and deactivates the access code for the user that previously was allocated access to the property.

At block 902, the process detects that a user is accessing a resource reservation data request. The request may be generated by an application or browser hosted on the user device in response to the user accessing a reservation details user interface that includes an access code field. The request may be associated with a user and/or device identifier.

At block 904, the process uses the user and/or device identifier to access a reservation record for the user, wherein the accessed reservation record is of the closest in time future reservation of the user. The process detects the start date and time of the closet in time future reservation of the user.

At block 906, a determination is made as to whether to generate an access code for the property for the user with the upcoming reservation. For example, an access code generation rule may be executed which indicates that an access code may be generated no earlier than minimum number hours and/or days prior to the user reservation date/time and no later than a maximum number hours and/or days prior to the user reservation date/time. Optionally, the access code is generated in response to detecting the resource reservation data request and determining that the current time is within the minimum of that the locking system is to be number hours and/or days prior to the user reservation.

If the access code generation rule indicates an access code is not yet to be generated, at block 907, a corresponding notification may be generated and used to populate the resource reservation data request user interface (e.g., via an access code field). Optionally, the notification may indicate when the access code may be available.

If the access code generation rule indicates an access code is to be generated, at block 908, the access code is generated. The access code may be generated using an access code generation algorithm that specifies how many and what type of characters are to be included in the access code (e.g., alphabetical characters, numeric characters, alphanumeric characters, etc.).

At block 910, the access code is transmitted to the user device. The access code may be displayed to the user via the resource reservation data request user interface (e.g., in an access code field) and/or may be added to a digital access code wallet or other electronic wallet stored on the user device.

At block 912, a determination is made as to whether the program locking system is to be programmed to accept the new access code. For example, a locking system programming rule may be executed which indicates that the locking system is to be programmed a certain number of minutes, hours, or days prior to the date and time of the user's arrival time.

If a determination is made that the program locking system is not yet to be programmed to accept the new access code, the process may monitor the current time to determine when the locking system programming rule is satisfied.

If a determination is made that the program locking system is to be programmed to accept the new access code, at block 914, the locking system may be programmed to accept the new access code. Optionally, at about this time or at an earlier time, the process may disable one or more previous access codes provided to other users for corresponding user reservations. The programming of the locking system may be performed via a wired or wireless network. Communication between the process and the locking system may be via an encrypted communication to further enhance security. The access code may be encrypted using a symmetrical or asymmetric encryption. In symmetrical encryption, the same private key may be used by the sender to encrypt the access code as is used by the recipient (e.g., the locking system) to decrypt the access code. In asymmetric encryption, the public key of the recipient (e.g., the locking system) is used to encrypt the access code, and the private key of the recipient is used to decrypt the encrypted access code.

The user may then manually enter the access code into a physical keypad mounted to the property or via a virtual keypad hosted by the application on the user device. Optionally, in addition or instead, the user device will transmit the access code to the locking system from an access key wallet. If the access code is verified, the property door may be unlocked by the locking system and the user may be granted access to the property.

Certain further examples will now be discussed with reference to example user interfaces illustrated in the figures. The illustrated example user interfaces may be presented to a user (e.g., a shareowner or other type of owner of a property) in response to a user activation of a corresponding control or in response to a system or user device command. For example, in response to accessing a user interface, a message may be transmitted from the user device (e.g., via a dedicated application or browser) to the remote system indicating what user interface is being accessed and including an identification of the user and/or user device. The system may determine, for that user, what data is needed to populate the accessed user interface. The system may generate or retrieve the data, and transmit the data to the user device where the application or browser will display the data in the corresponding user interface.

Figure 10A:
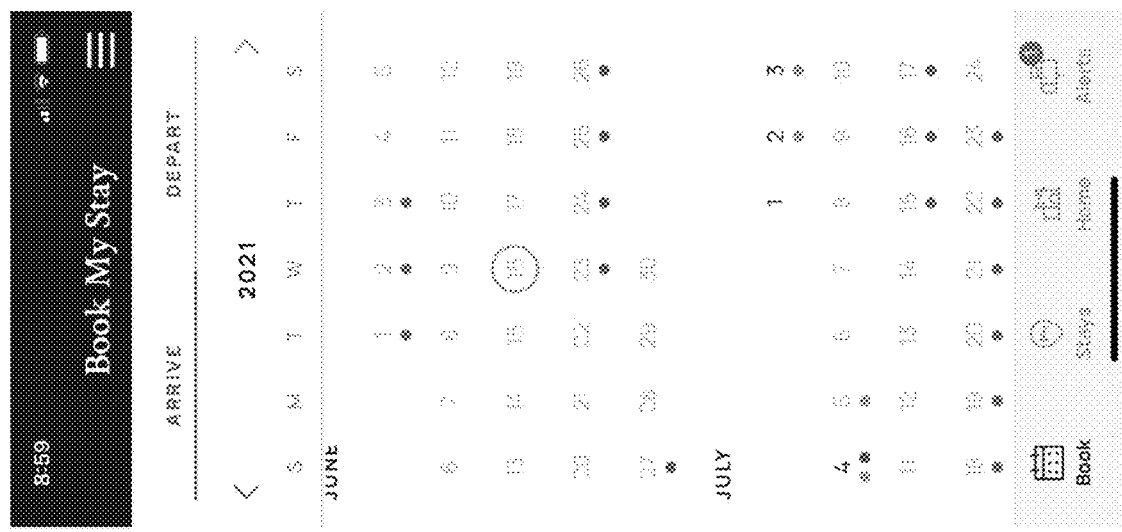
FIGS. 10A-10O illustrate example user interfaces.

FIG. 10A illustrates an example scheduling calendar. The calendar may be selected by selecting a booking icon in a functions menu (e.g., at the bottom of the user interface). The functions menu may include a booking menu item, a stays menu item, a home menu item, and an alert menu item. Forward and background controls may be provided via which the user can advance to a future month for display or regress to a previous month for display. An arrive tab and leave tab may be provided. The user can select the arrive tab, view which days are available for booking, and select an arrival date for a requested reservation. The user can select the leave tab, view which days are available for booking, and select a leave/departure date for the requested reservation.

The booking calendar may provide color coded indicators (e.g., color coded dots) to efficiently provide resource/property status data in a small display area. Such a concise representation of status is particularly useful for small displays, such as on cell phones, tablets, or wearables, and reduces the amount of navigation though multiple "drill down" user interfaces that would otherwise be needed to view the status (e.g., clicking on a state to view a user interface providing the availability status for that date). Multiple indicators may be provided for a given date where applicable, thereby enabling still additional information to be rendered using relatively little screen space and further reducing the need to navigate among multiple user interfaces.

For example, a green dot on a given date entry may indicate that the user has a confirmed reservation for that date. By way of further example, a blue dot may indicate a special day where high demand is expected for a given property (e.g., a day that is or is likely to be in high demand for reservations by multiple shareholders, such as a national holiday (e.g., in the United States: New Year's Day, Martin Luther King Day, President's Day, Memorial Day, Juneteenth, Independence Day, Labor Day, etc.)). By way of yet further example, a purple dot may indicate a personal special date that is of special importance to the particular user/shareholder (e.g., anniversary, birthdate, etc.). A shareholder may specify such special dates via a user account settings user interface, which may then be recorded in a corresponding user account database records. Optionally, personal special dates will only be displayed on the calendar of the particular user/shareholder and not on the calendar of other shareholders. Optionally, general special dates may be indicated on the calendar of all shareholders.

By way of further example, an orange dot may indicate a particular type of pending, but not confirmed reservation (e.g., a Short Notice Reservation). For example, as described elsewhere, Short Notice Reservations may be reservations which are made close to the projected arrival date and/or time (e.g., within a threshold number of days or hours prior to the projected arrival date and/or time). As described elsewhere herein, such requested short notice reservation may not be confirmed until a certain fixed time (e.g., depending on which other shareholders have requested a reservation for the property for that day, and a queue priority associated with shareholders).

It is understood that although the foregoing indicators are described as being in the form of colored dots, other shapes or graphics may be used. For example, in addition to or instead of a color-coded dot indicator, a date unavailability may be indicated via a strikethrough as illustrated in FIG. 10B.

As noted above, multiple indicators may be provided for a given date where applicable. For example, a given date may display an indicator indicating that a user has a confirmed reservation for a property for that day and an indicator indicating that the day is a personal special day for the user.

Figure 10B:
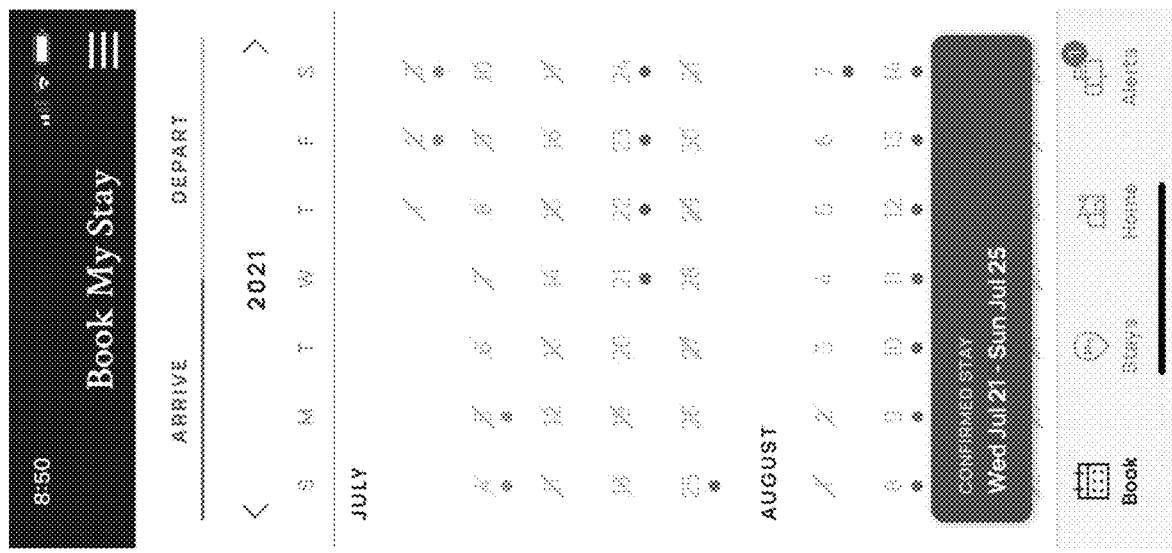

FIG. 10B illustrates the user interface of FIG. 10A, after a requested reservation for certain requested dates is confirmed. The user interface is rendered with the color coded confirmation dots indicating the confirmed dates. In addition, a pop-up confirmation notification is generated and rendered overlaying the calendar. The confirmation notification may include text indicating the confirmed reservation date range.

Figure 10C:
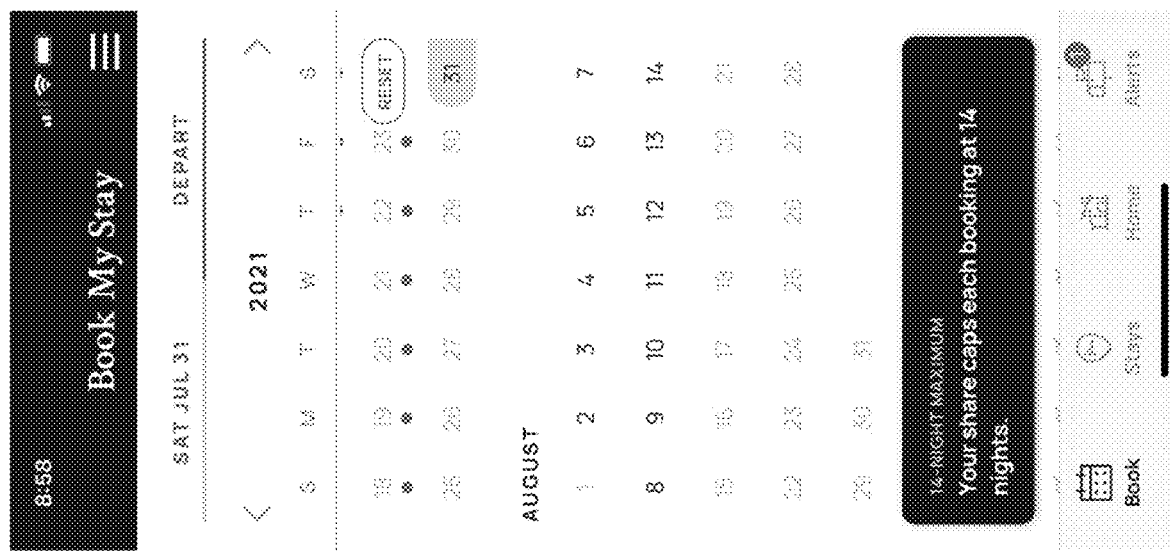

If the system (e.g., the rules engine) determines, using the number of shares that the user owns, that a user reservation request includes more consecutive days than the user is entitled to (e.g., the Maximum General Reservation Stay Length calculated as discussed elsewhere herein), the cap exceeded notification illustrated in FIG. 10C may be generated and presented overlaying the calendar. The cap exceeded notification may include the stay cap (e.g., the Maximum General Reservation Stay Length) as determined by the system.

Figure 10D:
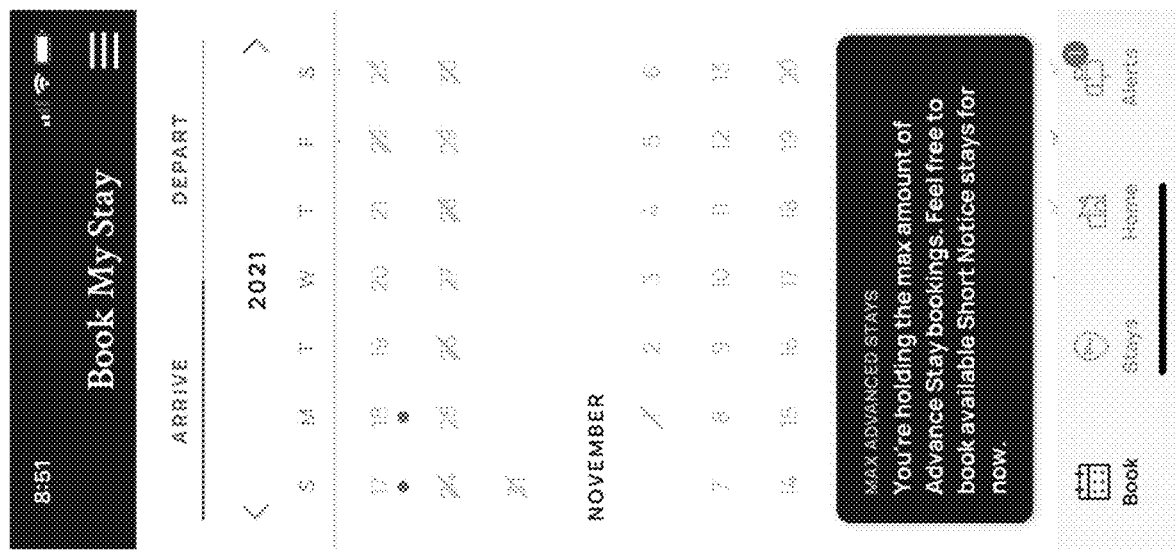

If the system (e.g., the rules engine) determines, using the number of shares that the user owns, that a user reservation request exceeds the maximum amount of advance bookings that the user is entitled to (e.g., the Maximum Number of General Reservations calculated as discussed elsewhere herein), the maximum advanced stays exceeded notification illustrated in FIG. 10D may be generated and presented overlaying the calendar. The maximum advanced stays exceeded notification may include the maximum advanced stays for the user (e.g., the Maximum Number of General Reservations) as determined by the system. The system may also determine (e.g., using the rules engine), whether the user may be entitled to make other types of reservations (non-General Reservations). For example, even if the user is not entitled to make any further general reservations at the current time, the system may determine that the user may be entitled to make a short notice reservation (e.g., a Short Notice Reservation as described elsewhere herein). If the system determines that the user is entitled to make an alternate type of reservation, the generated maximum advanced stays exceeded notification may include an identification of such alternate type of reservation as being an option for the user.

Figure 10E:
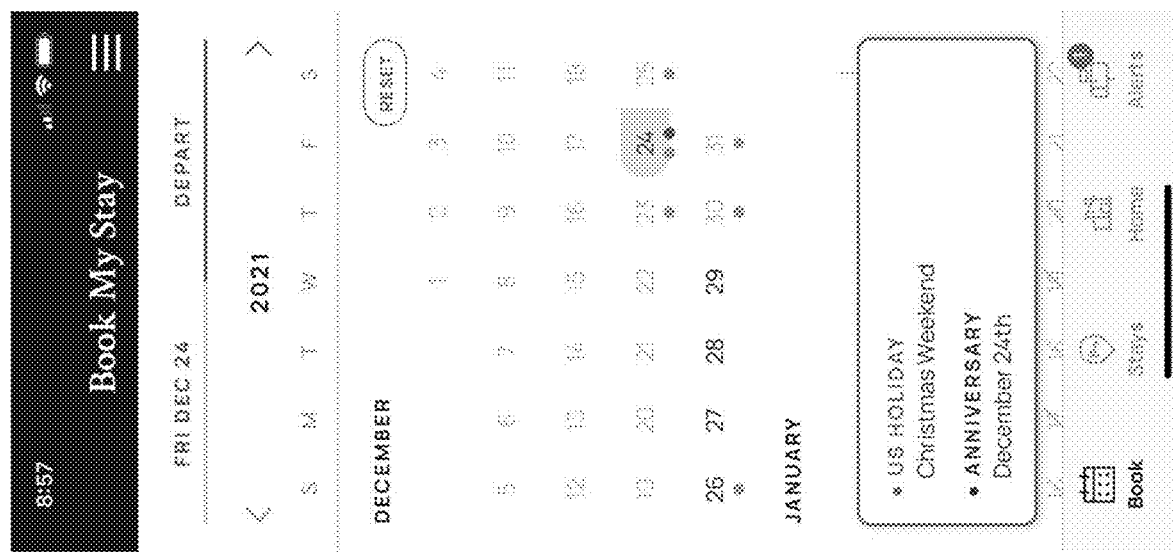

As discussed elsewhere herein, color coded graphics may be used to convey relevant information regarding a given date for a given property. In addition, in the response to a user selecting a given calendar date, a corresponding user interface may be generated and displayed as an overlay over the calendar that textually provides the information corresponding to the color-coded graphic. For example, referring to the example user interface illustrated in FIG. 10E, December $24^{th}$ has two color coded dots, a blue dot and a purple dot. As discussed above, a blue dot may be used to indicate a day that is generally considered special and associated with expected high demand among shareholders, while a purple dot may indicate a personal special date that is of special importance to the user (e.g., anniversary, birthdate, etc.). In response to the user hovering over, touching, or clicking on the date, a notification, such as the notification overlaying the calendar illustrated in FIG. 10E, may be generated and displayed. In the illustrated example, the notification indicates that December 24 is a US Holiday (Christmas weekend)—a general special day of expected high demand, and the user's anniversary—a personal special day.

Figure 10F:
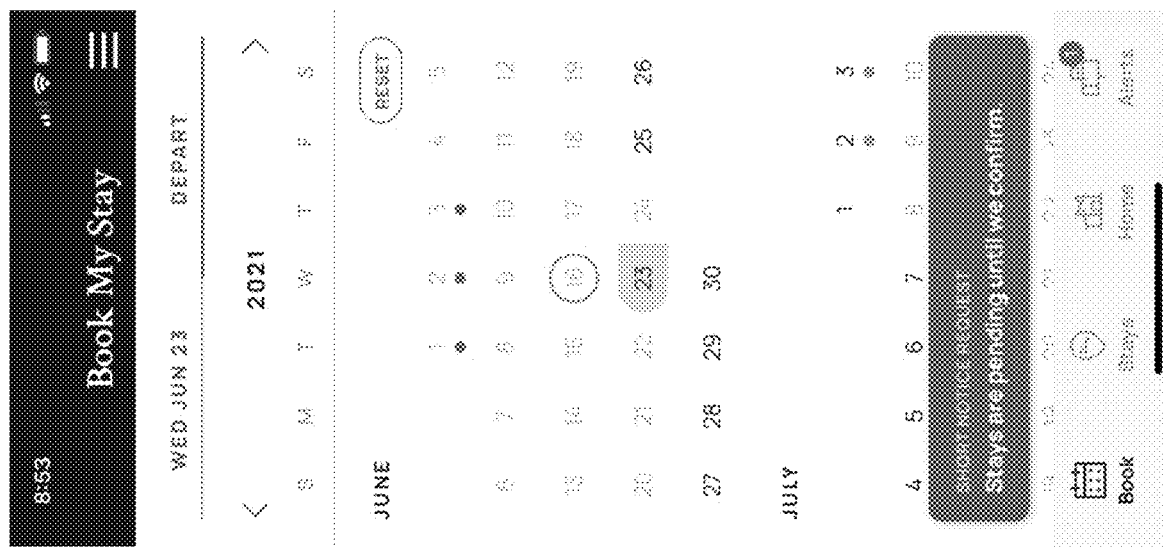

As previously discussed, the system may enable users to request short notice reservations (reservations made at or within a Short Notice Period of arrival from the time of reservation). If a user requests a short notice reservation, and the system determines that no other owner has made a request for a conflicting short notice reservation within a given time period, then the requesting owner may be granted the short notice reservation. Thus, until the given time period expires, the short notice reservation request is held in pending state until the system confirms or declines the reservation. Referring to FIG. 10F, a notification is generated and displayed overlaying the calendar, indicating that the requested short notice reservation is pending, but not yet confirmed.

Figure 10G:
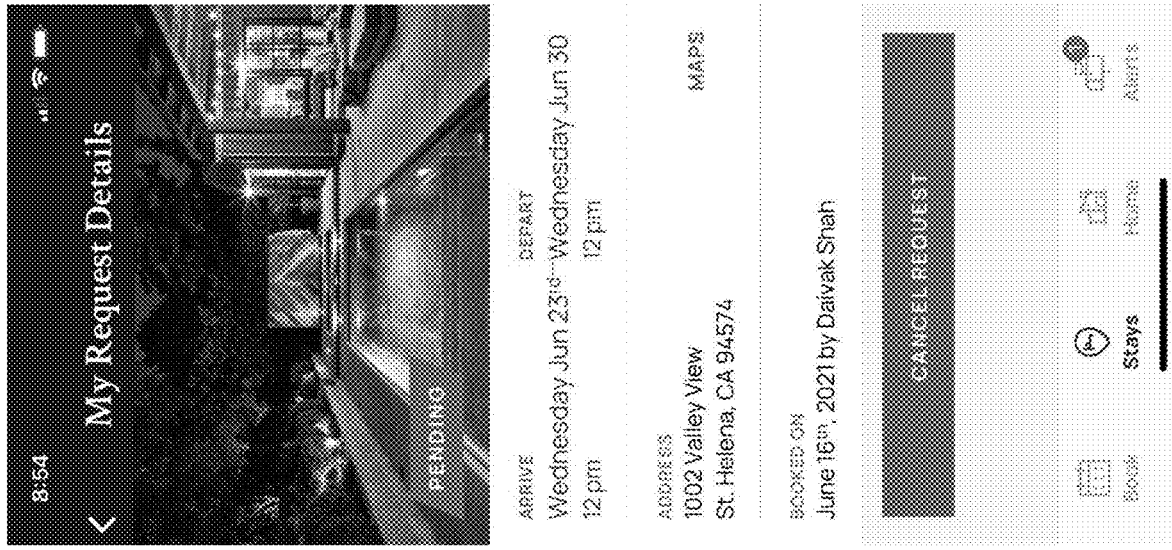

Referring to FIG. 10G, in response to a user selecting a "request details" control, a request details user interface may be generated and presented. The request details user interface may include text or graphics that indicate that the short notice reservation request for a property is pending. The request details user interface may include the requested arrival and departure dates, the property address (and optionally a map or a link to a map of the property address and surrounding area), the date the date that short notice reservation request was made, and an identifier (e.g., name) of the person that made the request. A cancel request control is provided that when activated causes a cancellation message to be transmitted from the user device to the system. The system may then delete the reservation from the property database records to thereby reduce memory utilization or store an indication that the user has cancelled the reservation to be able to journal such cancelled reservations.

Figure 10H:
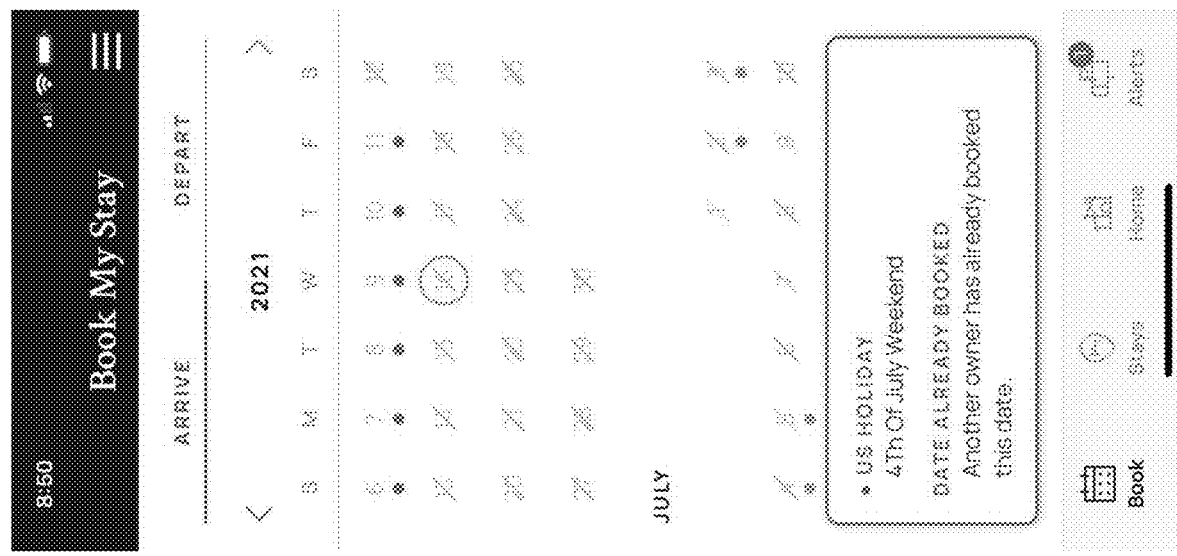

If the system (e.g., the rules engine) detects that a user requested a reservation for a date already reserved by another user, a corresponding notification may be generated and presented to the user via the user device. FIG. 10H illustrates such a notification, including the conflicting date, an indication that the date is a special date (a US federal holiday), and a message that another owner has already reserved the property for that date.

Figure 10I:
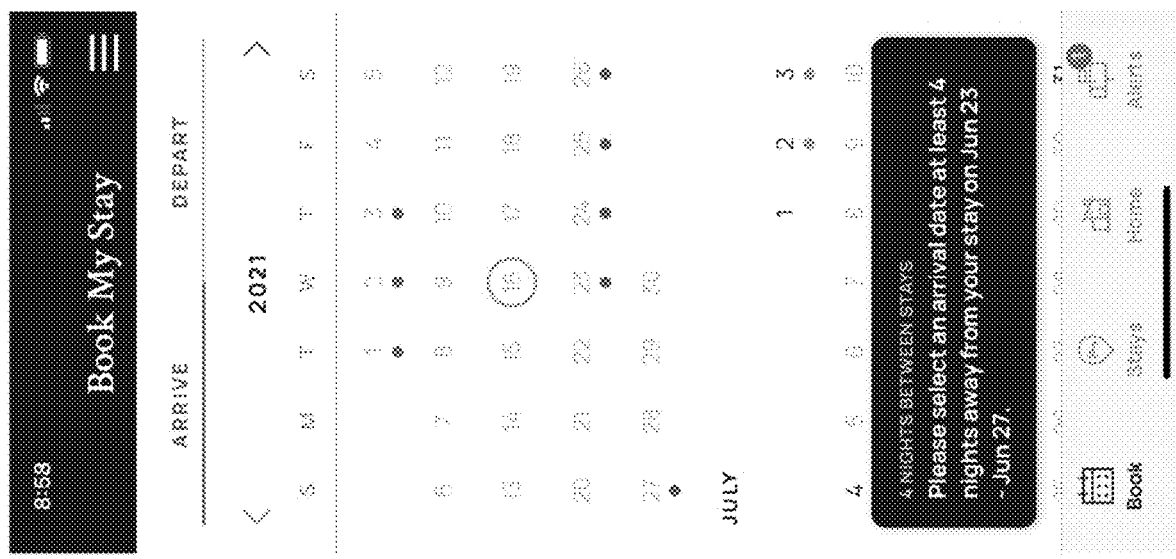
Figure 10J:
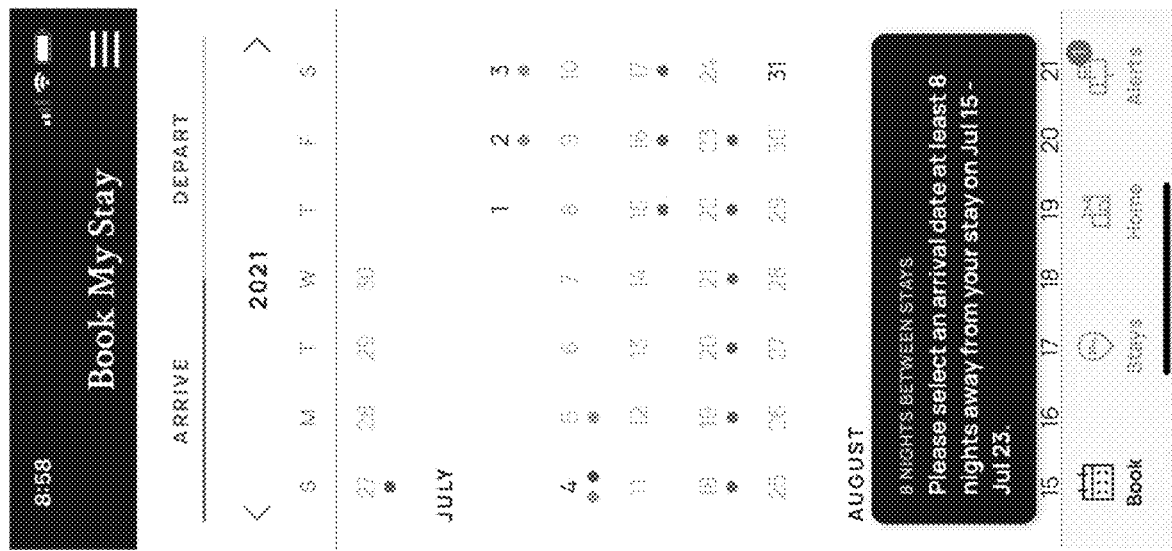

As similarly discussed elsewhere herein, the system (e.g., via the rules engine) may optionally be configured to require a minimum time period between two stays for a given user. For example, a rule may require at least a 4 night break between two reservations. If the system (e.g., via the rules engine) detects that the user has requested a new reservation that is less than a threshold number of days from the departure date of a previous reservation, a corresponding notification may be generated and presented to the user via the user device. FIG. 10I illustrates such a notification, including the dates of the immediately preceding reservation for the user and the minimum number of days (e.g., 4 days in this example) after the departure date of the immediately preceding user reservation that may not be reserved by the user. Optionally, the notification may include an identification the earliest date after the departure date of the immediately preceding reservation that the user can request a reservation for. FIG. 10J illustrates a similar notification, however in this example, an 8 night break is required between two reservations. The difference in required break duration may be based on the number of shares a user has and/or the period for which a reservation is being requested (e.g., a relatively high demand period may require a longer interval than a relatively lower demand period).

Figure 10K:

As similarly discussed elsewhere herein, the system (e.g., via the rules engine) may optionally be configured to require a minimum stay (e.g., a Minimum General Reservation Stay Length). At least partly in response to a user selecting a requested arrival date for a reservation, the system (e.g., via the rules engine) may determine the earliest permitted departure date based on the minimum stay length. A corresponding notification may be generated and presented on a user device indicating the earliest permitted departure date. FIG. 10K illustrates an example of such a notification. The notification reports the Minimum General Reservation Stay Length and the earliest available departure date.

Figure 10L:

Optionally, the system may request and/or receive feedback from a user regarding a stay at a property. For example, as illustrated in FIG. 10L, a feedback user interface may enable the user to indicate, via predefined quality categories (e.g., awful, bad, OK, great, awesome), the quality of the stay. A freeform field may be provided configured to receive freeform text feedback.

Figure 10M:
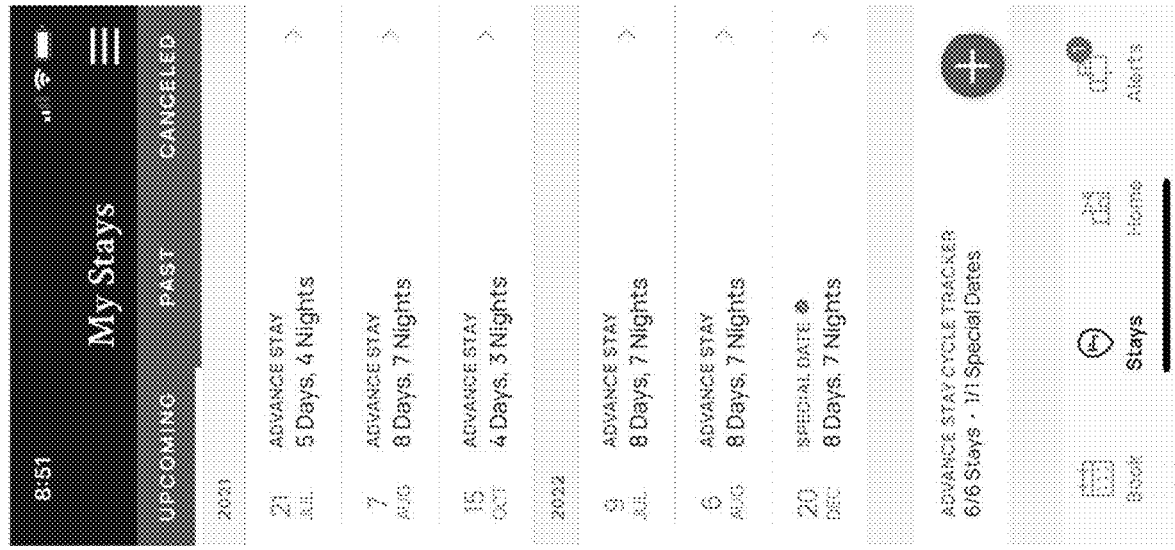

A user interface may be provided, such as that illustrated in FIG. 10M, via which the user can select different categories of user reservations and stays to be displayed to the user. For example, if the user selects an "upcoming" tab, a reservation search engine or SQL query may be used to identify those confirmed, non-cancelled reservations (stored in a reservation database) that have an arrival date that is after the current date, and cause those reservations to be displayed while filtering out other reservations (e.g., reservations for past stays or cancelled reservations). Similarly, if the user selects an "past" tab, a reservation search engine or SQL query may identify those reservations that have a departure date that is before the current date and cause such reservations to be displayed via the user device, while filtering out other reservations (e.g., upcoming reservations or cancelled reservations). Similarly, if the user selects a "cancelled" tab, a reservation search engine or SQL query may identify those past reservations that have been cancelled and display such cancelled reservations while filtering out other reservations (e.g., upcoming reservations or past reservations). When causing the selected reservation type (upcoming, past, cancelled) to be displayed, the system may determine and populate the user interface for each reservation of the selected type the corresponding reservation category(ies) (e.g., advance stay, short notice stay, special date stay, personal special date stay, etc.), the number of days and nights, the arrival date and/or the departure date).

The system may optionally provide an advance stay cycle tracker that tracks the number of advance stays the user is entitled to for a given time period (e.g., based on the number of shares the user has), how many of those stays the user has utilized, and the number of special date stays the user is entitled to, (e.g., based on the number of shares the user has) and how many of those special date stays the user has utilized. The forgoing may be presented via the user interface.

Figure 10N:
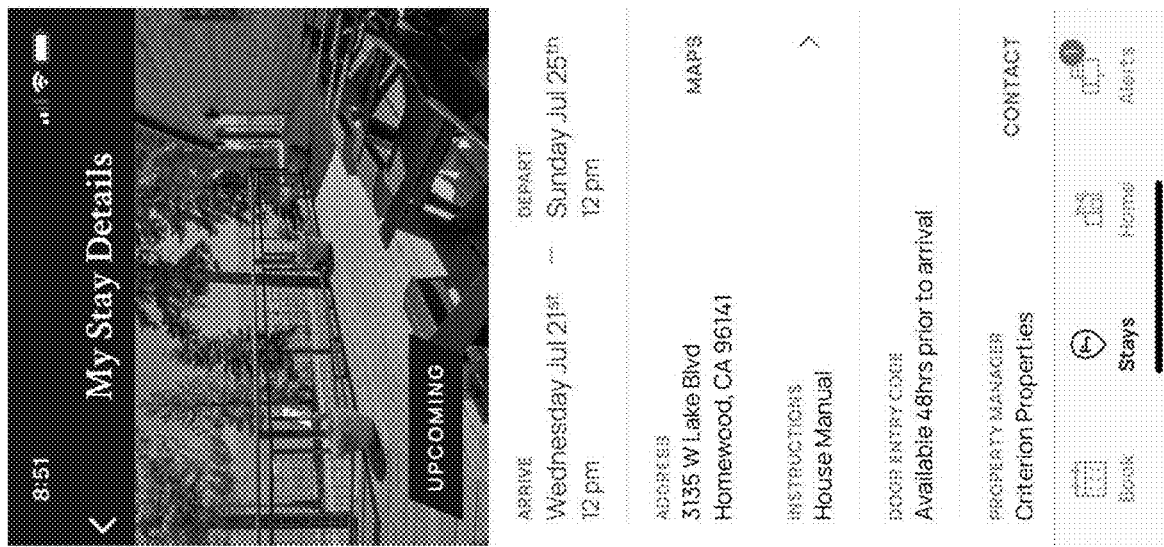

FIG. 10N illustrates an example upcoming stay details user interface that may be populated by the system. The user interface may include the arrival date and time, the departure date and time, the address, a map or link to a map of the property area, any relevant instructions, a door entry code to be entered into a door lock system, the name of the property manager, and contact information for the property manager. The door lock entry code may need to be entered by the user into a keypad connected to a door lock of the property (via a wired or wireless interface). The keypad may be a dedicated keypad with physical buttons or buttons rendered on a touch screen. Optionally, the keypad may be a virtual keypad presented by an application or browser hosted on the user device, where the user device may communicate wirelessly (e.g., via BLUETOOTH, WiFi, or otherwise). Optionally, the system will only generate and/or provide the door entry code no earlier than a threshold time period before the arrival date and time to enhance security of the property.

Thus, for example, when a user accesses a control for requesting the upcoming stay details user interface, a corresponding message (including an identifier associated with the user and/or user device) may be transmitted from the application or browser on the user device to the system. The system may compare the current date and time with the date and time of the reservation. If the current date and time is within a first threshold time period relative to the date and time of the reservation, the system may generate a door entry code and transmit the door entry code to the application or browser on the user device to be displayed to the user via the user device. Optionally, the door entry code may have been generated significantly earlier (e.g., hours or days earlier) but only transmitted to the user device if the current date and time is within a first threshold time period relative to the date and time of the reservation. If the current date and time is not within a first threshold time period relative to the date and time of the reservation, the system may generate a corresponding notification indicating when the door entry code will be available (e.g., how many days or hours prior to the reservation date and time and/or the precise date and time), and transmit the notification to the application or browser on the user device to be displayed to the user via the user device. The user can then enter the door entry code to access the property during the user's scheduled reservation. Optionally, the door lock will be programmed not accept the generated door entry code except between the arrival date/time and the departure date and time. Optionally, the door lock will be programmed not accept the generated door entry code except slightly before the arrival date/time (e.g., one or two hour hours before the scheduled arrival time) until slightly after the departure date and time (e.g., one or two hour hours after the scheduled departure time).

Figure 10O:
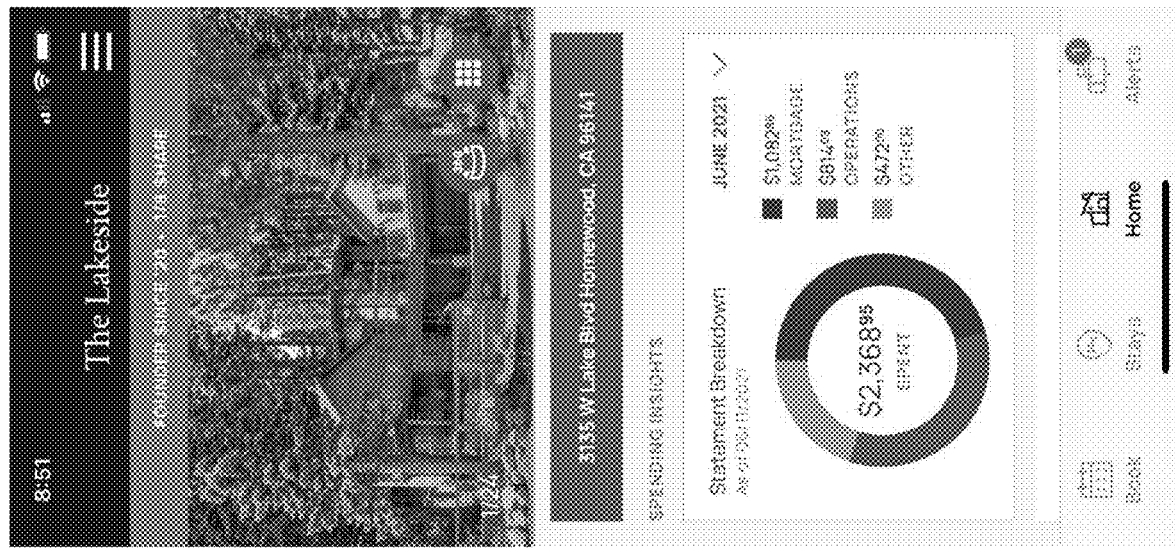

FIG. 10O illustrates an example spending insight user interface which may be populated by the system and displayed on the user device. The spending data may be filtered so that only spending data for a limited time frame is provided (e.g., the current calendar year, the current month, the previous 12 months, etc.). The user interface may indicate the time frame (e.g., 2021 as of Jun. 11, 2021). The spending data may be provided graphically and/or textually. For example, the spending data may include spending categories such as mortgage payments, operations payments, and/or other payments. The graphic representation of the spending data may graphically depict the proportion of a given spending category relative to the total spending for the time period. In addition, the aggregated spending for the time period may be calculated by the system and used to populate the spending insight user interface.

Figure 11:
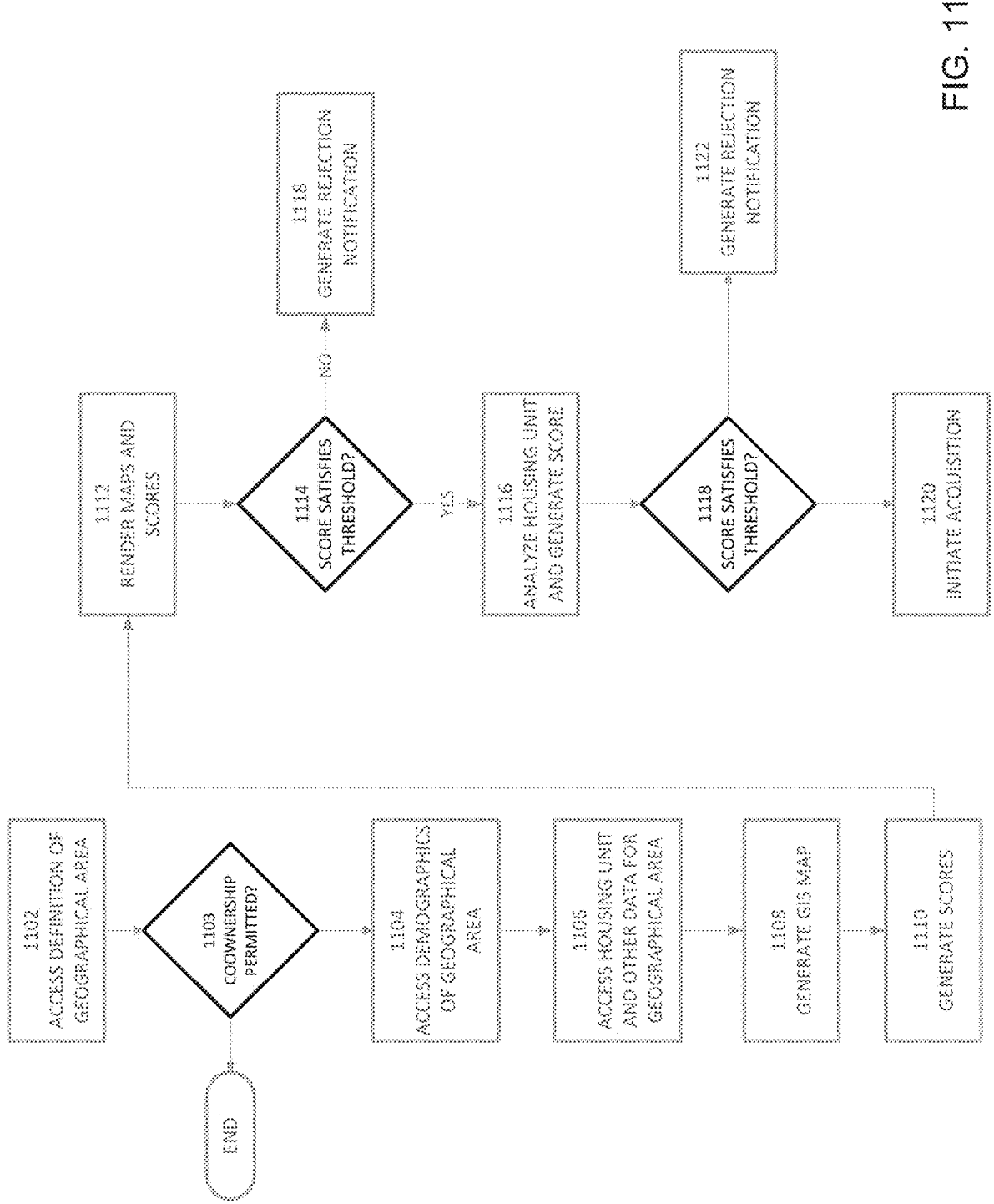
FIG. 11 illustrates an example geographical area analysis process.\

Referring now to FIG. 11, an example process is illustrated for determining risk with regards to local neighbor sentiment toward the operation of co-owned housing units or rental units within a specific geographic area (e.g., the local neighborhood). The process may optionally be executed using one or more systems disclosed herein (e.g., system 102). At block 1102, the definition of the geographic area to be evaluated is accessed. The geographic area definition may be accessed via an application programming interface or otherwise from a system or may be user defined. For example, the geographic area may be defined by a user drawing (e.g., using a pointing device or finger) a boundary around the area via a map displayed on a user device display. By way of further example, the geographic area may be defined by a specification of one or more zip codes. By yet further example, the geographic area may be defined by a specification of a property address and a radius or other distance about the property. By yet further example, the geographic area may be defined by a specification of a property address and a number of blocks about the address. Optionally, more than one geographic area is defined within a larger region, where each defined geographic area may be separately scored with respect to the likelihood of neighbor sentiment to the operation of a co-owned property or a rental property within the respective geographic area.

At block 1103, state, local (e.g., city, town, or other local governmental entity), homeowner association, and/or planned community laws, regulations (e.g., zoning regulations), and/or rules (which may be collectively referred to as rules) in which the geographic area lies, may be accessed over a network from one or more governmental and/or non-governmental databases. A determination may be made as to whether the rules prohibit the coownership of property, such as a house or other residential structure, as described herein. If the rules prohibit such coownership of property, such as a house or other residential structure, the process may terminate to thereby reduce computer processor, memory, and network utilization that would otherwise be expended on further analysis.

At block 1104, demographic data for the defined geographical area(s) may be accessed from one or more governmental and/or non-governmental databases. For example, the demographic information may include some or all of the demographic data discussed herein and/or other demographic data (e.g., total population, population density, number of households, median household income, household income distribution, median household size, median number of adults per household, median number of children/minors per household, percentage of households living in same housing unit for more than a threshold period of time, percentage of households that have broadband access, percentage of households that speak languages other than English, percentage of residents above a specified age that are high school graduates, percentage of residents above a specified age that have bachelor degrees or higher, percentage of residents above a specified age that have post-graduate degrees, percentage of adults in workforce, mean time travel to work, median household income, per capita income, percentage of female persons, percentage of male persons, percentage of population in respective age categories, and/or other data).

At block 1106, housing unit and other data related to the geographical area(s) may be accessed from one or more governmental and/or non-governmental databases. For example, the data may include some or all of such data discussed herein and/or other data (e.g., the size of the local geographic area, the total number of housing units, the total number houses (e.g., free standing houses), the total number of apartments, the total number of housing units in multiunit buildings that are or are available for owner occupancy, the number of housing units in the area that are owner occupied, the percentage of homes in the area that are owner occupied, the number and/or percentage of housing units in the area that are short term rentals, the number and/or percentage of housing units in the area that are longer term rentals, the distribution/density of homes in the area that are owner occupied, the median value of owner-occupied housing units, the price trends of housing units, the rental price trends of rental housing units, the median amount of time housing units offered for sale remain on the market unsold, the median amount of time housing units offered for rent remain on the market unrented; the median inventory age of housing units, the vacation home density, legal limitations on vacation home density, the median monthly owner costs of housing unit, the median mortgage size of housing units, the median gross rent for rented housing units, the number of building permits for housing issued within a specified time period, the median lot sizes zoned for housing units, the median housing unit sizes, consumer preference index(es), the demographics of the local geographic area. and/or other data.

At block 1108, a GIS map is generated that includes the defined geographic area (a) and optionally a surrounding area. The GIS map may include a visual indication of the borders of the geographic area(s). For example, the border may be depicted using a bolded and/or colored perimeter line. The GIS map may visually and/or textually provide some or all of the data accessed by the process. At block 1110 score(s) may be generated for the geographic area(s) indicating the strength of the anti or pro sentiment of residents within respective geographic area(s) to the presence of a co-owned vacation property within the geographic areas and/or of the renting of vacation properties (e.g., on a short term basis).

The generated map may further indicate (e.g., via color, borders, text, graphics, and/or otherwise) whether the geographic area has rules that are favorable or unfavorable to rentals (e.g., short term rentals). indications as to: whether there are restrictions on short term and/or long term rentals (e.g., whether: the short term (e.g., less than a threshold period of time, such as less than a week, less than a month, less than 6 months, or other time frame) and/or long term rental of houses is permitted; whether a license or permit is needed to rent a house (e.g., for short term rentals of less than a threshold period of time or for any rental); whether there is a limit on the number of licenses or permits needed to rent a house (e.g., for short term rentals of less than a threshold period of time or for any rental); whether there are disclosure requirements for short term and/or long term rentals; whether there is a waiting period (e.g., 1 year, 3 years, 5 years) after purchasing a house before the house may be rented (e.g., on a short term and/or long term basis); whether there are fees associated with the renting of houses), and the fee amounts; whether there is a limit on the maximum number of different renters permitted over a specified time frame (e.g., 6 months, one year, etc.), and/or the like). Optionally, scores may be generated for the geographic area(s) indicating how favorable the area(s) are to short term property rentals (e.g., using the foregoing rental-related attributes) For example, the score may be generated using an artificial intelligence/learning engine, such as a neural network as described herein, and some or all of the data accessed by the process.

Figure 12A:
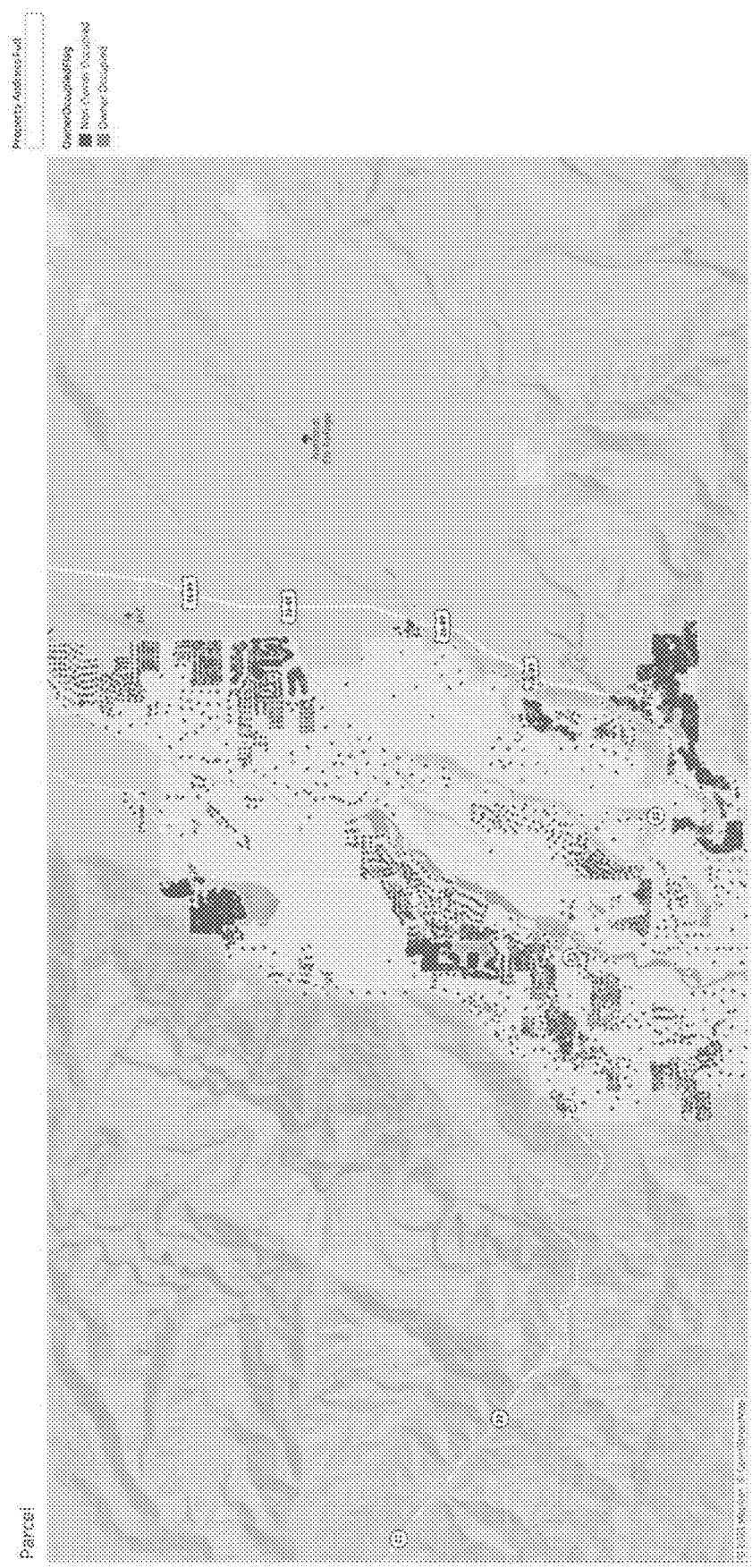
FIGS. 12A-12B illustrates example GIS maps.
Figure 12B:
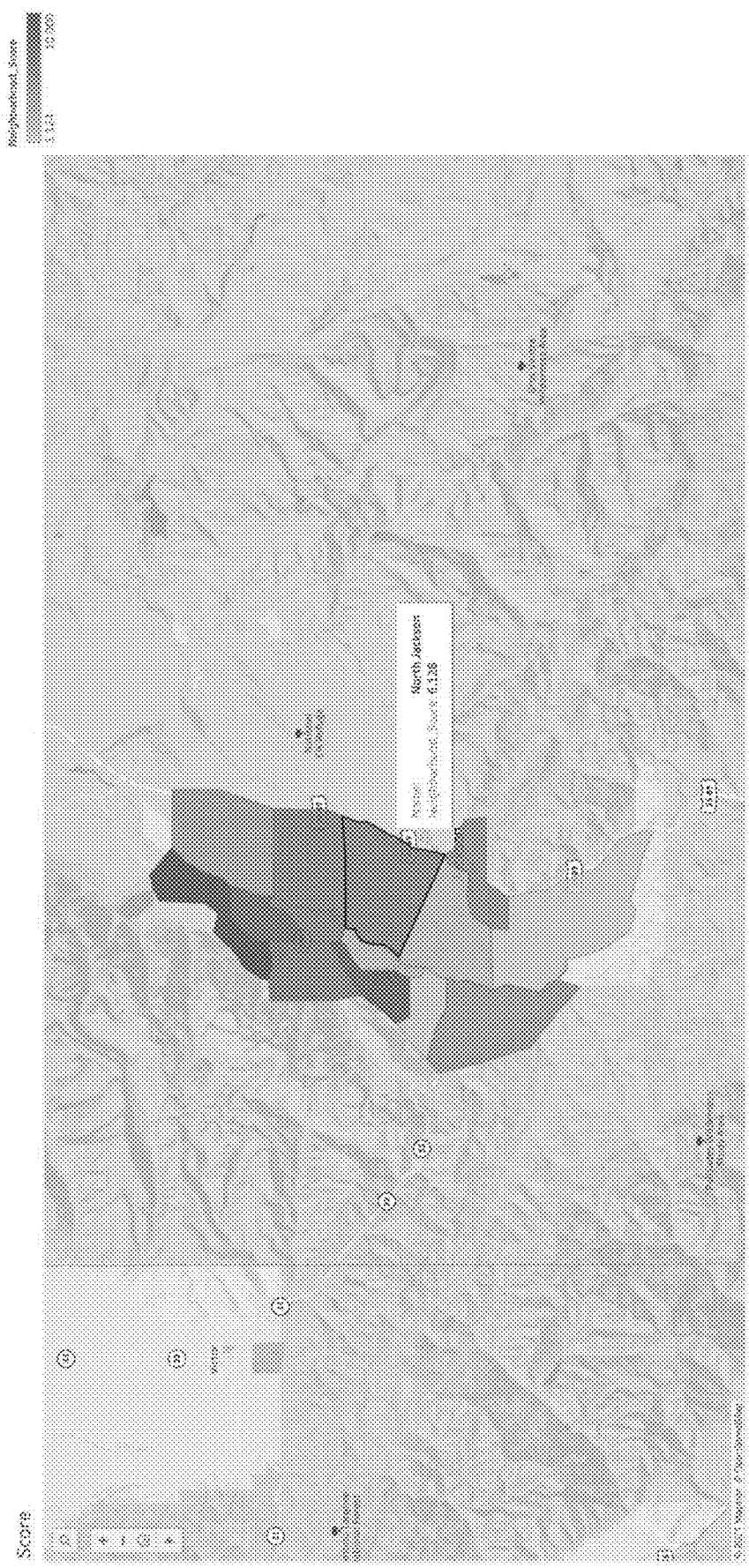

At block 1112, the GIS map (examples of which are illustrated in FIGS. 12A-12B) may be rendered on a user device display (e.g., via a web browser hosted on the user device or a dedicated mapping application hosted on the user device), optionally in association with scores displayed in association with respective geographical areas.

At block 1114, a determination may be made as to whether the score generated at block 1110 for a given geographical area (e.g., a neighborhood) satisfies a specified threshold (e.g., indicating that the residents' sentiment against having a co-owned vacation property or rental property in their neighborhood is less than the specified threshold, indicating whether the area is favorable for short term rentals, and/or the like)). If the threshold is not satisfied at block 1114, the process may proceed to block 1118, and a rejection indication may be generated and presented via the user device.

If the threshold is satisfied at block 1114, then at block 1116, a particular housing unit in the geographical area that is a candidate for acquisition as a co-owned vacation property may be analyzed and scored as to its suitability as a co-owned vacation property and/or as a rental property (e.g., a short term rental property). For example, the process illustrated in FIG. 4 may be utilized in evaluating a given housing unit for desirability and suitability as a co-owned property and/or, with reference to FIG. 13, as a rental property (e.g., a short term rental property). By way of illustration, a search may be conducted of one or more data stores (e.g., real estate databases or websites) to identify housing units being offered for sale that have some or all of those attributes identified as contributing to a relatively fast sale of house shares and/or a relatively high rental occupancy. A score may be generated reflecting the desirability and suitability of a given housing unit as a co-owned property and/or as a rental property.

If the threshold is not satisfied at block 1118, the process may proceed to block 1122, and a rejection indication for the housing unit may be generated and presented via the user device. If the threshold is satisfied at block 1118, then at block 1120, an acquisition process may be initiated to obtain the housing unit for use as a co-owned property to be shared by co-owners in a time displaced manner as discussed elsewhere herein and/or as a rental property (e.g., a short term and/or long term rental property) shared by renters in a time displaced manner.

Referring to FIG. 12A, an example GIS map is illustrated, indicating housing units (via small circles) and using different circle fill colors to indicate which housing units are owner-occupied and which housing units are not owner-occupied. Referring to FIG. 12B, an example GIS map is illustrated, indicating, using borders, different analyzed geographical areas in a region, wherein the darkness of the geographical area corresponds to the score value for the geographical area (e.g., the darker the fill color the higher the score).

The application displaying the maps may be configured to enable a user to manipulate a map. For example, the application may enable a user to zoom in or out of a map view, rotate a map, swipe to a next map, remove a map layer, add a map layer, etc. For example, where the map is displayed on a touch screen, the zoom operation may be performed via pinch in and pinch out gesture. If the user device is equipped with an imaging device, the zoom gesture may be a hand or finger motion, which may be detected by the imaging device and interpreted as to what type of image manipulation is to be performed (e.g., zoom in, zoom out, rotate, swipe to next map, etc.). The application may also be configured to receive and carry out verbal instructions via a voice recognition system.

A map may be composed of multiple map layers drawn in a specified order. A given map layer may define how a GIS dataset is portrayed and labeled. A map layers may include images, such as those taken by aircraft, satellites, and/or ground vehicles. The images may be of a housing unit, a lot, a scenic view, etc. A map may be configured to detect a user pointing out or clicking on an area of the map and data in a corresponding layer dataset associated with that map area may be accessed and displayed (e.g., via a pop-up window or in a windowpane). A layer dataset (for one or more map layers) may include data, such as data disclosed herein (e.g., plot size, housing unit size, population density, median housing unit price, vacation home density, the identification of other co-owned homes managed by the managing entity, zoning restrictions (e.g., indicating permitted to prohibited uses of property), presence of a homeowner association that governs the area, an indication as to whether there is a master planned community with associated rules, an indication as to whether a license/permit to be allowed to rent properties on a short term (or other term) basis in the area, and the number of licenses available, other restrictions on rentals, such as rental restrictions described herein, etc.). Any and all of the data in the dataset may be rendered (via color, area border type, text, graphics, and/or otherwise) via the map of the geographic area, automatically or in response to a user selecting one or more types of data to be displayed via a menu or other user interface.

Figure 13:
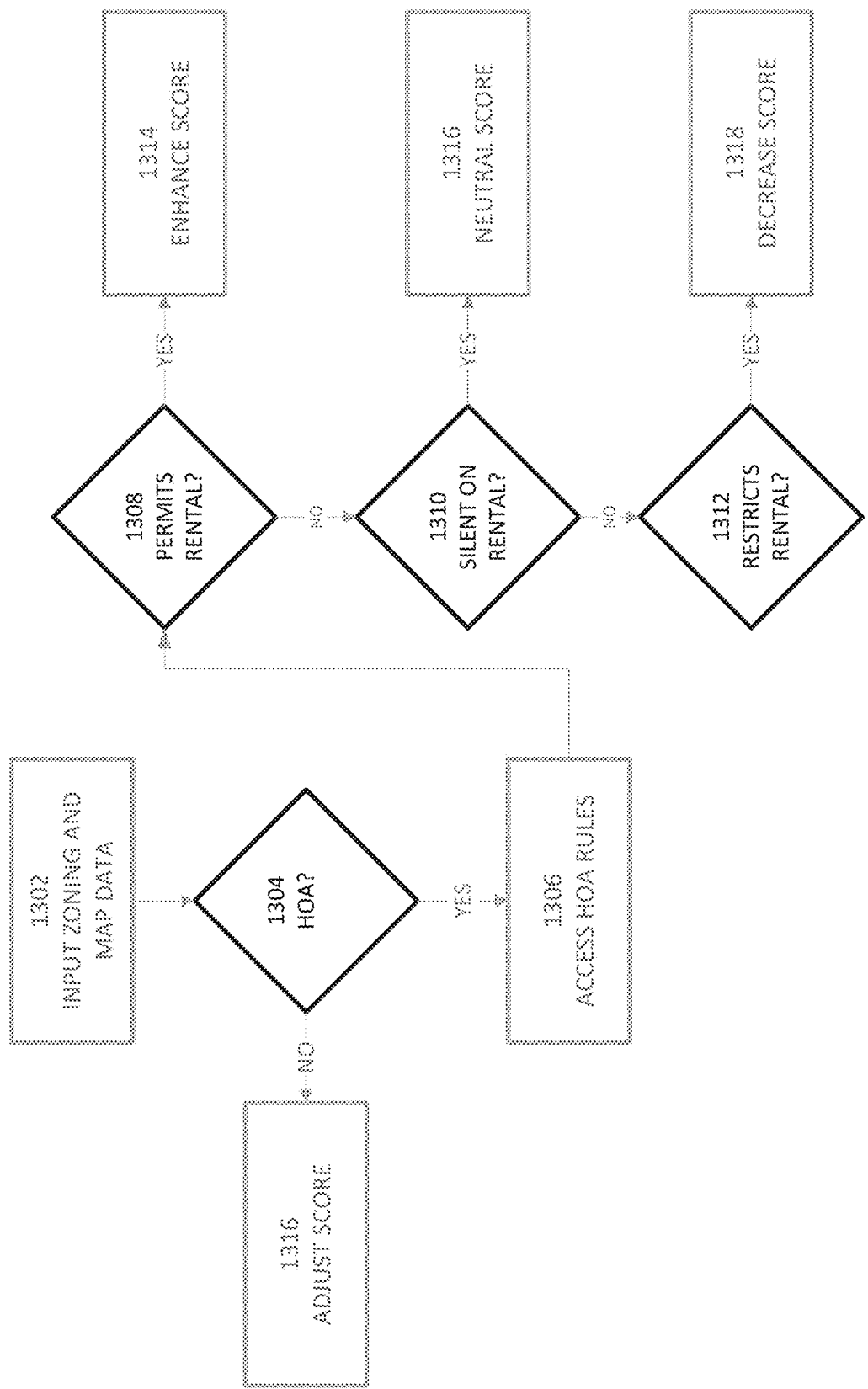
FIG. 13 illustrates an example process.

Referring now to FIG. 13, an example process is illustrated for scoring a geographic area for suitability as a rental property. It is understood that the illustrated process may be used in conjunction with some or all of the process blocks illustrated in FIG. 11, FIG. 4, and/or with other processes described herein with respect to generating a suitability score for a property (e.g., a house). Optionally, the process illustrated in FIG. 13 is only performed after a suitability score (generated using processes described herein) for a given property or area reaches a minimum threshold level in order to reduce computer utilization which would otherwise be expended analyzing an area or property that has already been determined to be unsuitable.

At block 1302, zoning and other related data for the geographic area may be accessed from a database (e.g., a governmental database, a non-governmental database, etc.). At block 1304, a determination is made as to whether the accessed data may indicate whether a homeowner association (or master planned community, which for the description herein may be included in the description of a homeowner association) governs the geographic area. If a determination is made that a homeowner association does not govern the geographic area, at block 1316, a determination is made that the suitability score should accordingly be adjusted. For example, a determination may be made that the no change should be made to the score (indicating that the lack of a homeowner association is a neutral attribute). By way of further example, a determination may be made that the score should be increased, indicating that the lack of a homeowner association (and its attendant rules) is a positive attribute.

If a determination is made that a homeowner association does govern the geographic area, at block 1306, the homeowner rules may be accessed (e.g., from a data store associated with a homeowner association website). At block 1308, a determination may be made by parsing the homeowner rules (e.g., via a natural language processor) as to whether the homeowner association rules expressly permits short term rentals (or other rental type) without restriction. If a determination is made that the homeowner association expressly permits short term rentals (or other rental type) without restriction, at block 1314, the suitability score may be enhanced (e.g., increased) to reflect that the area is relatively more suitable for acquisition of a house to be used for rentals (e.g., short term rental).

If a determination is made, at block 1310, that the homeowner association rules are silent with respect to short term rentals (or other rental type), at block 1316, a determination is made that the suitability score should be unaltered to reflect that it has not been determined whether the homeowner association is favorably or unfavorably inclined with respect to short term rentals (or other rental type), and so there is no change with respect to the suitability score.

If a determination is made, at block 1312, that the homeowner association rules restricts short term rentals, or other rental type, (e.g., where the restrictions may include one or more of the following, whether: the short term (e.g., less than a threshold period of time, such as less than a week, less than a month, less than 6 months, or other time frame) and/or long term rental of houses is permitted; whether a license or permit is needed to rent a house (e.g., for short term rentals of less than a threshold period of time or for any rental), there is a limit on the number of licenses or permits needed to rent a house (e.g., for short term rentals of less than a threshold period of time or for any rental); whether there are disclosure requirements for short term and/or long term rentals; whether there is a waiting period (e.g., 1 year, 3 years, 5 years) after purchasing a house before the house may be rented (e.g., on a short term and/or long term basis); whether there are governmental or homeowner associated fees associated with the renting of houses, and the fee amounts; whether there is a limit on the maximum number of different renters permitted over a specified time frame (e.g., 6 months, one year, etc.)), then at block 1318, a determination is made that the suitability score should be reduced to reflect that to reflect that the area is relatively less suitable for acquisition of a house to be used for rentals (e.g., short term rental).

Thus, systems and methods are described for enabling searches to be securely performed for physical resources and/or for potential utilizers of such physical resources to thereby identify potential or likely matches between such physical resources and/or for potential utilizers of such physical resources (e.g., vacation homes). Further, systems and methods are described for predicting high utilization dates for physical resources. In addition, systems and methods are described for physical resources that are suitable to add to a pool of physical resources. Yet further, systems and methods are described for predicting and scoring sentiment of neighbors to the operation of a co-owned property within their geographic area and/or the operation of a rental property (e.g., for use by renters in a time displaced manner in a manner similar to that of co-owners).

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The de scribed functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone/mobile device application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer implemented method, the method comprising:

accessing, via a computer interface, data from a plurality of databases related to at least a first geographical area, wherein the first geographical area comprises a plurality of resources;

using a first learning engine to evaluate the data from the plurality of databases related to the first geographical area to generate an area suitability indicator for the first geographical area;

causing the generated area suitability indicator to be rendered in association with a map comprising the first geographical area so that the area suitability indicator is displayed at a same time as the map comprising the first geographical area;

determining whether the generated area suitability indicator, associated with the map, satisfies a first threshold;

at least partly in response to determining that the generated area suitability indicator satisfies the first threshold, using a second learning engine to evaluate data related to a first resource, comprising a housing unit, within the first geographical area to generate a resource suitability indicator indicating a suitability of the first resource to be shared amongst a plurality of physical resource users in a time displaced manner;

at least partly in response to determining that the generated resource suitability indicator satisfies a second threshold, enable a first action to be taken, comprising an initiation of an acquiring process with respect to the first resource.

2. The computer implemented method as defined in claim 1, wherein the data, from the plurality of databases, related to the first geographical area comprises a size of the first geographic area, a number of housing units with the first geographic area, a number of housing units in the first geographic area that are owner occupied, a percentage of housing units in the first geographic area that are owner occupied, a number of housing units in the first geographic area that are short term rentals, a percentage of housing units in the first geographic area that are short term rentals, a number of housing units in the first geographic area that are long term rentals, a percentage of housing units in the first geographic area that are long term rentals, a median inventory age of housing units in the first geographic area, a density of vacation housing units within the first geographic area, a preference index, buffer data for vacation housing units within the first geographical area, an indication as to whether rules prohibit or restrict the use of a housing unit with respect to a first use, and/or demographics of the first geographic area.

3. The computer implemented method as defined in claim 1, wherein the first learning engine comprises an input layer, one or more hidden layers, and an output layer.

4. The computer implemented method as defined in claim 1, wherein the first learning engine comprises a neural network, an expert system, a rules-based systems, and/or a support vector machine.

5. The computer implemented method as defined in claim 1, the method further comprising receiving a suitability query regarding at least one geographical area, wherein the suitability query is received via an encrypted communication encrypted using a public key.

6. The computer implemented method as defined in claim 1, the method further comprising receiving a suitability query regarding at least one geographical area, wherein the suitability query is received via an encrypted communication encrypted using symmetric encryption.

7. The computer implemented method as defined in claim 1, wherein the generated area suitability indicator comprises a sentiment indicator.

8. Non-transitory computer readable memory having program instructions stored thereon that when executed by a computer system device cause the computer system to perform operations comprising:
 access data from one or more databases related to at least a first geographical area, wherein the first geographical area comprises a plurality of resources;
 use a first learning engine to evaluate the data from the one or more databases related to the first geographical area to generate an area suitability indicator for the first geographical area;
 cause the generated area suitability indicator to be rendered in association with a map comprising the first geographical area so that the area suitability indicator is displayed at a same time as the map comprising the first geographical area;
 use a second learning engine to evaluate data related to a first resource comprising a housing unit, within the first geographical area to generate a resource suitability indicator indicating a suitability of the first resource to be shared amongst a plurality of physical resource users in a time displaced manner; and
 at least partly in response to determining that the generated resource suitability indicator satisfies a second threshold, enable a first action to be taken comprising an initiation of an acquiring process with respect to the first resource.

9. The non-transitory computer readable memory as defined in claim 8, wherein the data, from the one or more databases, related to the first geographical area comprises a size of the first geographic area, a number of housing units with the first geographic area, a number of housing units in the first geographic area that are owner occupied, a percentage of housing units in the first geographic area that are owner occupied, a number of housing units in the first geographic area that are short term rentals, a percentage of housing units in the first geographic area that are short term rentals, a number of housing units in the first geographic area that are long term rentals, a percentage of housing units in the first geographic area that are long term rentals, a median inventory age of housing units in the first geographic area, a density of vacation housing units within the first geographic area, a preference index, buffer data for vacation housing units within the first geographical area, an indication as to whether rules prohibit or restrict the use of a housing unit with respect to a first use, and/or demographics of the first geographic area.

10. The non-transitory computer readable memory as defined in claim 8, wherein the first learning engine comprises an input layer, one or more hidden layers, and an output layer.

11. The non-transitory computer readable memory as defined in claim 8, wherein the first learning engine comprises a neural network, an expert system, a rules-based systems, and/or a support vector machine.

12. The non-transitory computer readable memory as defined in claim 8, the operations further comprising receiving a suitability query regarding at least one geographical area, wherein the suitability query is received via an encrypted communication encrypted using a public key.

13. The non-transitory computer readable memory as defined in claim 8, the operations further comprising receiving a suitability query regarding at least one geographical area, wherein the suitability query is received via an encrypted communication encrypted using symmetric encryption.

14. The non-transitory computer readable memory as defined in claim 8, wherein the generated area suitability indicator comprises a sentiment indicator.

15. A system configured to determine resource suitability, the system comprising:
 a network interface;
 at least one processing device operable to:
  receive over a network, using the network interface, an encrypted communication from a client hosted on a user device requesting a resource suitability indicator for a first geographical area with respect to a first resource type configured to be shared amongst a plurality of physical resource users in a time displaced manner;
  access data from a plurality of databases related to at least the first geographical area, wherein the first geographical area comprises a plurality of resources;
  use a first learning engine to evaluate the data from the plurality of databases related to the first geographical area to generate an area suitability indicator;
  generate a multilayer map comprising the first geographical area and a surrounding geographical area, so that the area suitability indicator is displayed at a same time as the multilayer map comprising the first geographical area and the surrounding geographical area;
  cause the generated area suitability indicator, associated with the multilayer map, to be rendered in association with the multilayer map comprising the first geographical area and the surrounding geographical area;
  determine whether the generated area suitability indicator satisfies a first threshold;
  at least partly in response to determining that the generated area suitability indicator satisfies the first threshold, use a second learning engine to evaluate data related to a first resource, comprising a housing unit, within the first geographical area to generate a resource suitability indicator indicating a suitability of the first resource, comprising a housing unit, to be shared amongst a plurality of physical resource users in a time displaced manner; and
  at least partly in response to determining that the generated resource suitability indicator satisfies a second threshold, enable a first action to be taken, comprising an initiation of an acquiring process with respect to the first resource.

16. The system as defined in claim 15, wherein the data from the plurality of databases related to the first geographical area comprises a size of the first geographic area, a number of housing units with the first geographic area, a number of housing units in the first geographic area that are owner occupied, a percentage of housing units in the first geographic area that are owner occupied, a number of housing units in the first geographic area that are short term rentals, a percentage of housing units in the first geographic area that are short term rentals, a number of housing units in the first geographic area that are long term rentals, a percentage of housing units in the first geographic area that are long term rentals, a median inventory age of housing units in the first geographic area, a density of vacation housing units within the first geographic area, a preference index, buffer data for vacation housing units within the first geographical area, an indication as to whether rules prohibit or restrict the use of a housing unit with respect to a first use, and/or demographics of the first geographic area.

17. The system as defined in claim 15, wherein the first learning engine comprises an input layer, one or more hidden layers, and an output layer.

18. The system as defined in claim 15, wherein the first learning engine comprises a neural network, an expert system, a rules-based systems, and/or a support vector machine.

19. The system as defined in claim 15, wherein the encrypted communication is encrypted using a public key.

20. The system as defined in claim 15, wherein the encrypted communication is encrypted using symmetric encryption.

21. The system as defined in claim 15, wherein the generated area suitability indicator comprises a sentiment indicator.

22. The system as defined in claim 15, wherein the system is configured to generate a standard deviation of an expected probability distribution with respect to the area suitability indicator.

* * * * *